E. J. VON PEIN.
REGISTERING AND MONEY CHANGING MECHANISM.
APPLICATION FILED MAY 29, 1916.
1,290,429.
Patented Jan. 7, 1919.
29 SHEETS—SHEET 8.
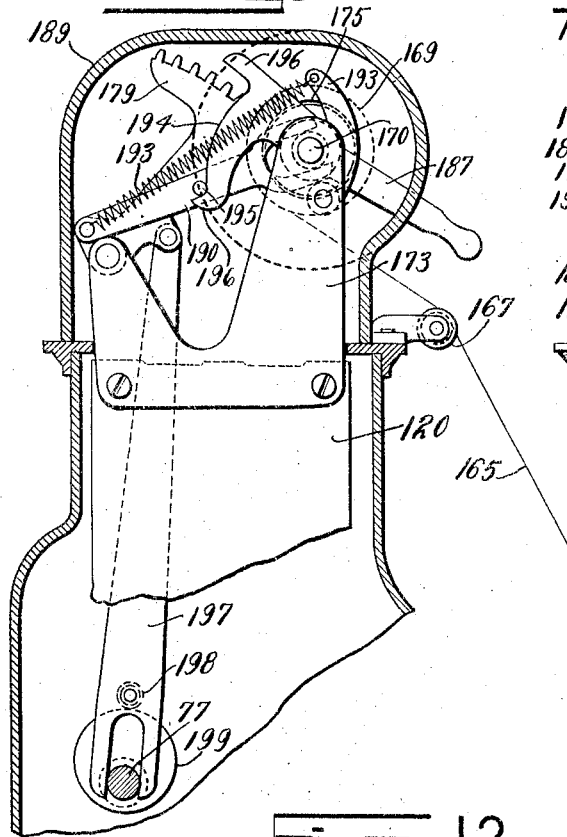
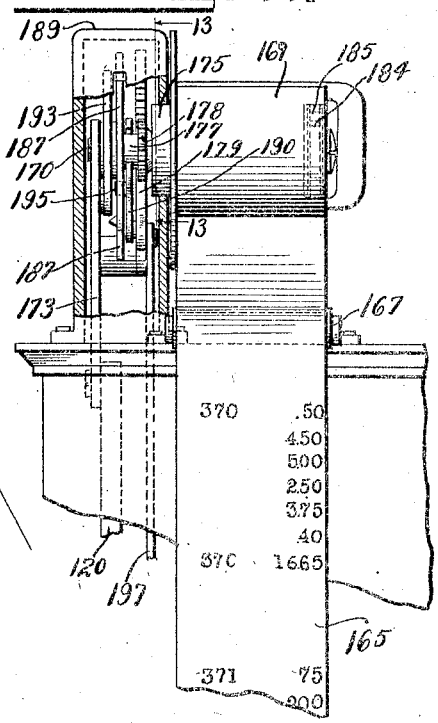
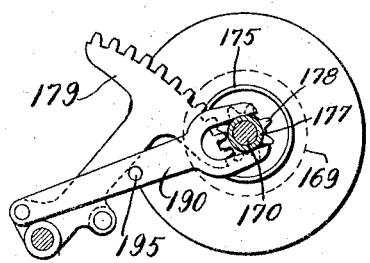
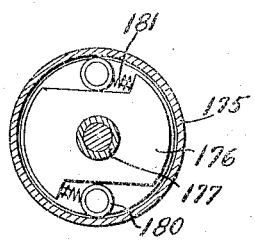
Inventor
Edward J. Von Pein.
by his Attorneys

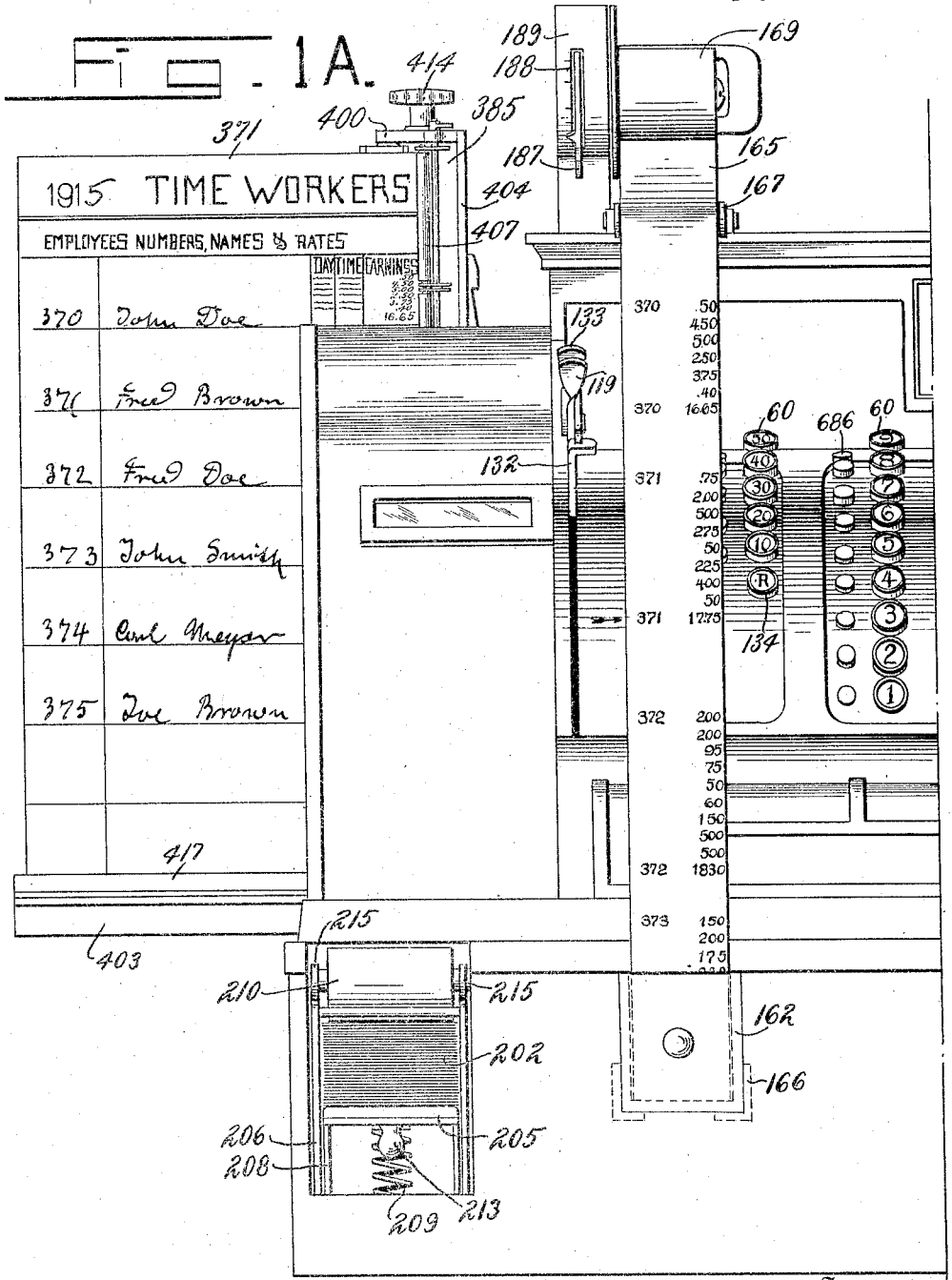

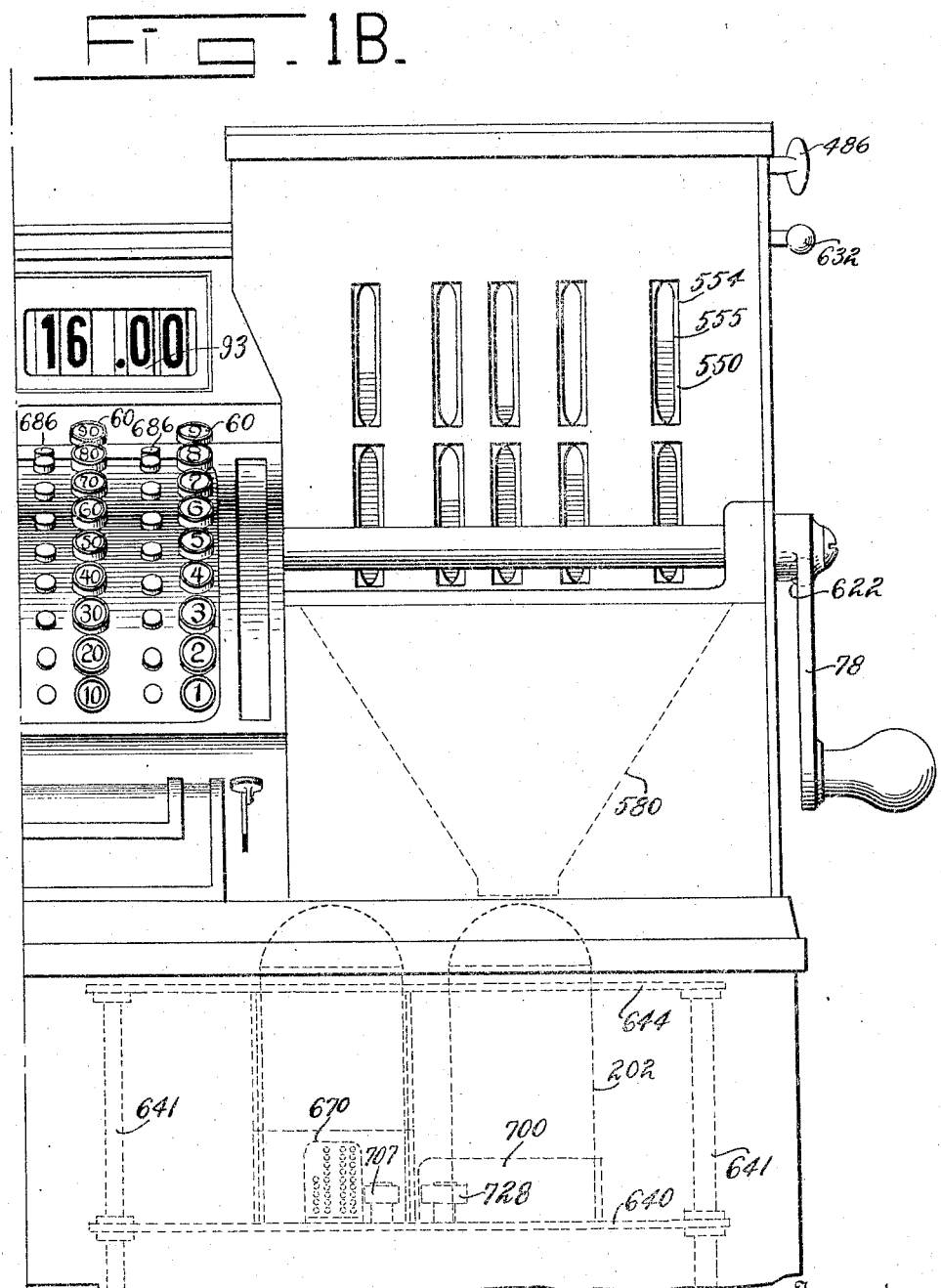

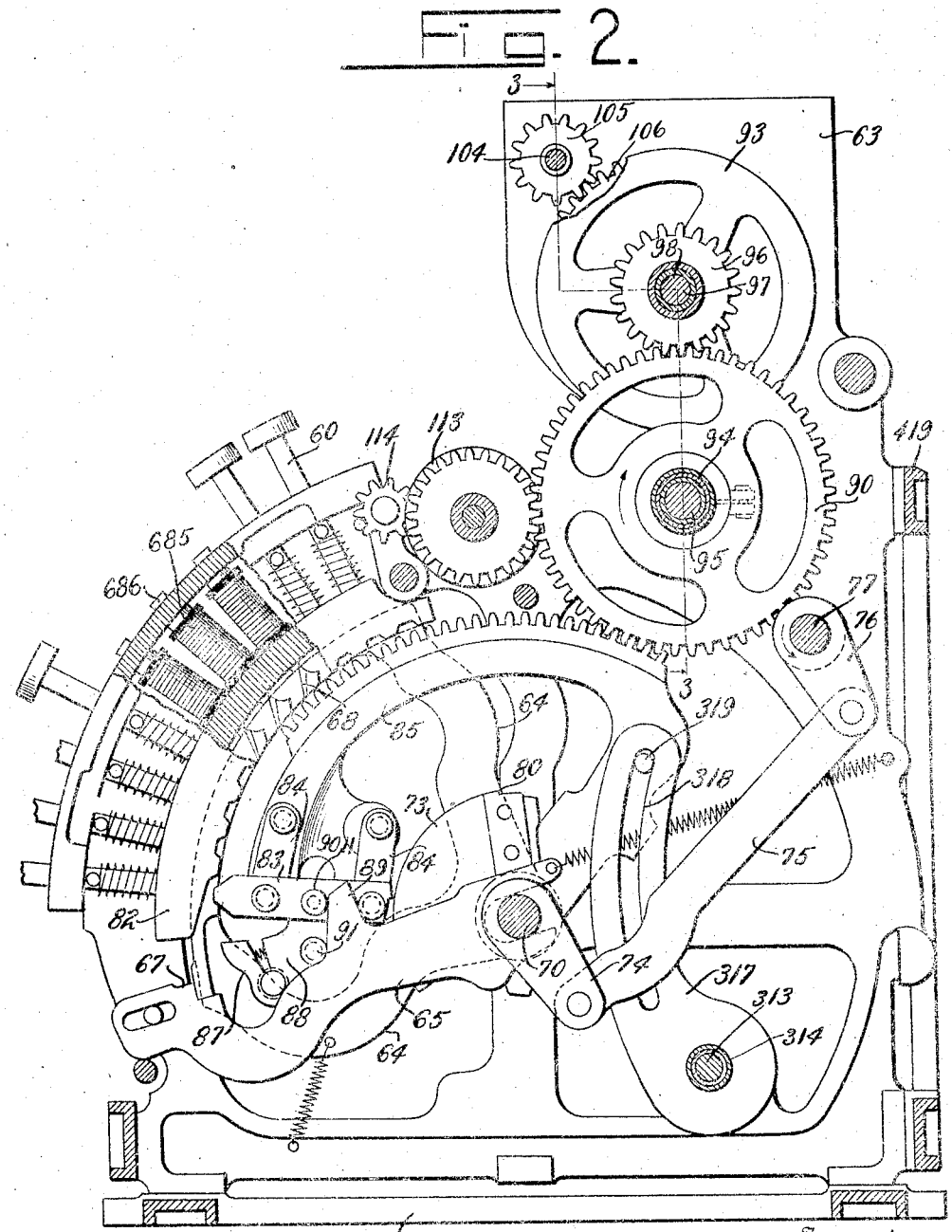

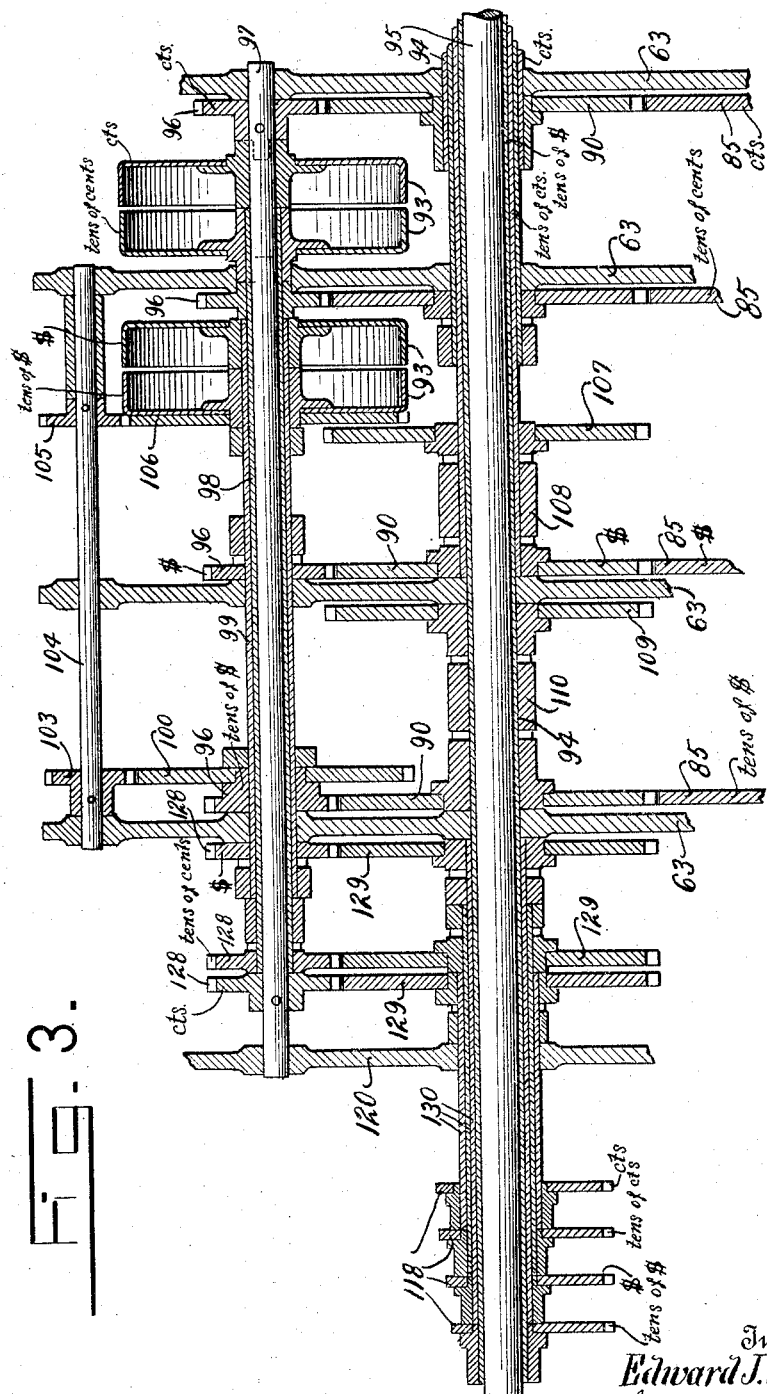

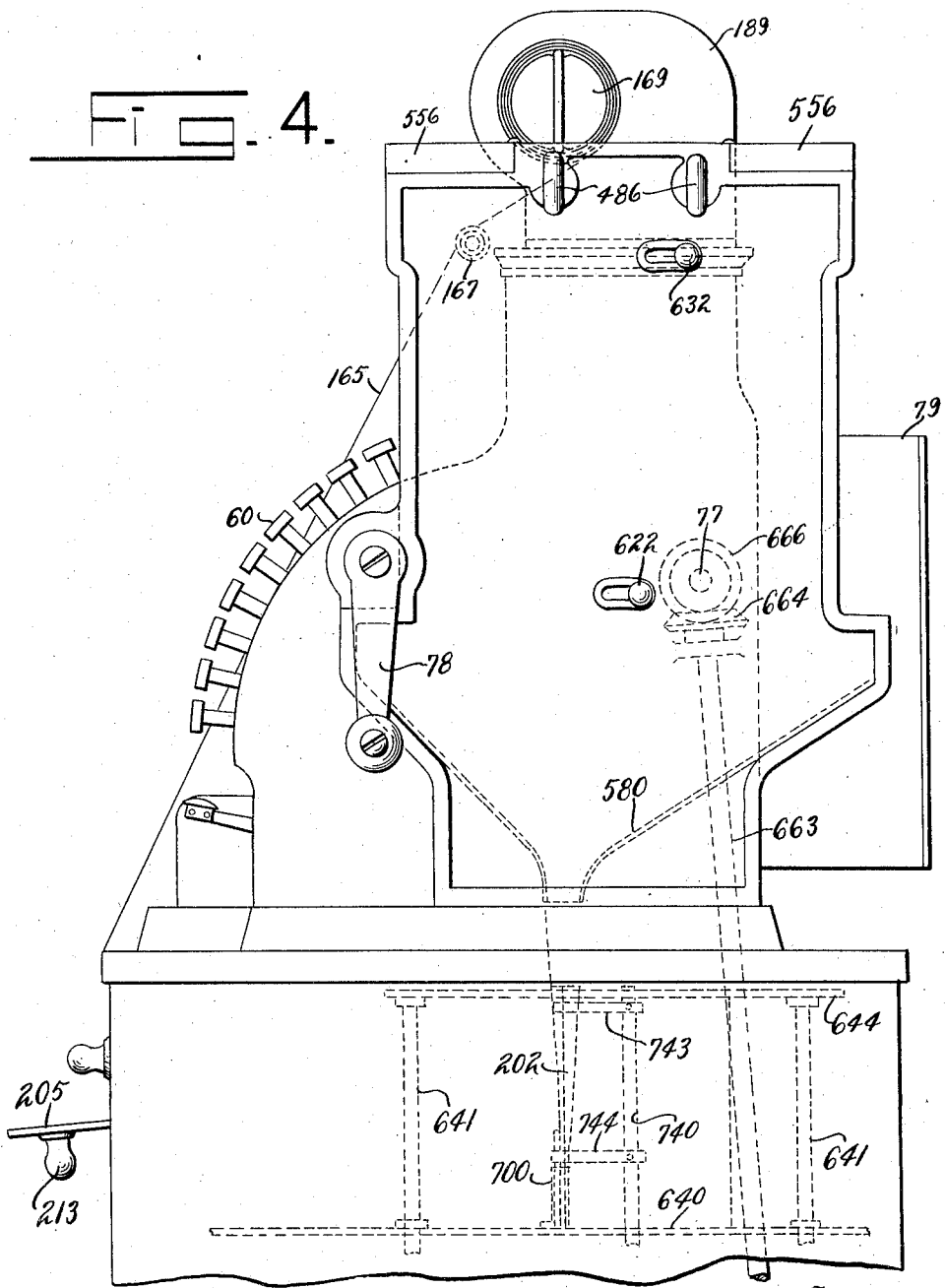

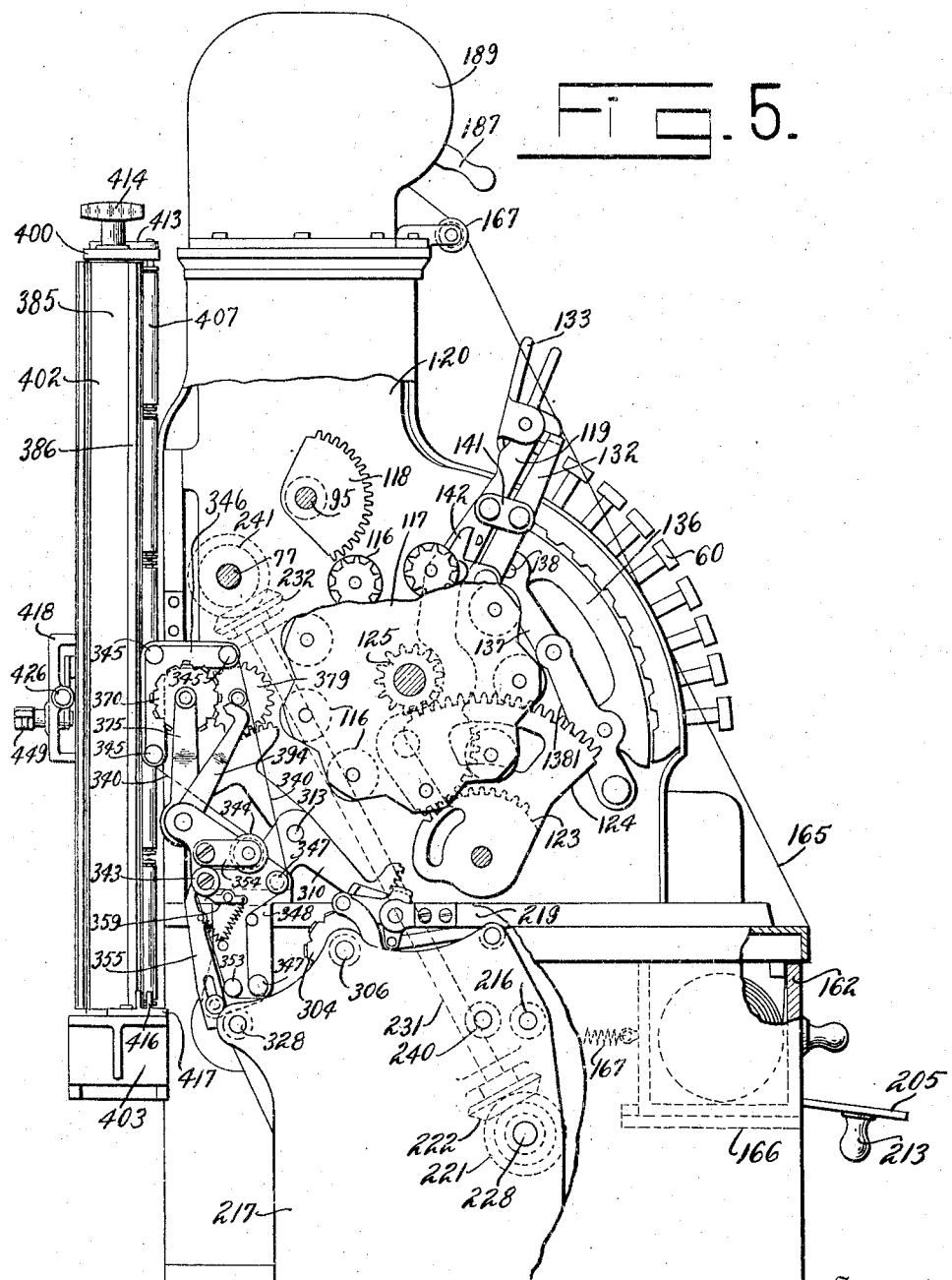

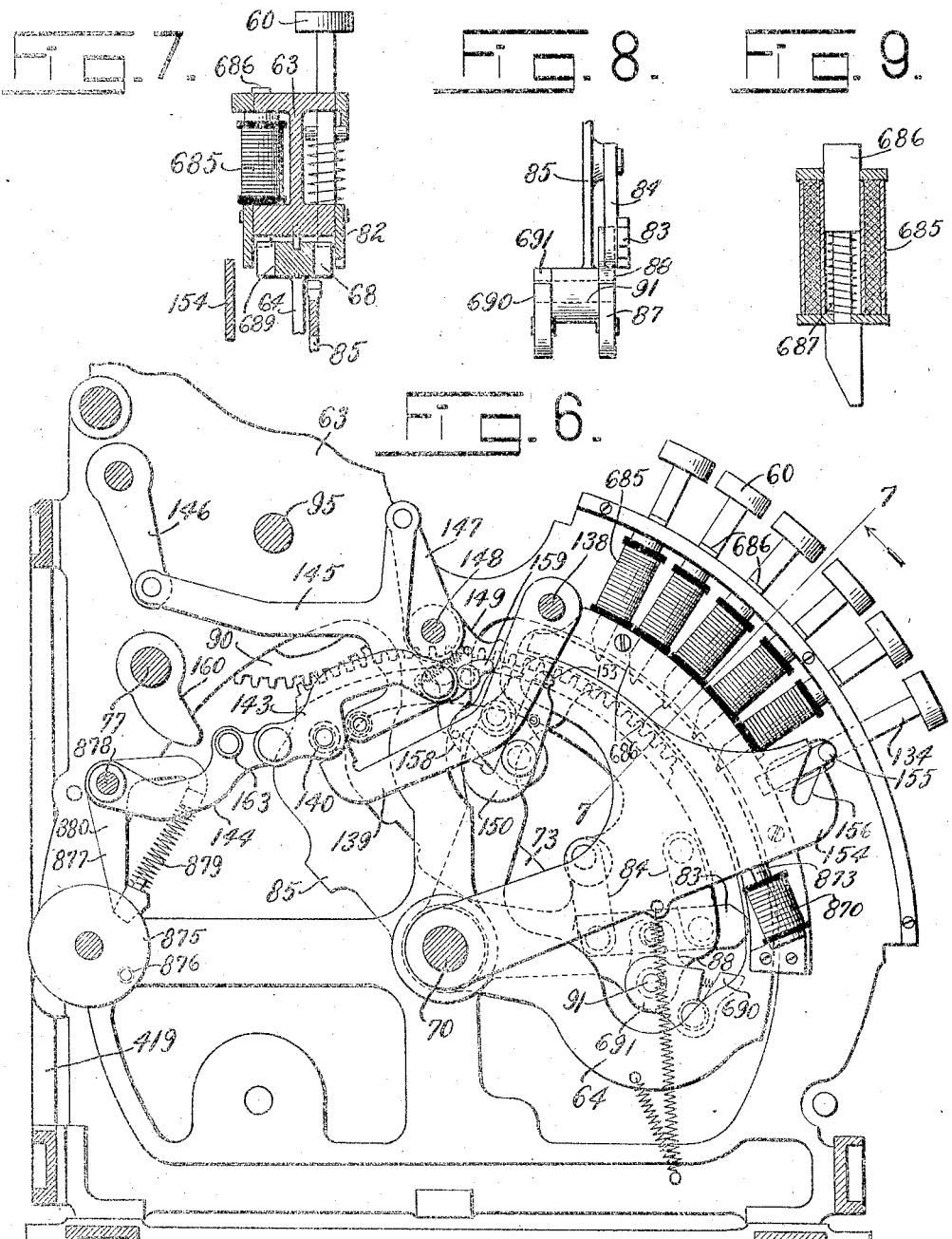

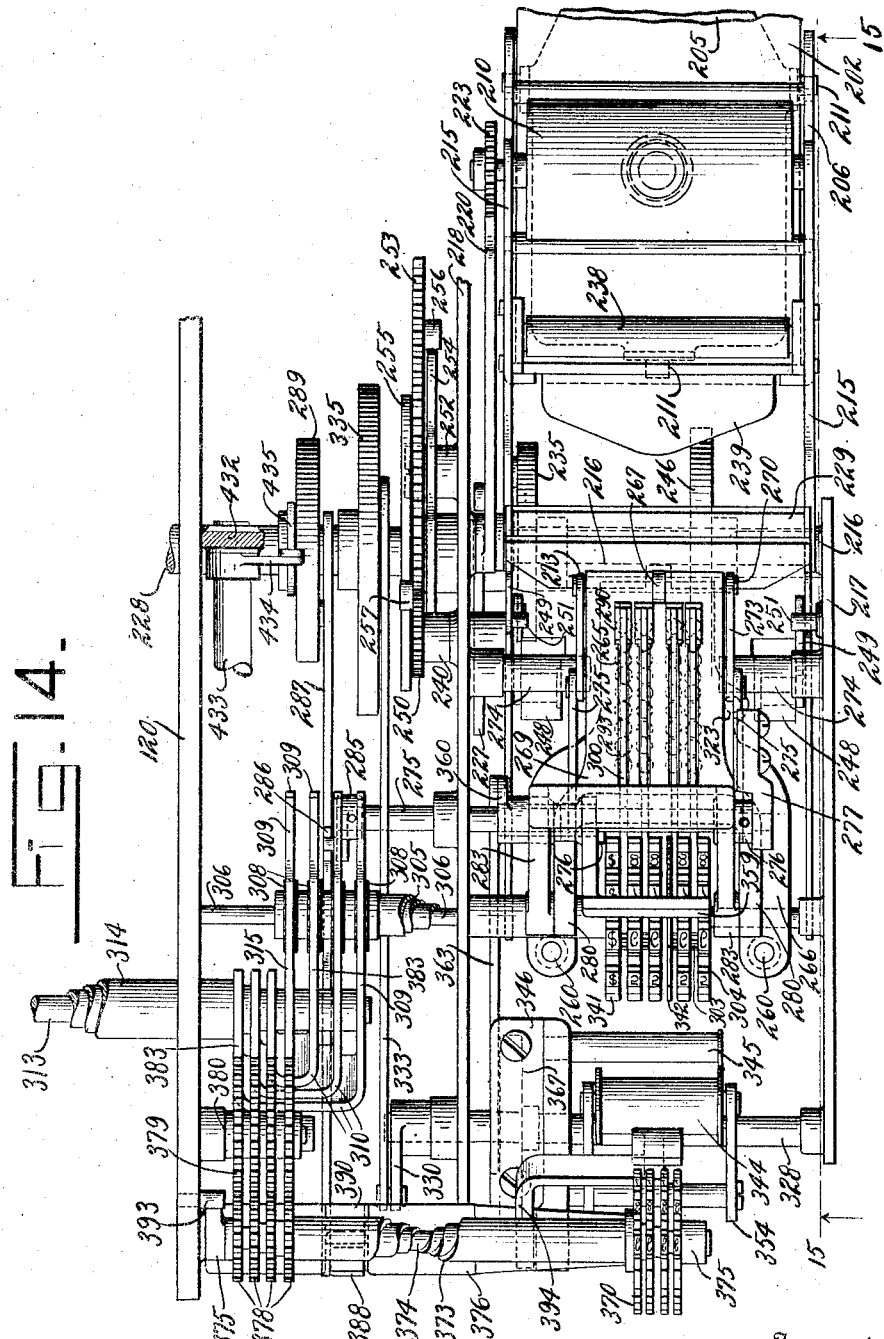

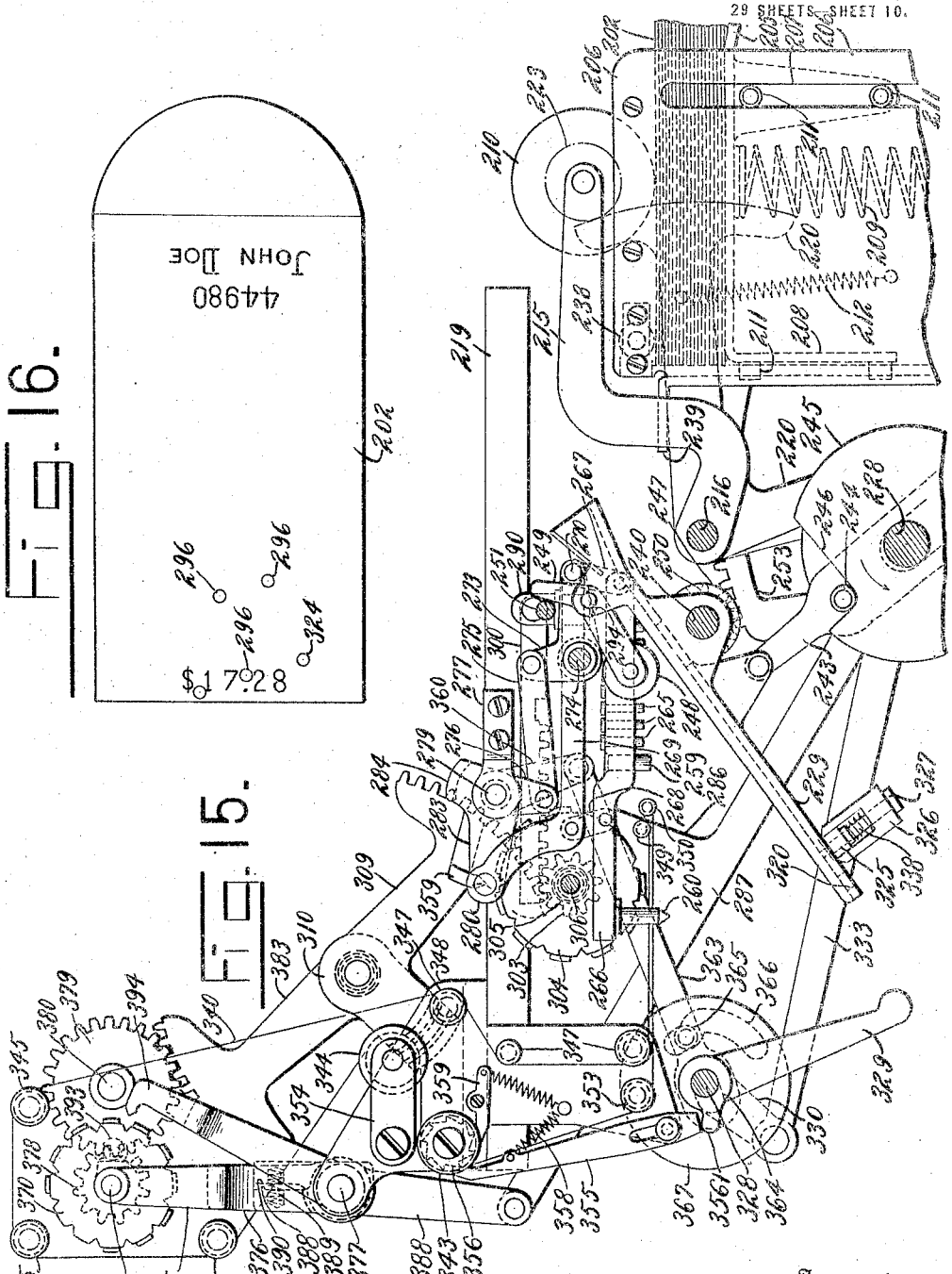

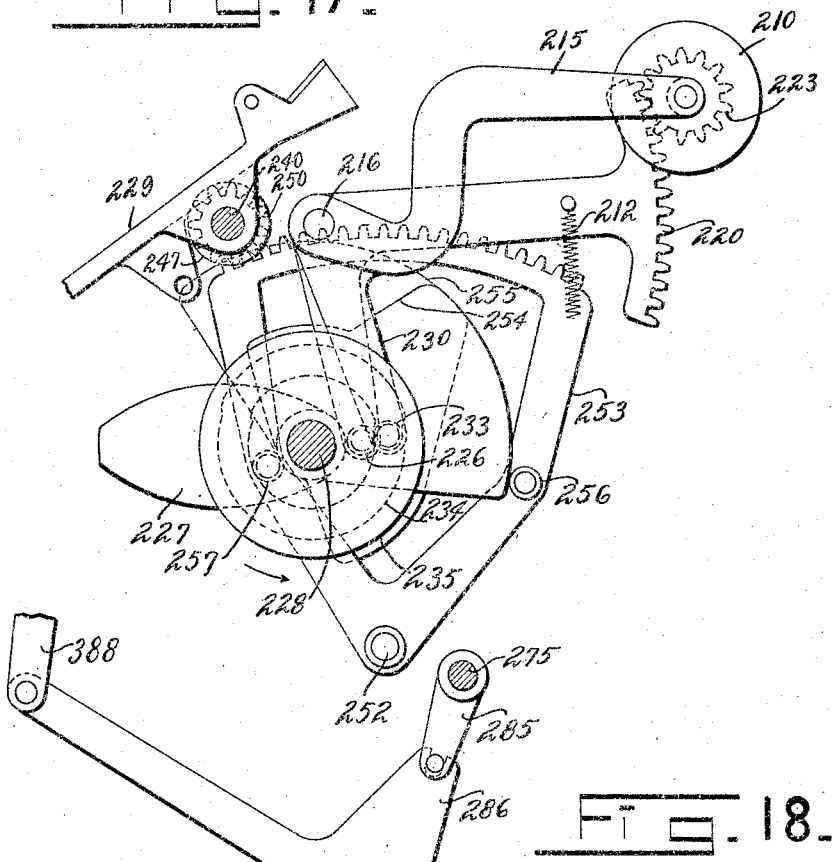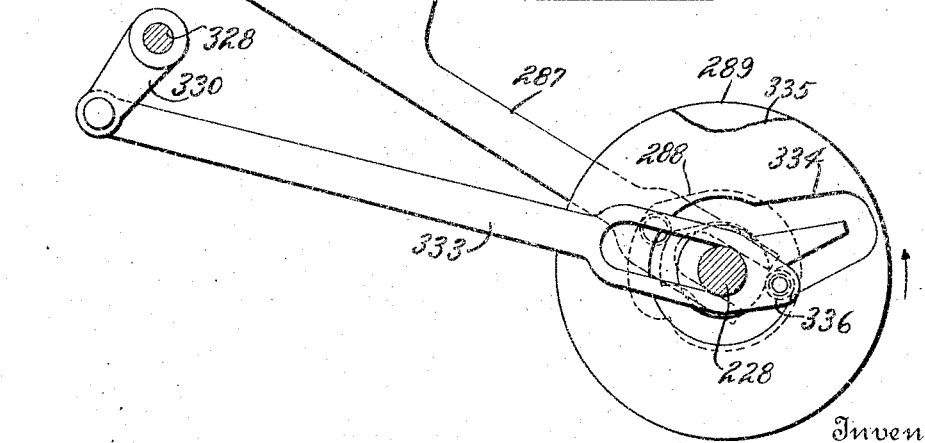

E. J. VON PEIN.
REGISTERING AND MONEY CHANGING MECHANISM.
APPLICATION FILED MAY 29, 1916.
1,290,429.
Patented Jan. 7, 1919.
29 SHEETS—SHEET 12.
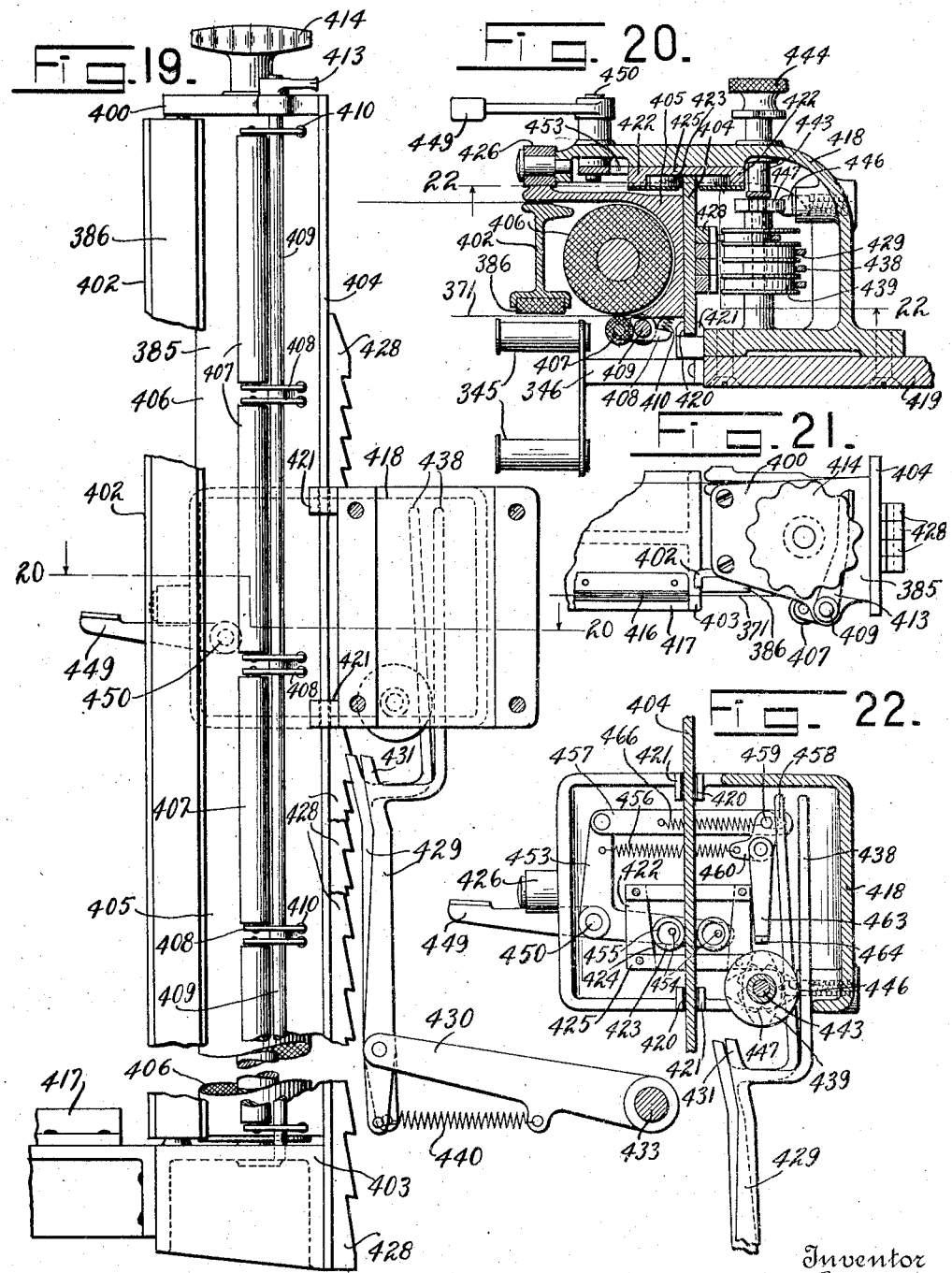
Inventor
Edward J. Von Pein.

E. J. VON PEIN.
REGISTERING AND MONEY CHANGING MECHANISM.
APPLICATION FILED MAY 29, 1916.

1,290,429.

Patented Jan. 7, 1919.
29 SHEETS—SHEET 14.

Inventor
Edward J. Von Pein
by R. Glass
Karl Beust
Attorneys

E. J. VON PEIN.
REGISTERING AND MONEY CHANGING MECHANISM.
APPLICATION FILED MAY 29, 1916.

1,290,429.

Patented Jan. 7, 1919.
29 SHEETS—SHEET 15.

Inventor
Edward J. Von Pein
by
Carl Beust
Attorneys

E. J. VON PEIN.
REGISTERING AND MONEY CHANGING MECHANISM.
APPLICATION FILED MAY 29, 1916.
1,290,429.
Patented Jan. 7, 1919.
29 SHEETS—SHEET 16.
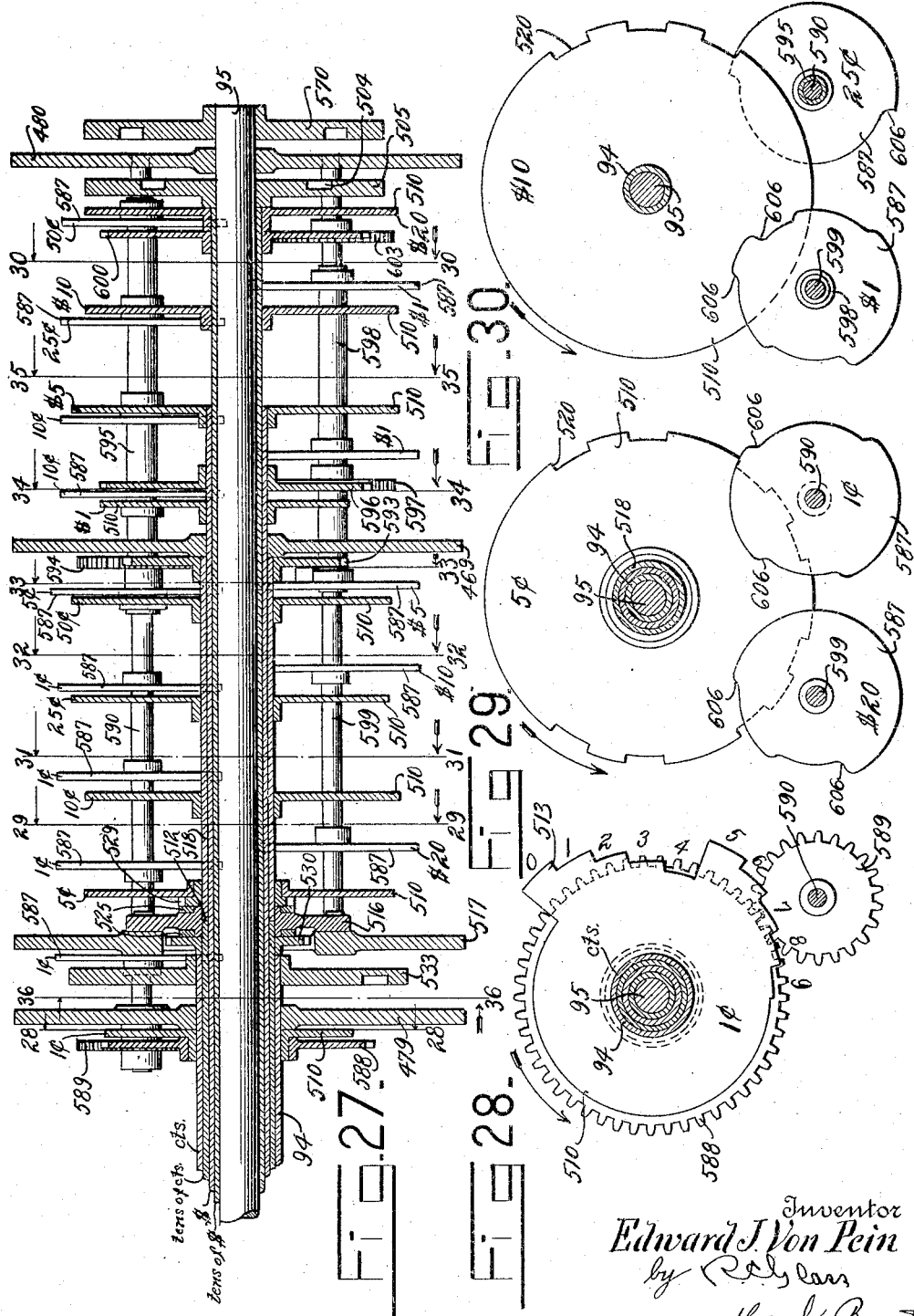
Inventor
Edward J. Von Pein
by
Attorneys

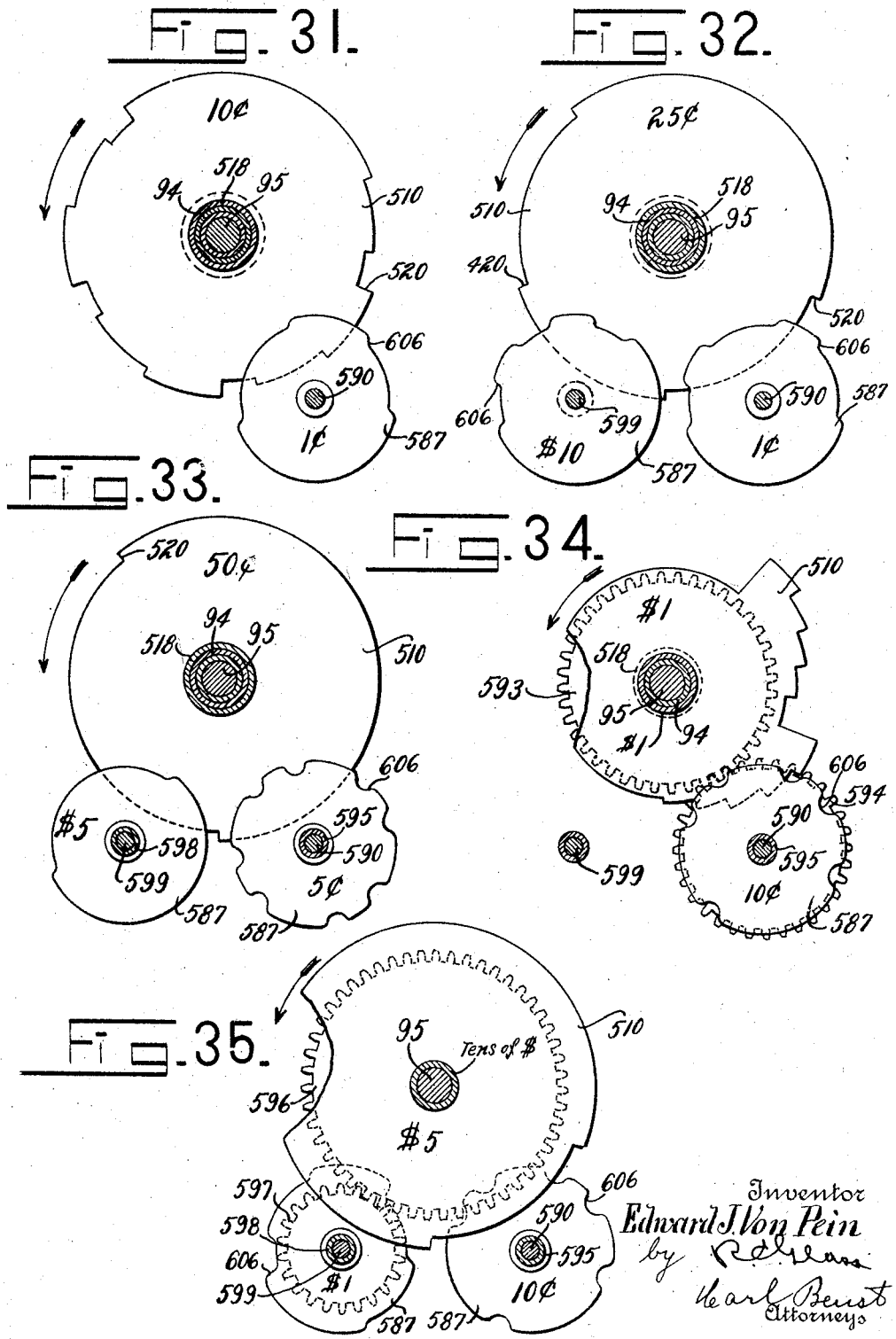

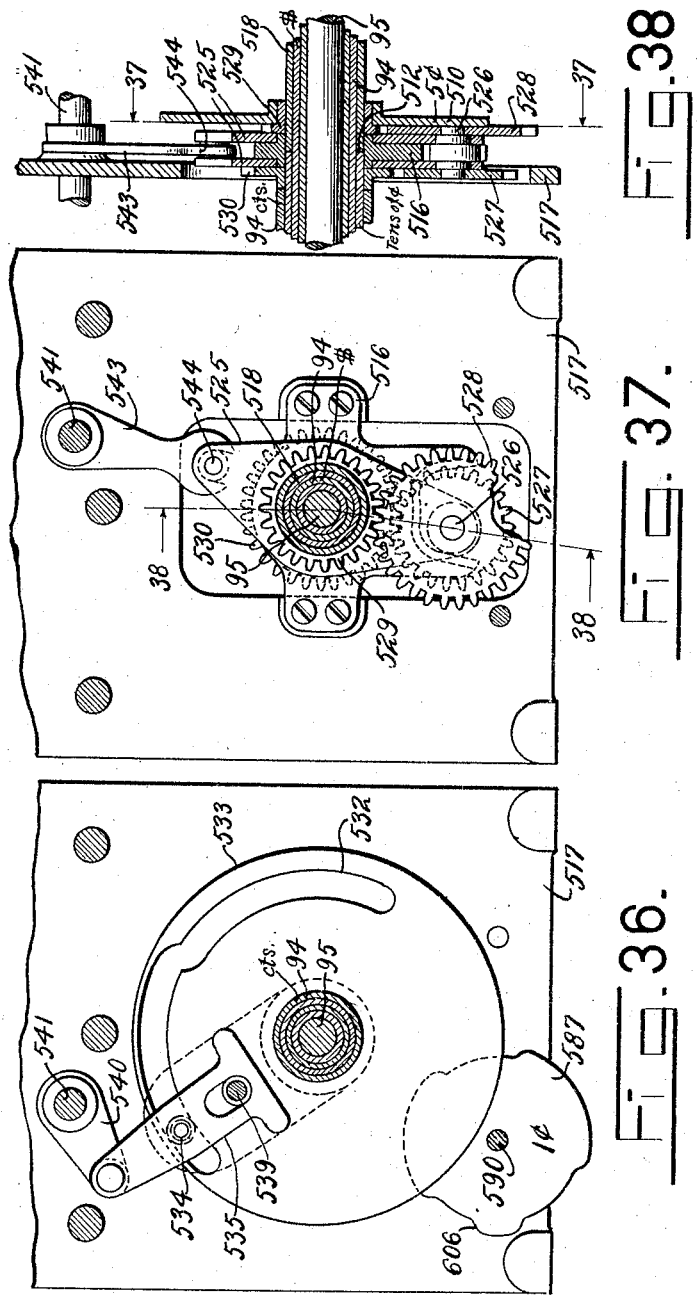

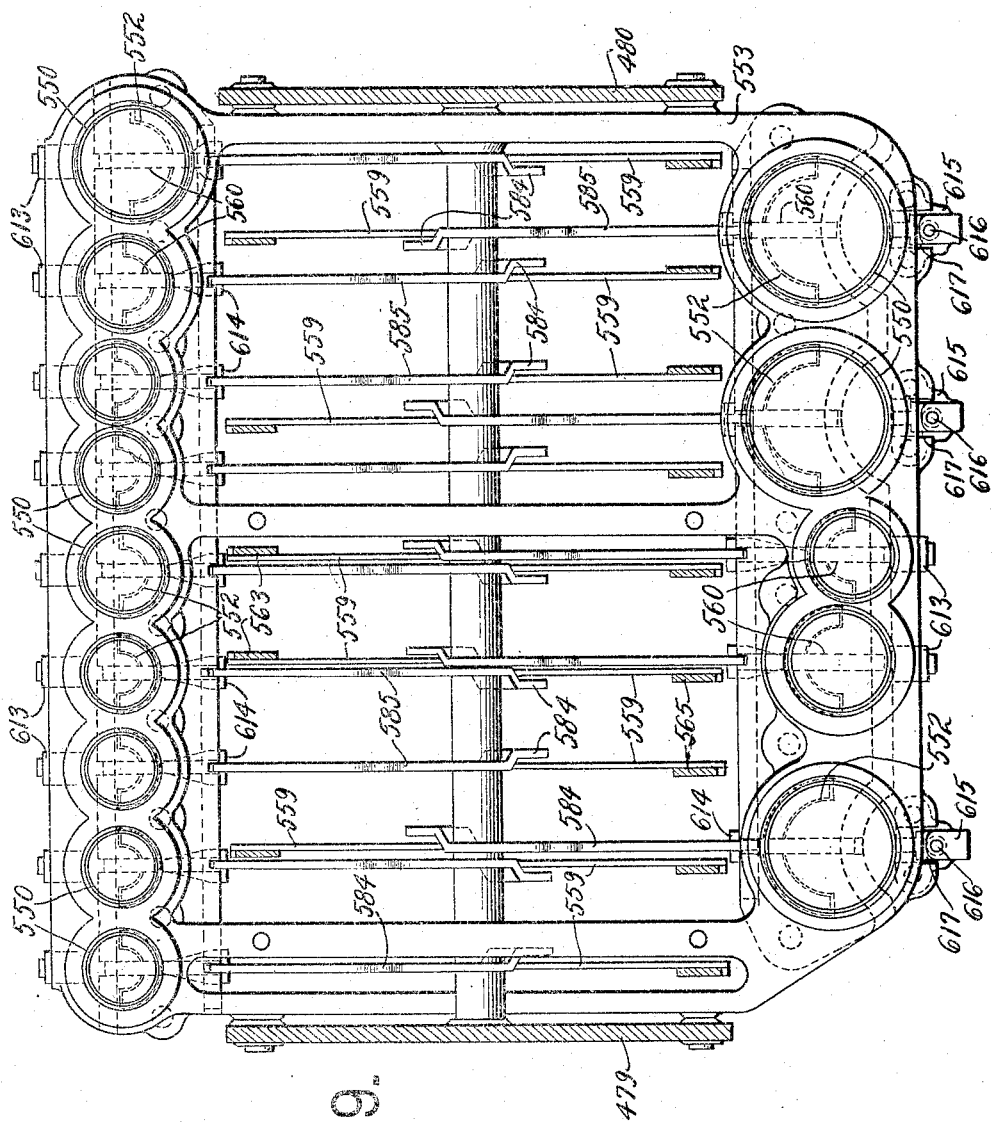

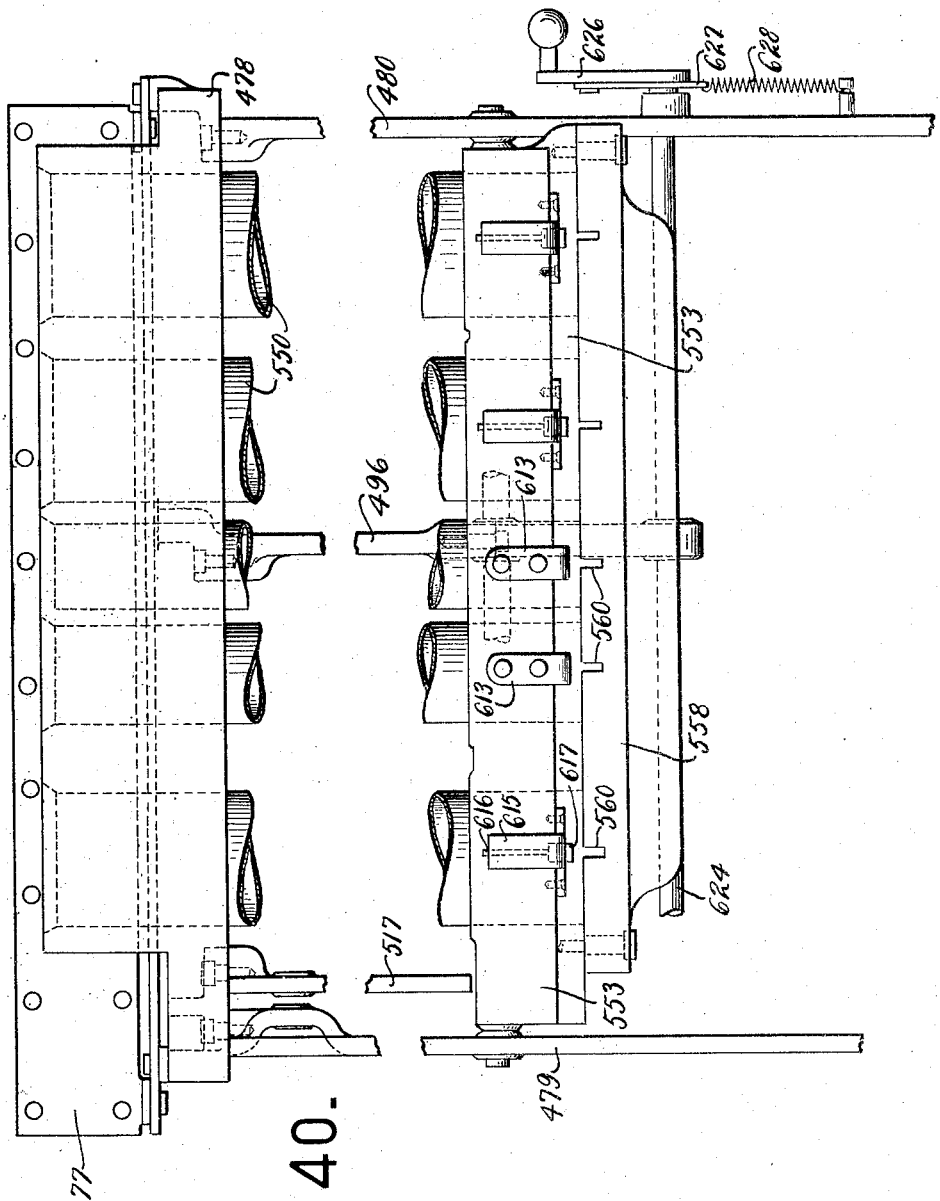

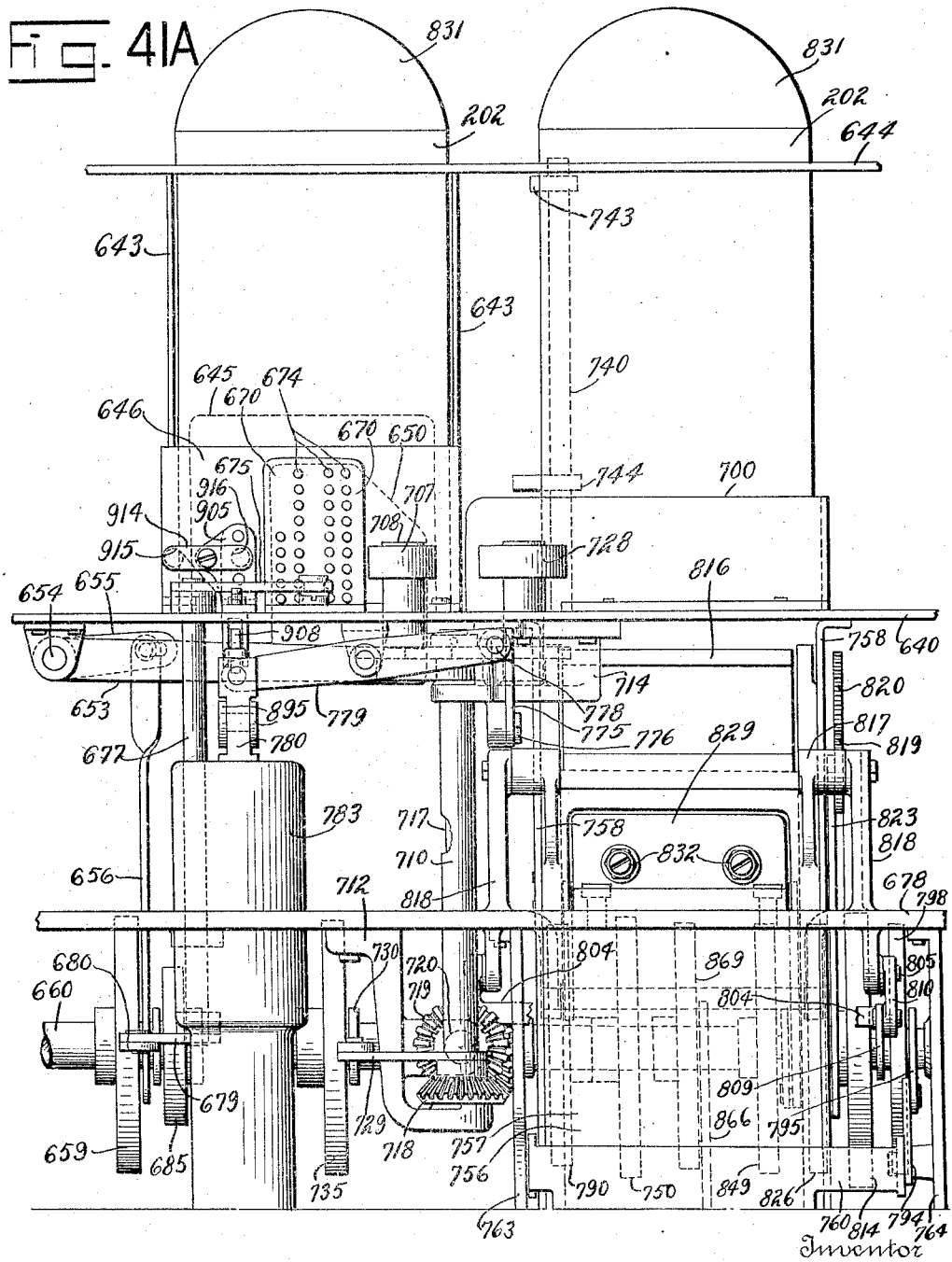

E. J. VON PEIN.
REGISTERING AND MONEY CHANGING MECHANISM.
APPLICATION FILED MAY 29, 1916.
1,290,429.
Patented Jan. 7, 1919.
29 SHEETS—SHEET 22.
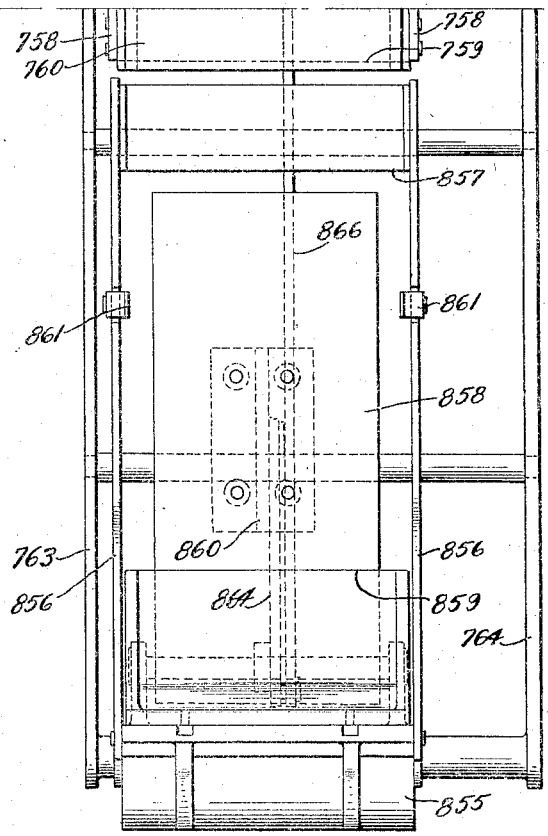
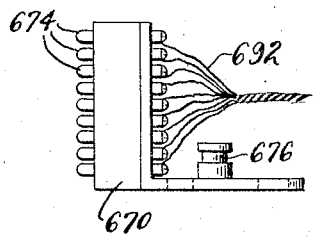
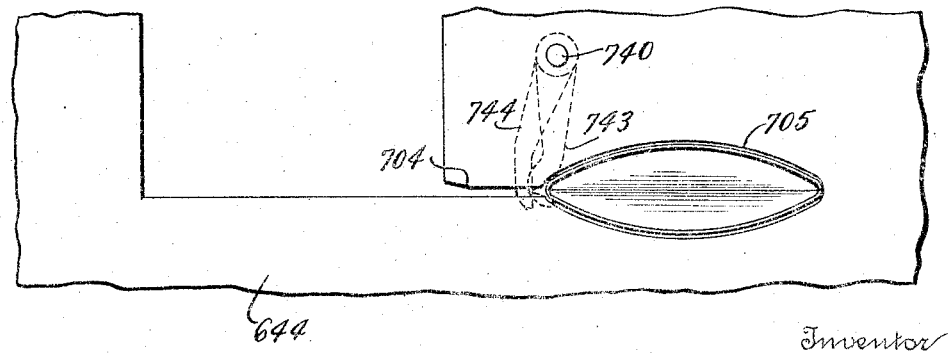
Inventor
Edward J Von Pein.
by
Earl Beust
Attorneys.

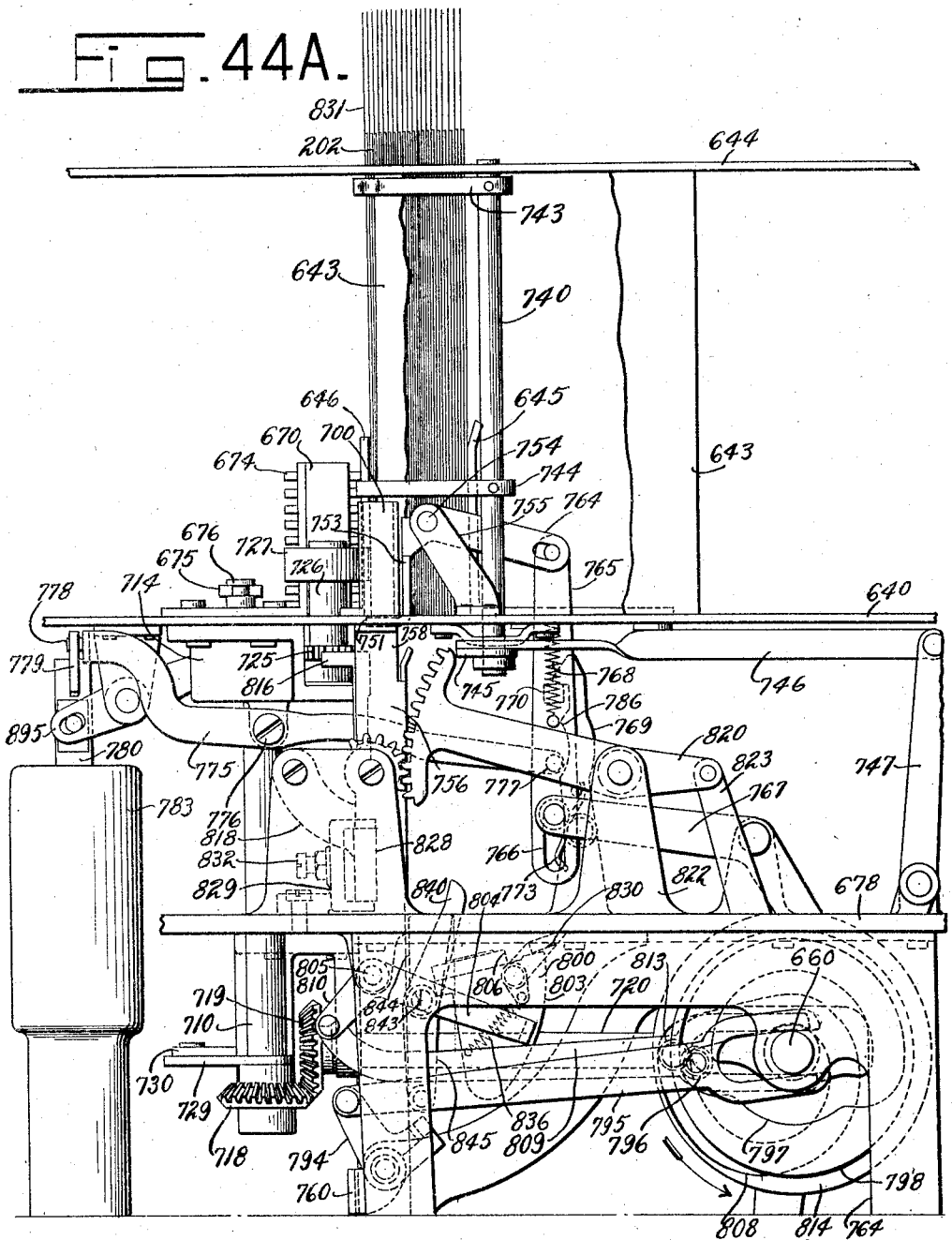

E. J. VON PEIN.
REGISTERING AND MONEY CHANGING MECHANISM.
APPLICATION FILED MAY 29, 1916.

1,290,429.

Patented Jan. 7, 1919.
29 SHEETS—SHEET 24.

Inventor
Edward J. Von Pein
by R. Chylen
Carl Beust
Attorneys

E. J. VON PEIN.
REGISTERING AND MONEY CHANGING MECHANISM.
APPLICATION FILED MAY 29, 1916.
1,290,429. Patented Jan. 7, 1919.
29 SHEETS—SHEET 25.
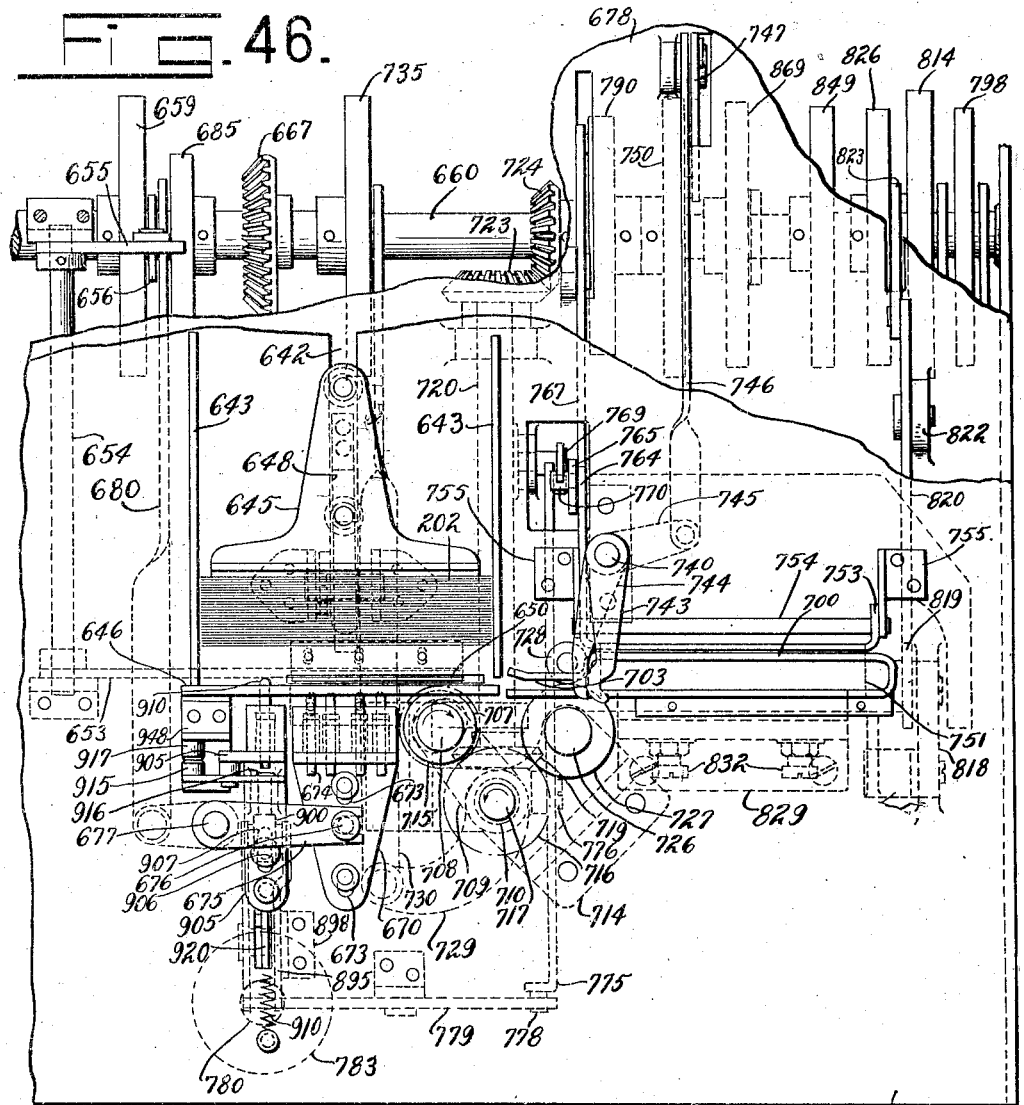
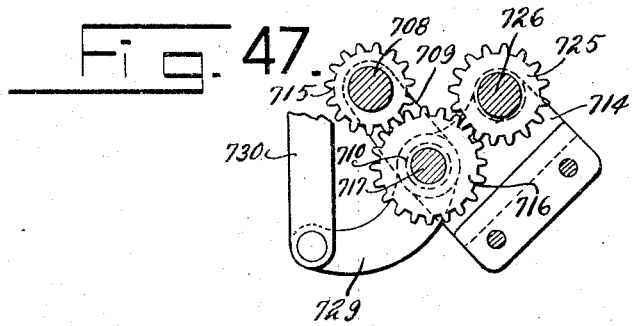

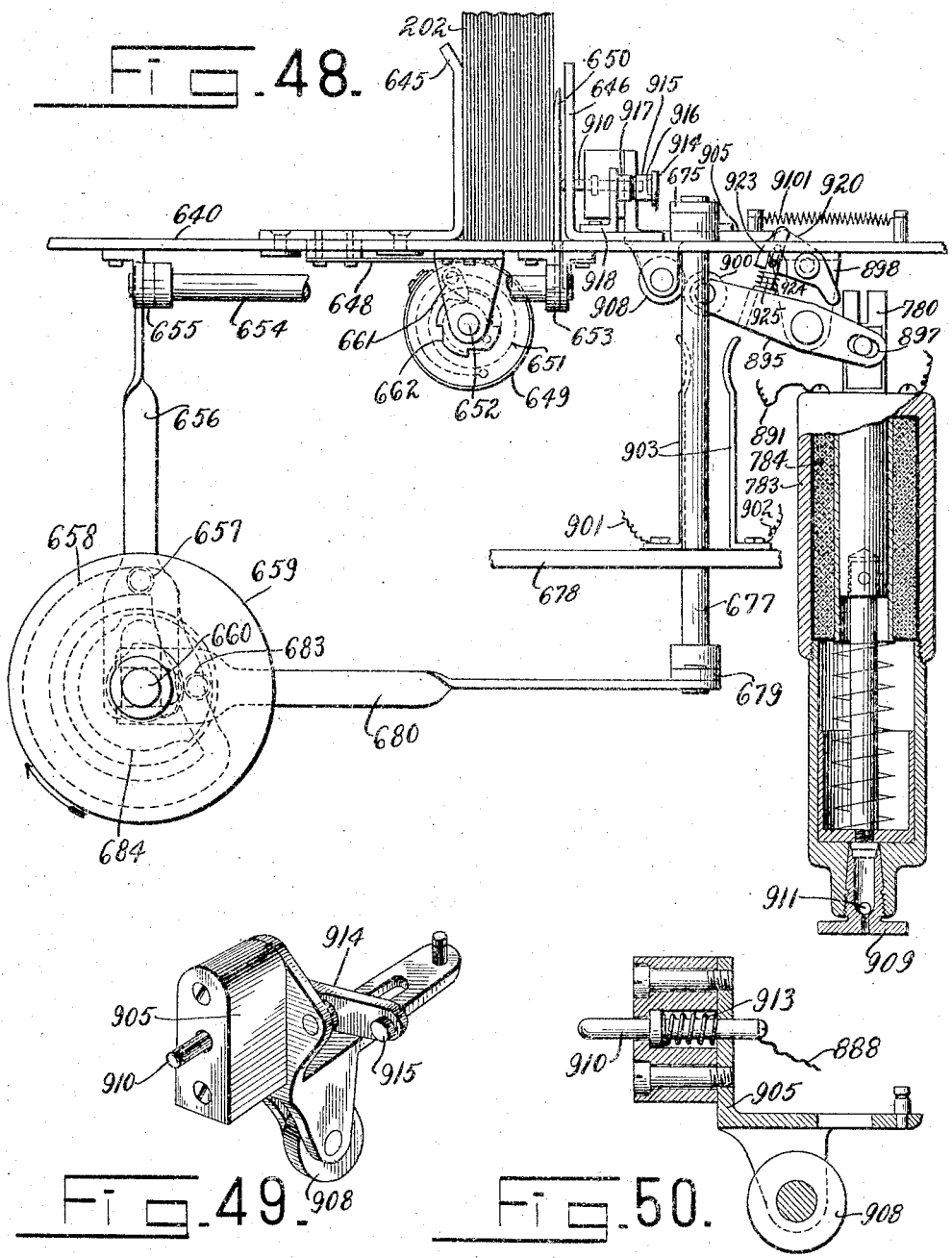

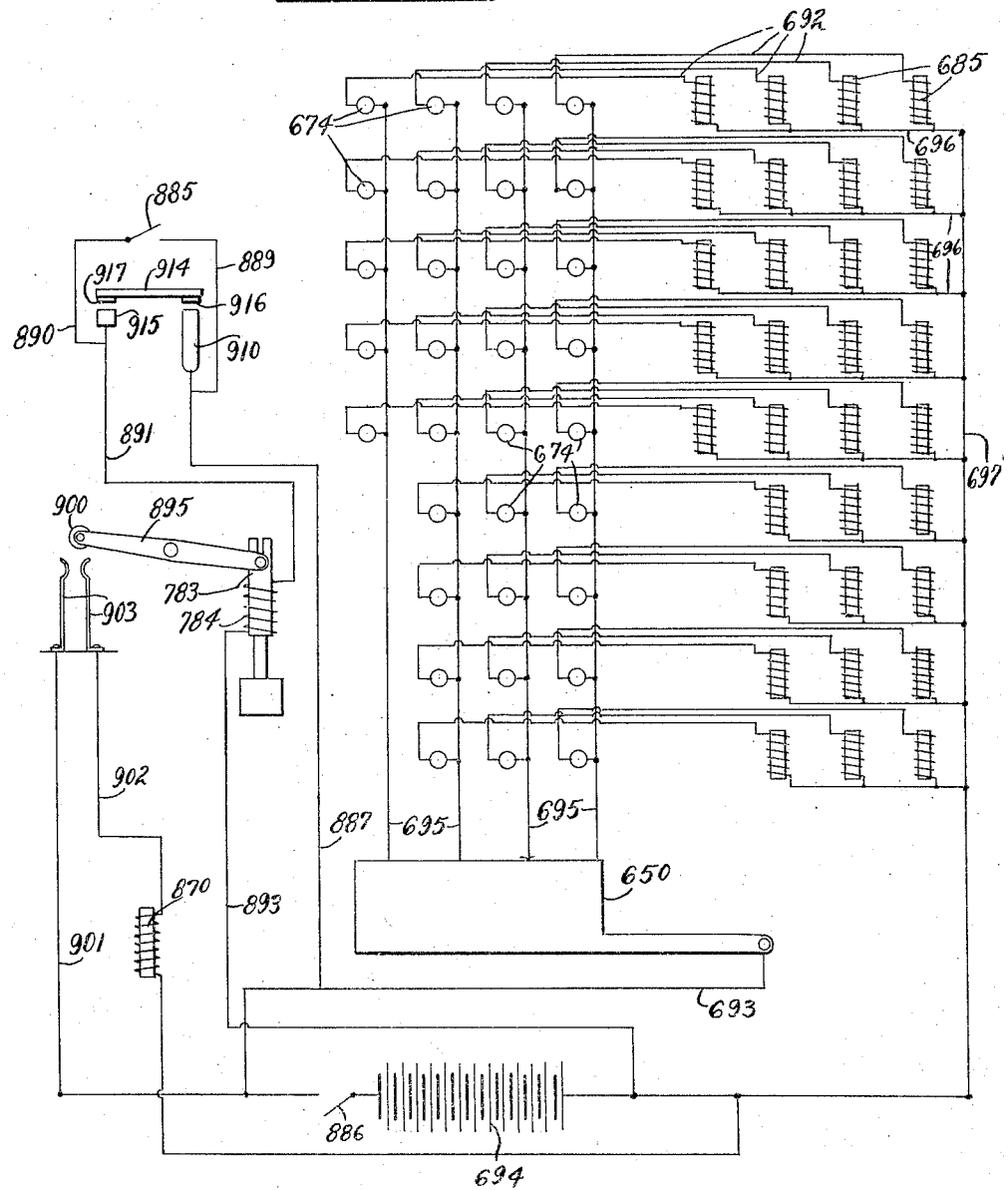

E. J. VON PEIN.
REGISTERING AND MONEY CHANGING MECHANISM.
APPLICATION FILED MAY 29, 1916.
1,290,429.
Patented Jan. 7, 1919.
29 SHEETS—SHEET 28.
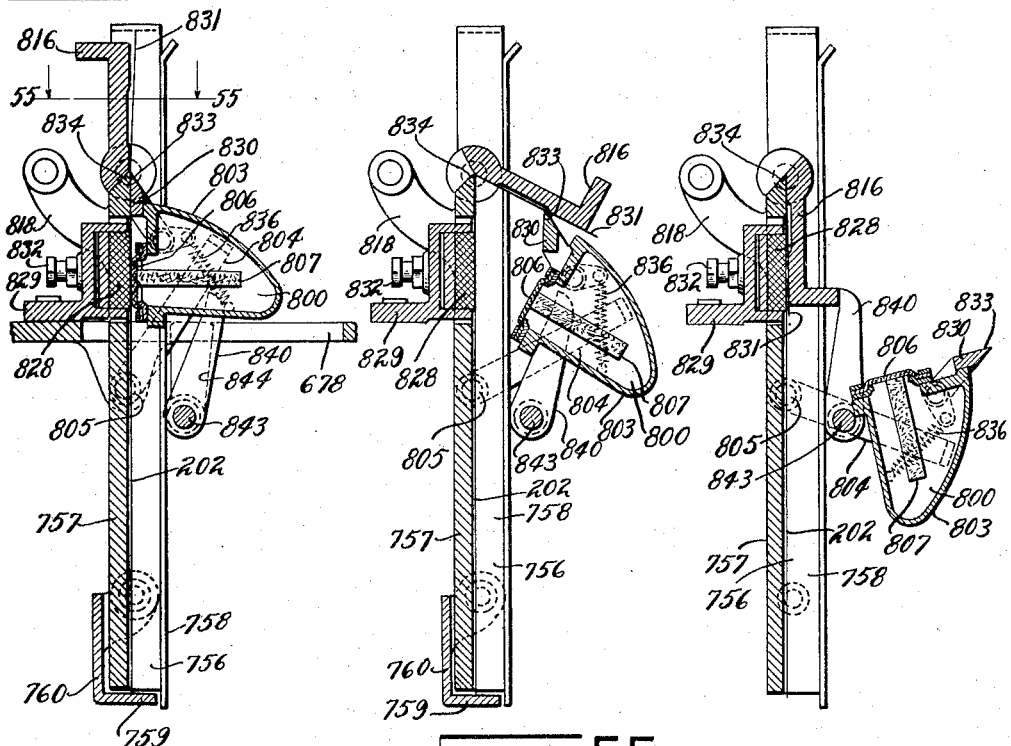
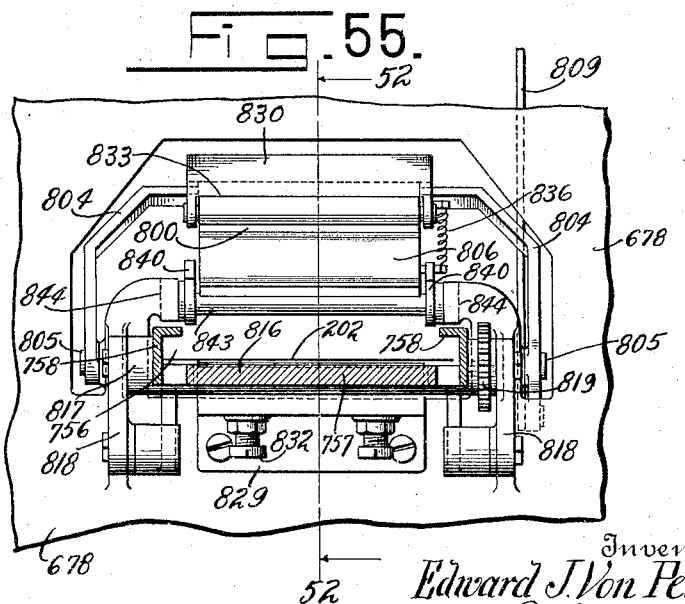
Inventor
Edward J. Von Pein
by R. Chlors
Carl Benst
Attorneys E. J. VON PEIN.
REGISTERING AND MONEY CHANGING MECHANISM.
APPLICATION FILED MAY 29, 1916.
1,290,429.
Patented Jan. 7, 1919.
29 SHEETS—SHEET 29.
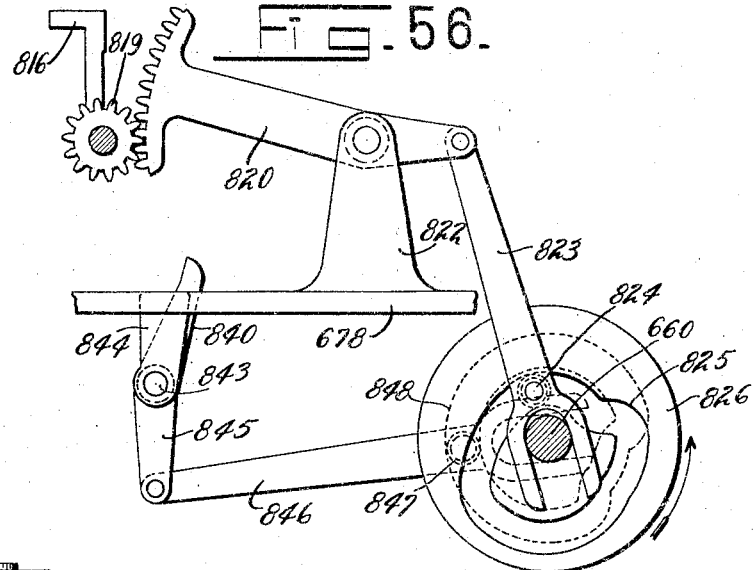
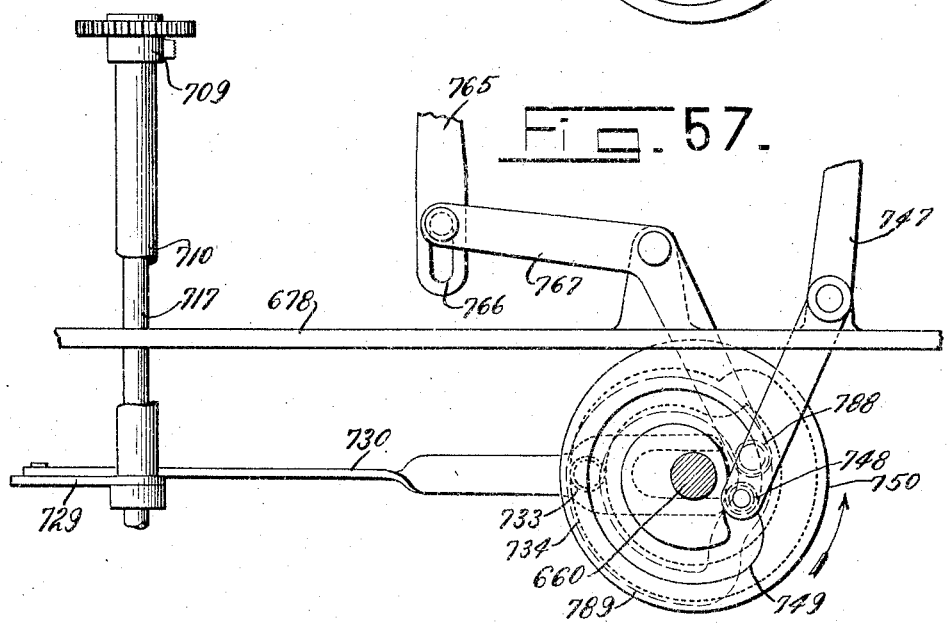
Inventor
Edward J. Von Pein
by R. C. Glaas
Carl Beust
Attorneys

UNITED STATES PATENT OFFICE.

EDWARD J. VON PEIN, OF DAYTON, OHIO, ASSIGNOR TO THE NATIONAL CASH REGISTER COMPANY, OF DAYTON, OHIO.

REGISTERING AND MONEY-CHANGING MECHANISM.

1,290,429.    Specification of Letters Patent.    Patented Jan. 7, 1919.

Application filed May 29, 1916. Serial No. 100,622.

*To all whom it may concern:*

Be it known that I, EDWARD J. VON PEIN, a citizen of the United States, residing at Dayton, in the county of Montgomery and State of Ohio, have invented certain new and useful Improvements in Registering and Money-Changing Mechanism, of which I declare the following to be a full, clear, and exact description.

The present method of analyzing the denominations of currency needed by cashiers and paymasters in large business establishments employing a large number of employees is one of the most troublesome, inefficient and wasteful operations in connection with the making up of the pay-roll. It requires a mental calculation for the cashier or paymaster to segregate in separate lists the number of coins of various denominations included in the earnings of an employee, the entire pay-roll being analyzed in this manner to determine the least number of coins necessary to make up the pay-roll. Furthermore after this information has been secured it requires a considerable number of assistants to fill the pay envelops of the employees and this operation is also slow, troublesome and inaccurate.

The principal objects of this invention therefore are to provide in a machine means adapted to segregate automatically amounts into the required denominations for the purpose of determining the least number of pieces of money necessary and means adapted to fill automatically the pay envelops with the money.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Figures 1ᴬ and 1ᴮ combined constitute a front elevation of the machine embodying the present invention.

Fig. 2 is a transverse vertical section taken through the register which is of the type shown and described in Letters Patent of the United States, No. 580,378, granted April 13, 1897, to J. P. Cleal and F. A. Reinhard, and to which the present invention has been applied.

Fig. 3 is a detail sectional view through the indicating mechanism the section being taken on the line 3—3 of Fig. 2.

Fig. 4 is the right hand side elevation of the machine.

Fig. 5 is a left hand side view of the machine with various parts of the cabinet and mechanism broken away and removed.

Fig. 6 is a transverse vertical section taken along the left hand side of the left hand key bank of the register and looking toward the right.

Fig. 7 is a detail sectional view taken on the line 7—7 of Fig. 6 and looking in the direction of the arrow.

Fig. 8 is a detail front view of the latch mechanism carried by one of the actuating segments of the register.

Fig. 9 is a detail sectional view taken through one of the electro-magnets, energized under the control of the perforations in the pay envelops for controlling the actuating segments of the register.

Fig. 10 is a detail left hand side view of the feeding mechanism for the adding machine strip, with the cabinet of the machine shown in section.

Fig. 11 is a detail front view of the mechanism shown in Fig. 10, with the hood or casing for the means for operating the storage roll partly broken away.

Fig. 12 is a detail side view of part of the mechanism shown in Figs. 10 and 11.

Fig. 13 is a full sized sectional view of a clutch device of the feeding mechanism for the adding machine strip. The section is taken on the line 13—13 of Fig. 11.

Fig. 14 is a detail top plan view of the printing mechanisms and the mechanism for perforating the pay envelops. In this view the base of the register has been omitted.

Fig. 15 is a detail sectional view taken on the line 15—15 of Fig. 14 and looking in the direction of the arrows.

Fig. 16 is one of the pay envelops which has been perforated and printed upon by the machine of the present invention.

Fig. 17 is a detail side view of the mechanism for feeding the pay envelops from a magazine into position to be printed and perforated.

Fig. 18 is a detail side view of the cams and pitmen for operating the impression and means of the printing mechanisms and for lowering the punches, adapted to perforate the pay envelops.

Fig. 19 is a detail front view of the carriage for the ledger sheets.

Fig. 20 is a cross sectional view taken on the line 20—20 of Fig. 19 and looking in the direction of the arrows.

Fig. 21 is a detail top plan view of the carriage for carrying the ledger sheets.

Fig. 22 is a transverse sectional view taken on the line 22—22 of Fig. 20 and looking in the direction of the arrows.

Fig. 27 is a detail longitudinal section taken on the line 27—27 of Fig. 25 and looking in the direction of the arrows.

Fig. 28 is a detail cross section taken on the line 28—28 of Fig. 27 and looking in the direction of the arrows.

Fig. 29 is a detail cross section taken on the line 29—29 of Fig. 27 and looking in the direction of the arrows.

Fig. 30 is a detail cross section taken on the line 30—30 of Fig. 27 and looking in the direction of the arrows.

Fig. 31 is a detail cross section taken on the line 31—31 of Fig. 27 and looking in the direction of the arrows.

Fig. 32 is a detail cross section taken on the line 32—32 of Fig. 27 and looking in the direction of the arrows.

Fig. 33 is a detail cross section taken on the line 33—33 of Fig. 27 and looking in the direction of the arrows.

Fig. 34 is a detail cross section taken on the line 34—34 of Fig. 27 and looking in the direction of the arrows.

Fig. 35 is a detail cross section taken on the line 35—35 of Fig. 27 and looking in the direction of the arrows.

Fig. 36 is a detail cross section taken on the line 36—36 of Fig. 27 and looking in the direction of the arrows.

Fig. 37 is a detail cross section taken on the line 37—37 of Fig. 38 and looking in the direction of the arrows.

Fig. 38 is a detail sectional view taken on the line 38—38 of Fig. 37 and looking in the direction of the arrows.

Fig. 39 is a detail cross sectional view taken on the line 39—39 of Fig. 25 and looking in the direction of the arrows. In this view the money tubes are not sectioned.

Fig. 40 is a detail front view of the coin tubes and the frame supporting the same. The frame and tubes are partly broken away.

Fig. 41$^A$ and 41$^B$ combined comprise a detail front view of the mechanism under the coin ejecting mechanism. The mechanism in these figures is employed to feed the envelops into filling position and seal the same.

Fig. 42 is a detail side view of the frame and contact pins adapted to coöperate with the perforations in the pay envelops for the purpose of controlling the differential mechanism of the machine.

Fig. 43 is a detail top plan view of part of of the plate provided with an oval slot in which the upper ends of the envelops are adapted to fit when the envelops are open.

Figure 44B:
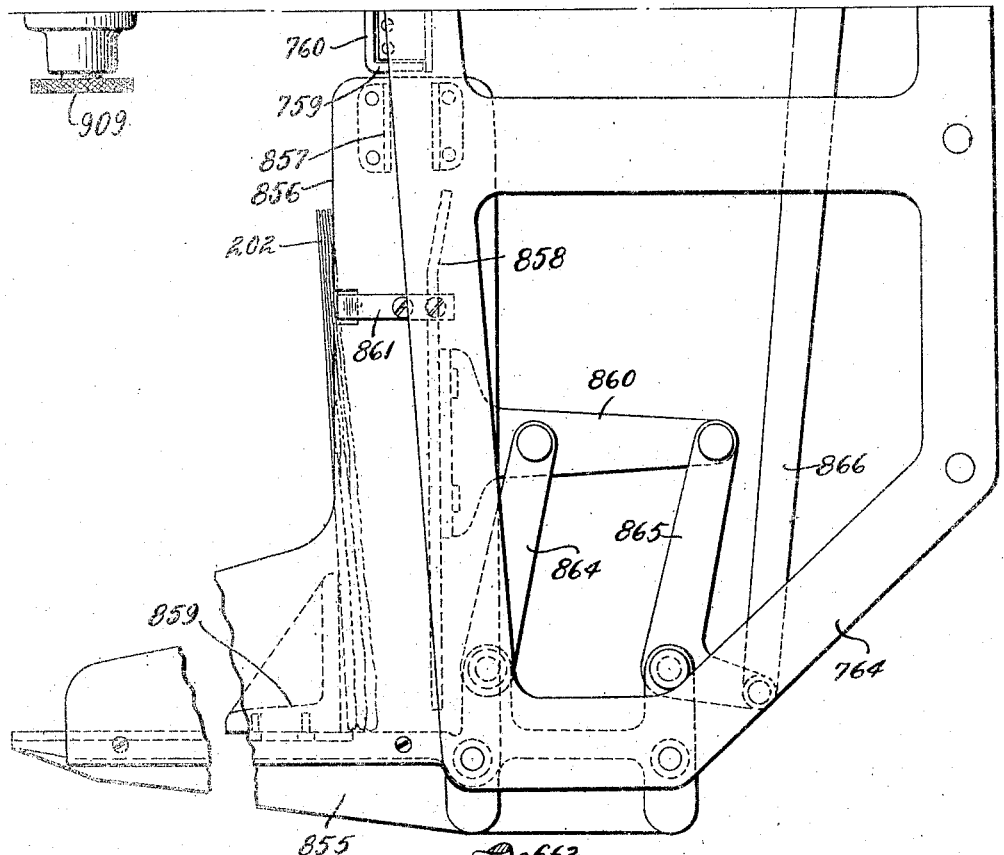

Figs. 44$^A$ and 44$^B$ combined comprise a detail side view of the mechanism shown in Figs. 41$^A$ and 41$^B$.

Figure 45:
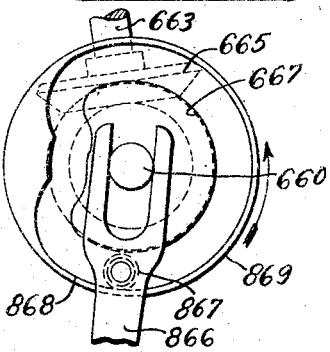

Fig. 45 is a detail view of the cam for operating the device for moving the envelops forward on the receiving table after the envelops have been filled with money.

Fig. 46 is a detail top plan view of the mechanism shown in Fig. 41$^A$ with the plate shown in Fig. 43 removed.

Fig. 47 is a detail cross sectional view showing part of the means for operating the feeding rollers which feed the envelops into the filling chamber.

Fig. 48 is a detail left hand side view showing the envelop magazine under the money ejecting mechanism, and the device for controlling the releasing of the machine while the envelops are being filled.

Fig. 49 is a detail prospective view of the device adapted to coöperate with the envelops to complete an electric circuit and thereby effect operation of the means controlling the release of the machine.

Fig. 50 is a detail cross sectional view taken through the device shown in Fig. 49.

Fig. 51 is a diagrammatical view of the various electric circuits employed in the present invention.

Figs. 52, 53 and 54 are vertical sections taken on the lines 52—52 of Fig. 55, and looking in the direction of the arrows. In these views the moistener and folder are shown in different operated positions.

Fig. 55 is a detail sectional view taken on the line 55—55 of Fig. 52 and looking in the direction of the arrows.

Fig. 56 is a detail side view of the mechanism for operating the envelop flap folder and sealer.

Fig. 57 is a detail view of certain cams and connections for operating a feeding roller, the envelop opener and the door of the filling chamber.

In order that the detailed description, which is to follow, may be better understood a general statement of the functions performed by the improved machine and a general description of the mode of operation thereof will be given here. The invention has been shown applied to the type of machine fully shown and described in the above mentioned Cleal and Reinhard patent together with the United States patents to Thos. Carroll No. 703,639, granted July 1, 1902, but it is to be understood that the invention may be applied to many other types of machines and that therefore it is not intended to limit the invention to the specific application shown in the drawings.

An addressograph or similar machine and an adding machine of any desired types are used in connection with the present invention. The addressograph is employed to print the employees' names and check numbers on the pay envelops. The adding machine is used to print the number of each piece worker and time worker on a detail strip. It is usual for piece workers to make out separate slips or tickets for various pieces of work performed and for time workers to make out a ticket for each day, specifying the time worked and the amount earned. The amounts of these tickets are separately listed opposite the corresponding employees' numbers on the adding machine strip and the total of each list printed by the adding machine. The employees' numbers are printed on the strip in the same order as the addressograph prints the employees' numbers and names on the pay envelops.

The envelops are stacked in a magazine in the machine of the present invention and an envelop is fed into position to be printed upon at each operation of the machine. The adding machine or detail strip is attached to the machine and is fed upon each operation so that during the operation the pay envelop of the employee, whose number appears at the reading line on the detail strip, is moved into position to be printed and perforated by the printing and perforating mechanisms.

The machine is provided with keys which are operated in accordance with the earnings due the employees, the amounts being read off of the detail strip, if the employees are time or piece workers. The earnings of day workers, working on a weekly salary basis, are read directly from records which are filled out by hand. These keys control the printing and perforating mechanisms. One printing mechanism is adapted to print the total amount of the earnings on the envelops while the punching mechanism is adapted to perforate holes in the envelops in various positions to represent the amount. Another printing mechanism is employed to print the totals on the time workers' and piece workers' ledger sheets, which are retained as records by the paymaster.

The keys also control the actuating mechanism for a plurality of denominational counters. There is one of these counters for each denomination of money required to make up the pay-roll. In the present invention there is one of these counters for the "cents", "nickels", "dimes", "quarters", "half dollars", "dollars", "five dollar gold pieces", "ten dollar gold pieces" and "twenty dollar gold pieces", it being understood that these counters may be used to represent any desired denomination of coins or paper money. The counters are constructed to register the total value of the coins of each denomination but it will be obvious from the following description that they may be employed to register the number of coins of each denomination if desired. The operating mechanism for the denominational counters is so constructed that the counters will be actuated to register the value of the least number of coins required. The number of coins required can then, easily be determined by dividing the total on each counter by the value of the corresponding coin.

After the machine has been used to print on and perforate the pay envelops, print on the ledger sheets and determine the value of the least number of coins of various denominations required the counter actuating mechanism is disabled. Money is placed in coin tubes and the envelops are placed in a magazine or holder under the money ejecting mechanism. Upon each operation of the machine an envelop controls the energization of electro-magnets which limit the extent of movement of the differential mechanism controlled by the manually operated keys during operations in which the envelops are printed and perforated, as above described. This differential mechanism also positions members or disks which control the operation of ejectors for ejecting coins from the coin tubes. After an envelop has controlled the energization of the above mentioned electro-magnets it is moved into position under a chute through which the coins fall after being ejected from the coin tubes, the envelops being opened to receive the money while in this position. After the envelop has been filled it is allowed to drop into a sealing chamber where the mucilage on the envelop is moistened and the flap turned down to seal the envelop.

When the machine is being operated to print and perforate the pay envelops the machine is released for each operation by a manually operated motor key but when the envelops are being filled with coins the machine is automatically released. The machine stops automatically after the last envelop in the magazine has been filled.

The detailed description of the machine will be divided under two main headings. The first heading will be "Perforating, printing and accounting". The second heading will be "Filling and sealing the envelops". Under these headings will be sub-headings.

1. *Perforating, printing, and accounting.*

Under this heading the register, the perforating mechanism, the printing mechanisms and the totalizing mechanisms will be described.

*a. Register.*

Manipulative devices, such as keys 60, (Figs. 1^A, 1^B and 2) are arranged in banks, each bank being mounted on one of the supporting frames 63 (Figs. 2, 6 and 7) of the register. These keys when depressed against the tension of their springs are latched in depressed position by the detents 64, there being one detent for each bank of keys, as fully shown and described in the above mentioned Cleal and Reinhard and Carroll patents. The forward ends of the detents 64 are elevated when the keys are depressed and the detents are locked in elevated position during operation of the machine by latch plates 65 (Fig. 2) which are moved rearwardly by their springs to carry their shoulders 67 under the forward ends of the detents when the latter are raised. To raise the detents the keys coöperate with grooves 68 (Figs. 2 and 7) formed in the right hand sides of the circular portions of the detents.

Fast on a shaft 70 (Fig. 2) are driving segments 73, one for each bank of keys. The shaft 70 is rocked counter-clockwise (Fig. 2) about 90° and then clockwise to normal by a shaft 77 through an arm 74 connected by a link 75 to a crank 76 fast on the shaft 77. The shaft 77 is given one complete rotation in the direction of the arrow upon each operation of the machine either by a crank 78 (Figs. 1^B and 4) or by an electric motor, which is not shown, but which is mounted on the back of the machine within a hood or casing 79 (Fig. 4). This motor and its driving connections to the shaft 77 are not shown in the drawings but a full description of the same may be had by reference to Patent No. 996,814, granted July 4, 1911 to Edw. J. Von Pein, or Patent No. 1,144,418, granted June 29, 1915 to Chas. F. Kettering and Wm. A. Chryst. The connections from the crank handle to the shaft 77 are also not shown in the drawings as such connections are well known in the art. It is preferable to operate the machine by the electric motor and it will be considered as being so operated in the present description.

When the shaft 70 and segments 73 are rocked counter-clockwise (Fig. 2) shoulders 80 on the segments are engaged by projections on the rear ends of latches 83 when the shoulders are brought opposite the projections. The latches 83 are hung on links 84, pivoted on corresponding actuating segments 85 loose on shaft 70. Upon clockwise movement of the segments 73 the actuating segments 85 are carried with the segments 73 distances determined by the value of the keys depressed, the inner ends of the depressed keys being adapted to engage pawls 87 to draw the latches 83 forward and thereby disconnect the driving segments from the actuating segments. When the latches 83 are drawn forward they engage in notches formed in plates 82 to latch the segments 85 in moved positions. The pawls 87 are carried by levers 88 (Figs. 2 and 6) fast on shafts 91 mounted in the actuating segments. If no key in a bank is depressed a projection 89 (Fig. 2) on the corresponding latch plate 65 engages a pin 9011 on the latch 83 so that the actuating segment is not moved out of zero position. Near the end of the operation of the machine the operated latch plates 65 are restored to normal position by the driving segments 73. This construction so far described is well known in the art and is fully shown and described in the above mentioned patent of Cleal and Reinhard.

The signs or symbols "cts," "tens of cts," "$," and "tens of $" in the drawings and specification are used to designate units or cents, tens of cents, hundreds or dollars, and thousands or tens of dollars respectively.

The actuating segments 85 (Figs. 2 and 3) mesh with gears 90 which through suitable connections, now to be described, operate indicators 93. The gears 90 are fast on corresponding sleeves 94 loose on a shaft 95 (Figs. 2 and 3). This shaft 95 is supported in the frames 63 and extends through the register and the money ejecting mechanism, to be described later. The shaft 95 is given one complete rotation in the direction of the arrow (Fig. 2) through gear connections (not shown) with the shaft 77. The cts gear 90 meshes with the cts pinion 96 (Fig. 3) fast on a shaft 97. The cts indicator 93 is also fast on this shaft so that the movement of the cts actuating segment 85 is imparted to this indicator. The tens of cts gear 90 meshes with the tens of cts pinion 96 which is fast on a sleeve 98, upon which the tens of cts indicator 93 is also fast. The $ gear 90 meshes with the $ pinion 96 which is fast on a sleeve 99, carrying the $ indicator 93. The tens of $ gear 90 meshes with the tens of $ pinion 96, loose on the sleeve 99. Fast on the tens of $ pinion 96 is a gear 100 meshing with a pinion 103, fast on a shaft 104. Fast on the shaft 104 is a pinion 105 (Figs. 2 and 3) meshing with a gear 106 rigid with the tens of $ indicator which is loose on the sleeve 99. Through these connections the indicators are actuated in accordance with the amount keys depressed.

A gear 107 (Fig. 3) is fastened to the $ gear 90 by a hub 108 and a gear 109 is fastened to the tens of $ gear 90 by a hub 110. The cts and tens of cts gears 90 and the gears 107 and 109 actuate a main totalizer 113 (Fig. 2) through intermediate gears and broad pinions 114, as is fully shown and described in the above mentioned Cleal and Reinhard patent. This main totalizer 113 is employed to totalize the entire pay-roll.

A plurality of totalizers 116 (Fig. 5) are mounted in a reel or drum 117. The reel 117 is rotated to bring the desired totalizer in coöperative relation with actuating segments 118 by a manually adjustable lever 119. The lever is pivoted on the frame 120 of the machine and is provided with a segmental rack portion meshing with a segment gear 123, fastened to a segment gear 124, which meshes with a pinion 125, the lever being adapted to rotate the reel 117 through these connections. During the operation of the machine the reel 117 is elevated at the proper time to move the selected totalizer 116 into engagement with the actuating segments 118. The mechanism for elevating the reel is not shown or described in the present application, as such mechanism is well known in the art and is fully shown and described in the above mentioned Carroll Patent, No. 703,639. The construction and operation of the lever 119 is fully shown and described in the above mentioned Von Pein patent. The actuating segments 118 are moved differentially under the control of the amount keys, as will now be described. The totalizers 116 may be employed to totalize the pay-roll of the various divisions of the business.

Fast on the shaft 97 (Fig. 3) is a pinion 128 meshing with a gear 129, fast on the sleeve 130 carrying the cts actuating segment 118. Fast on the sleeve 98 is the tens of cts pinion 128 meshing with the tens of cts gear 129, fast on the sleeve 130 carrying the tens of cts segment 118. Fast on the sleeve 99 is the $ pinion 128 meshing with the $ gear 129, fast on the sleeve 130, carrying the $ actuating gear 118. The tens of $ actuating gear 118 is fast on the tens of $ sleeve 94. Through these connections from the actuating segments 85 the segments 118 for the totalizers 116 are differentially positioned to operate the selected totalizer 116.

In order to release the machine it is necessary to first operate a pinch lever 133 (Fig. 5) pivoted on the lever 119 and then depress a motor release key 134 (Figs. 1^A and 6) which is positioned in the bank of tens of $ keys. When the pinch lever 133 (Fig. 5) is operated it moves a plate 136 inward through a bar 132 thereby rocking arms 137 and 1381 supporting the plate 136. The bar 132 is mounted on the lever 119 by a link 141 and a lever 142. The arm 137 is fast on a shaft 138 (Fig. 6) carrying an arm 139 engaging a roller 140. The roller 140 is mounted on a link 143, which together with an arm 144 forms a toggle. The link 143 is also pivoted to a link 145 which in turn is pivoted on an arm 146 and an arm 147. The arm 147 is fast on a shaft 148 carrying an arm 149, upon which is pivoted a lever 150. When the pinch lever 133 is operated the arm 139 breaks the toggle formed by the arm 144 and the link 143 whereupon a spring (not shown) rocks the arm 146 and therefore the arms 147 and 149 to carry the pawl 150 into engagement with a pin 153, mounted on a plate or arm 154, pivoted on the shaft 70. When the release key 134 is then depressed its pin 155 engages in the slot 156 in the arm 154 to rock the arm and thereby move the pin 153 out of engagement with the lever 150, whereupon the machine is released for operation. A pawl 158 pivoted on the arm 149 and operated by a spring operated lever 159 is employed to prevent an intermediate second operation of the machine by the retention of the release key 134 in depressed position near the end of an operation. During the operation of the machine a cam 160 fast on the shaft 77 engages a roller 163 on the arm 144 to restore the arm and the above described connected parts to normal position. This mechanism described and the locking means for the machine are fully shown and described in the above mentioned Von Pein Patent No. 996,814 and therefore has not been described in detail here.

*b. Adding machine strip.*

The amounts on the various tickets or slips of the time workers and piece workers are printed by an adding machine upon a strip 165 (Figs. 5, 10 and 11). The adding machine is also used to print each employee's number and his total earnings, as shown in Fig. 11. The strip is placed in a drawer 162 (Figs. 1^A and 5), which is suitably mounted on guides 166, fast on the frame or cabinet of the machine. The drawer is drawn into the machine by means of a spring 167 (Fig. 5). The adding machine strip is fed from the roll within the drawer 162 over a guide roller 167 on to a storage roll 169 (Figs. 1ᴬ, 4, 10 and 11). The storage roll 169 is loosely mounted on a stud 170, projecting from a bracket 173, fast on the frame 120.

The left hand side of the storage roll 169 is provided with a circular flange 175 (Fig. 13), within which is mounted a disk 176, fast on a sleeve 177, carrying a pinion 178 (Figs. 11 and 12). The pinion 178 is rotated by means of a segment gear 179. Rollers 180 (Fig. 13) are mounted in cut-away portions of the disk 176 and are retained in engagement with the circular flange 175 by springs 181. During the operation of the machine the segment gear 179 (Figs. 10 and 12) is rocked first clockwise and then counter-clockwise to normal position as will be described presently. During the counter-clockwise movement of the segment gear 179 the rollers 180 are wedged firmly between the circular flange 175 and the disk 176 to rotate the storage roll and thereby feed the strip 165 on to the latter. When the segment gear 179 is rocked clockwise the rollers are not wedged in this manner and therefore the storage roll is not fed as is well understood in the art. A disk 184 (Fig. 11) is mounted in the right hand end of the storage roll and rollers 185 prevent the storage roll from being fed backwardly when the segment gear 179 (Fig. 10) is rocked clockwise. The disk 184 and rollers 185 are like the disk 178 and rollers 180 except that their action is reversed so that they permit the feeding of the roll in but one direction by the disk 176 and rollers 180.

The number of piece tickets or time tickets turned in by the employees during the week varies and therefore means are provided so that the adding machine strip 165 is fed variable distances to bring the totals to the proper reading line. To this end a lever 187 (Figs 1ᴬ, 10 and 11) is loosely mounted on the stud 170 and is adjustable to various positions depending upon the number of amounts going to make up an employee's earnings for the week. This lever projects through a slot 188 (Fig. 1ᴬ) formed in a casing or hood 189 within which the bracket 173 is mounted. A link 190 (Figs. 10 and 12) is pivoted at one end to the segment gear 179 and at its other end is forked over the sleeve 177. A spring 193 (Fig. 10) is interposed between the link 190 and an arm 192, pivoted on the bracket 173. This arm 192 engages the hub of the lever 187 and thereby frictionally retains the lever in adjusted position. The rear end of the lever 187 has a curved portion 194 which is eccentric with the stud 170 and coöperates with a pin 195 on the link 190. Projections 196 on the rear end of the lever 187 are adapted to engage the pin 195 to limit the movement of the lever 187 when the latter is adjusted to its extreme positions. A pitman 197 is pivoted at its upper end to the segment gear 179 and at its lower end is forked over the shaft 77 and carries a roller 198 coöperating with a cam 199. The cam 199 is so constructed that during the operation of the machine the spring 193 is permitted to rock the segment gear 179 clockwise until the pin 195 engages the edge 194 of the lever 187 the pitman 197 being lowered at the same time. Then when the cam 199 restores the pitman 197 to normal position segment gear 190 is moved counter-clockwise to normal position. It can be seen from the above description that the segment gear 179 moves clockwise (Fig. 10) to an extent determined by the position of the lever 187, this movement of the segment gear being limited by the engagement of the pin 195 with the curved edge 194 of the lever 187. Then when the segment gear is moved to normal position the adding machine strip is fed on to the storage roll.

*c. Means for feeding the pay-envelops into position to be perforated and printed.*

The pay envelops are stacked in a magazine in the same order as the employees' numbers are printed by the adding machine upon the adding machine strip so that when the adding machine strip is fed to bring the total earnings of an employee to the reading line that employee's pay envelop will be fed during the next operation of the machine into position to be printed and perforated by mechanism to be described later.

The envelops 202 are placed on a horizontal plate 205 (Figs. 1ᴬ, 14 and 15) forming the base of a magazine. A frame 206 forming the back and sides of the magazine is rigidly mounted on the frame of the machine in any desired manner. The sides and back of the frame 206 are provided with slots 207 (Fig. 15) through which project rollers 211 mounted on depending portions 208 on the plate 205. A compressed spring 209 (Figs. 1ᴬ and 15) moves the plate 205 and envelops upwardly thereby retaining the top envelop in engagement with a feed roll 210. The plate 205 is lowered by a knob 213 (Fig. 1ᴬ) when envelops are to be placed in the magazine.

The feed roll 210 (Figs. 14, 15 and 17) is mounted in arms 215 pivoted on a rod 216, supported by vertical plates or frames 217 and 218 (Figs. 5 and 14). Pivoted on the rod 216 is a segment gear 220 (Figs. 14, 15 and 17), meshing with a pinion 223, fast on the shaft carrying the feed roller 210. A downwardly extending arm of the segment gear 220 (Fig. 17) carries a roller 226 engaging a cam 227 fast on a shaft 228, which is given one complete rotation in the direction of the arrow, upon each operation of the machine, as will be described later. The cam 227 is so constructed that the segment gear 220 is rocked first counter-clockwise and then clockwise to normal position during each operation of the machine. The segment gear 220 is rocked counter-clockwise by the cam 227 and clockwise to normal position by a spring 212. The counter-clockwise movement of the segment gear rotates the feed roller 210 to feed the uppermost envelop on to a table 229 (Figs. 14 and 15). The right hand arm 215 carrying the feed roller 210 has a downwardly extending arm 230 (Fig. 17) carrying a roller 233 engaging in a cam groove 234, formed in a disk 235, fast on the shaft 228. This cam groove 234 is so constructed that the feed roller 210 is raised out of engagement with the top envelop during the clockwise movement of the segment gear 220 to normal position so that the envelop engaging the feed roller is not fed forwardly out of the magazine.

A roller 238 (Figs. 14 and 15) mounted in the frame 206 also engages the envelop to guide the same and assist the feeding roller 210 in feeding the envelop out of the magazine on to the table 229. The upper end of the back of the frame 206 is bent to form a horizontal projection 239 and assists in guiding the envelop on to the table 229.

The shaft 228 (Fig. 5) carries a bevel gear 221 meshing with a bevel gear 222 on a shaft 231 which also carries a bevel gear 232 meshing with a bevel gear 241 fast on the shaft 77. Through these connections the shaft 77 imparts one complete rotation to the shaft 228 upon each operation of the machine.

The table 229 (Figs. 14, 15 and 17) is loose on a shaft 240 supported in the frames 217 and 218 (Fig. 14). A pitman 243 (Fig. 15) is pivoted to a projection on the table 229 and carries a roller 244 engaging a cam 245 fast on the shaft 218. The roller 244 normally rests in the cut-away portion 248 of the cam 245 so that the table 226 is normally in the position shown in Fig. 15. During the operation of the machine and before an envelop is fed rearwardly from the magazine the cam 245 rocks the table 229 clockwise to a horizontal position so that the envelop is fed on to the table.

Rigidly mounted on the shaft 240 is a feed roll 247 (Fig. 15) adapted to coöperate with feed rolls 248 (Figs. 14 and 15) carried by arms 249, pivoted on the upwardly extending projections on the table 229. The arms normally engage studs 251 projecting from the frames 217 and 218 so that the feed rolls 248 are out of engagement with the feed roll 247. When the table 229 is rocked to its horizontal position the rolls 248 engage the roll 247 and the arms 249 move out of engagement with the studs 251. Near the very end of the operation of the machine and after the envelop has been printed and perforated the cut-away portion 246 in the cam 245 moves under the roller 244 whereupon the table 229 rocks to normal position and the arms 249 engage the studs 251 so that the envelop may slide off of the table and fall into any suitable receptacle (not shown). Fast on the shaft 240 is a pinion 250 meshing with a segment gear 253 (Fig. 17) pivoted at 252 on the frame 218. Cams 254 and 255 on the shaft 228 coöperate with rollers 256 and 257, respectively, on the segment gear 253 to rock the segment gear first counter-clockwise (Fig. 17) while the table 225 is in normal position and then clockwise to normal position while the table is in its horizontal position. While the table 229 is in its horizontal position and the envelop is being fed by the feed roll 210 the segment gear 253 is rocked clockwise so that the coöperating feed rolls 247 and 248 feed the envelop until it engages a stud 259, which projects through a hole in the table at such time. While the envelop is in this position it is perforated, as will be described later, and then the pin 259 is raised out of engagement with the envelop and the segment gear 253 moved still further clockwise to normal position by the cams 254 and 255 to feed the envelop against stops or pins 260. While the envelop is in this position it is printed upon, as will be described later.

d. *Punching mechanism.*

Four rows of punches 265 (Figs. 14 and 15) are mounted in a frame 266. There is one row of punches for each bank of keys. The frame 266 is hung at its forward end by a link 267 and at its rear end by two links 268 (Fig. 15) from a frame 269. The upper end of the link 267 is loose on a cross rod 270, supported by bell cranks 273, loosely mounted on studs 274, projecting from the frames 217 and 218. The bell cranks 273 are connected by links 275 to arms 276, fast on a shaft 279, supported by the base frame 219 (Fig. 15) of the register and by a bracket 277, fast on the base frame. This base frame which has been omitted in Fig. 14 is so constructed as to provide a proper bearing for the shaft 279. Arms 280 (Figs. 14 and 15) on the rear end of the frame 269 are pivoted to arms 283 of a yoked frame 284, fast on the shaft 279. Also fast on the shaft 279 is an arm 285 (Figs. 14 and 18), which carries a pin projecting into a recess formed into a projection 286, on a pitman 287. The pitman 287 carries a roller projecting into a cam groove 288, formed in the face of a disk 289, fast on the shaft 228. This cam groove 288 is so constructed that the shaft 279 and the yoked frame 284 are rocked slightly counter-clockwise (Fig. 15) before the envelop has been fed into position to be perforated thereby lowering the frames 266 and 269 through the above described connections. This movement of the frame 266 carries the pin 259 into the path of movement of the envelop to arrest the latter in position to be perforated. Then the frames 266 and 269 are lowered still farther, whereupon the punches 265 engage the envelop on the table 229 and are held stationary during part of the movement of the frames. Slides 290 (Figs. 14 and 15) are mounted to slide in slots 293 (Fig. 14) formed in the frame 269. There is one of these slides 290 for each row of punches 265 and the slides at each operation are positioned differentially in the slots 293 under the control of the depressed amount keys, as will be described presently. Each slide on its lower face is provided with a pin or projection 294 (Fig. 15) so that when a slide is positioned over one of the punches in the corresponding row and the frames 266 and 269 are lowered, after the envelop engages the pin 259, as above described, the selected punch engages the pin 294 when the punch engages the envelop and therefore the punch is forced through the envelop to make a hole 296 (Fig. 16).

The slides 290 are pivoted to the forward ends of racks 300, which mesh with pinions 303, which together with type wheels 304, are rigidly mounted on the left hand ends of corresponding sleeves 305 and shaft 306. The shaft 306 is journaled in the frames 120, 217 and 218 (Fig. 14). Pinions 308 (Fig. 14) on the right hand ends of the sleeves 305 mesh with corresponding segment arms 309 of yokes 310 (Figs. 14 and 15). The left hand sides of the yokes 310 are loosely mounted on a shaft 313 and the right hand sides of the yokes are fast on the left hand ends of corresponding sleeves 314. The pinion 308 on the shaft 306, which carries the units type wheel 304, meshes with the segment arm 309 of a lever 315 fast on the shaft 313. Fast on the sleeves 314 and the shaft 313 are arms 317 (Fig. 2). These arms are provided with slots 318 through which pins 319 on the actuating segments 85 project. Through these connections movement of the actuating segments 85 is imparted to the type wheels 304 and slides 290.

When the frame 266 (Fig. 15) carrying the punches 265 is lowered the pins 260 engage in holes 320 in the table 229 to guide the frame. The frame 266 also carries a punch 323 (Fig. 14) which is rigidly mounted on the frame so that each envelop is perforated in the same position, this perforation 324 (Fig. 16) being adapted to perform a function which will be described later.

*e. Printing mechanism for envelops.*

As above stated the envelop is first fed against the stop or pin 259 (Fig. 15) and then perforated. The frame 266 is then raised to normal position and the envelop fed against the pins 260 into position to be printed upon by the type carriers 304.

A platen 325 for carrying the envelops against the printing line of the type carriers 304 is mounted in a block 326 slidably mounted on pins 327, fastened on the table 229. Fast on a shaft 328, mounted in the frames 217 and 218 (Fig. 14) is an arm 329 (Fig. 15). Also fast on the shaft 328 is an arm 330 pivoted to a pitman 333 which carries a roller (Fig. 18) projecting into a cam groove 334 in a disk 335 fast on the shaft 228. This cam groove is constructed so that the shaft 328 is rocked counter-clockwise (Fig. 15) and then clockwise to normal position after the envelop has been fed into position to be printed. During counter-clockwise movement of the shaft 328 the arm 329 engages the block 326 thereby causing the platen to carry the envelop against the type carriers to print upon the envelop. Springs 338 coiled about the pins 327 and compressed between shoulders on the pins and the block 326 hold the platen out of the path of movement of the envelop when it is fed into printing position.

A type carrier 341 (Fig. 14) fast on the sleeve 305 carrying the tens of $ type carrier 304 prints the "$" sign and a type carrier 342 fast on the shaft 306 prints the decimal point.

An inking ribbon 340 (Figs. 5 and 15) through which the type carriers print on the envelops is in the form of a band which passes over a feeding roll 343, mounted on a bracket 348, under a tension roller 344, over three guide rollers 345, mounted on a bracket 346 (Figs. 5 and 20) about guide rollers 347, mounted on the bracket 348, under a guide roller 349 and about a guide roller 350, mounted on the frame 218 and thence under a guide roller 353, mounted on the bracket 348, which is fast on the base 219 of the machine. The tension roll 344 is carried by arm 354, pivoted on the bracket 348. The upper end of a feeding arm 355 (Fig. 15) coöperates with a ratchet 356, fast on the feed roll 343. The lower end of the arm 355 is slotted and a pin on the bracket 348 projects through the slot to guide the arm. An arm 3561 fast on the shaft 328 normally retains the arm 355 in its elevated position, as shown in Fig. 15. When the shaft 328 is rocked counter-clockwise, as above described, a spring 358 draws the arm 355 downward so that its upper ends engage with the next succeeding tooth of the ratchet 356. Then when the shaft 328 is rocked back to normal position it elevates the arm 355 whereupon the feeding roll 343 is rotated to feed the inking ribbon. A spring operated pawl 359 prevents retrograde movement of the feeding roll 343.

An alining frame 359 (Figs. 14 and 15) for the type carriers 304 is loosely mounted on the shaft 279. An arm 360 is fast on the hub of the alining frame 359 and is pivoted to a pitman 363 which at its rear end is provided with a slot 364 (Fig. 15) through which the shaft 328 projects. The right hand side of the yoked frame 284 is loosely mounted on the hub of the alining frame 359. The pitman 363 carries a roller 365 projecting into a cam slot 366, formed in a disk 367 fast on the shaft 328. This cam groove 366 is so constructed that when the shaft 328 is rocked to make an impression on the envelops the alining arm 359 is rocked into engagement with the V shaped notches in the type carriers 304 to aline the latter in their adjusted positions.

f. Printing mechanism for ledger sheets.

It is usual to provide the paymaster with ledger sheets 371 (Fig. 1A) upon which are recorded the earnings of the employees. These ledger sheets are usually made out by hand and are for the purpose of providing a permanent record for the paymaster. In the present invention means are provided for printing the total earnings of the employees on the ledger sheets at the same time that the envelops are printed.

Figure 23:
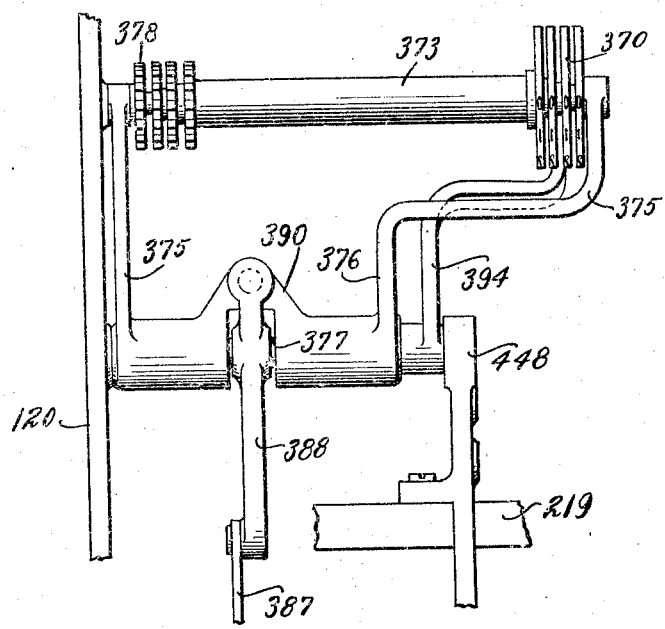
Fig. 23 is a detail rear view of the type carriers and the supporting means for these type carriers which are adapted to print on the ledger sheets.

The type carriers 370 (Figs. 5, 14, 15 and 23) for printing on the ledger sheets are fast on sleeves 373 and a shaft 374 (Figs. 14 and 23). The shaft 374 is journaled in arms 375 of a frame 376, loosely mounted on a shaft 377, journaled in the bracket 348 and the frame 120. Fast on the right hand ends of the sleeves 373 and the shaft 374 are pinions 378 meshing with gears 379 (Figs. 14 and 15) loose on a stud 380, projecting from the frame 120. The gears 379 mesh with segment arms 383 integral with the yokes 310 and lever 315. Through these connections it can be seen that the type carriers are differentially positioned in accordance to the amounts set up on the keyboard to print on the ledger sheets.

The ledger sheets are carried in a carriage 385 (Figs. 1A, 5 and 19) which is similar in construction to the carriages of typewriters. This carriage is moved vertically to move the printing lines or rulings on the ledger sheets into position to be printed on, as will be described later. The carriage 385 carries a platen 386 (Figs. 19 and 20) against which the ledger sheet is carried by the type carriers for the purpose of making an impression on the ledger sheet. The means for rocking the frame 376 for the purpose of carrying the type carriers against the ledger sheet is shown on Figs. 15, 18 and 23. A lever 388 (Figs. 15 and 23) is fast on the shaft 377 and a spring 389 (Fig. 15) is compressed and seated in pockets in the upwardly extending arm of the lever 388 and in a projection 390 of the frame 376. This spring normally retains the right hand arm 375 of the frame 376 in engagement with a pin 393 fast on the frame 120, in which position the pinions 378 are in engagement with the gears 379. Also fast on the shaft 377 is an alining arm 394 for the type carriers 370. The lower end of the lever 388 is pivoted to the pitman 287 (Figs. 15 and 18) so that when the pitman 287 is moved rearwardly when the punches 265 are lowered to punch the envelop as above described, the alining arm 394 is rocked and engages in the V shaped notches (Fig. 15) in the type carriers 370 to rock the latter against the ledger sheet to print thereon. Then when the pitman 287 is moved rearwardly to normal position the spring 389 rocks the frame 376 to normal position. As can be seen from Figs. 5 and 15 the inking ribbon 340 passes behind the type carriers 370 so that the latter print on the ledger sheets through this inking ribbon.

g. Ledger sheet carriage.

The ledger sheet carriage 385 (Figs. 19, 20 and 21) comprises a top plate 400 and a bottom frame 403 to which are rigidly connected a vertical plate 404 and a frame 405. The construction of this frame 405 is best shown in Fig. 20. The platen 386 is mounted in a frame 402 which is mounted at its upper and lower ends in the plate 400 and the frame 403 respectively. Journaled in the plate 400 and frame 403 is a feed roll 406 with which coöperate auxiliary rolls 407 mounted on levers 408, fast on a shaft 409 journaled in the plate 400 and frame 403. Compressed springs 410 (Fig. 20) normally serve to retain the rolls 407 in engagement with the roll 406. When a ledger sheet is inserted a lever 413 (Figs. 19 and 21) fast on the shaft 409 is operated to move the rolls 407 away from the roll 406, so that the ledger sheet may be inserted between the same. Then when the roll 406 is rotated by a knob 414 after the lever 413 has been released the ledger sheet is fed about the roll 406, it being guided by the frame 405. In this manner the proper column of earnings for any desired week is brought into position over the platen 386. The ledger sheet, as it is fed between the roll 406 and the rolls 407, is guided by a groove 416 (Figs. 5 and 21) formed in a plate 417, fast on the frame 403.

The carriage 385 is mounted for vertical movement in a frame 418, fast on the rear or back frame 419 (Fig. 20) of the machine. As shown in Figs. 19, 20 and 22 the forward edge of the plate 404 is slidably mounted in grooves 420 formed in blocks 421 on the frame 418. The rear edge of the plate 404 is guided between two rollers 423 (Figs. 20 and 22) mounted between the sides of the plate 404 and the interior edges 424 of the sides 422 of a rectangular frame 425, fast on the frame 418. A plate 431 (Fig. 20) holds the rollers in the frame 425. The edges 424 engaged by the rollers 423 are inclined toward the plate 404 so that the rollers are normally wedged between the plate 404 and the edges 424 by the weight of the carriage 385 thereby retaining the carriage in the position to which it has been elevated. This construction, however, permits the carriage to be raised during the operation of the machine in a manner now to be described. A guide roller 426 (Fig. 20) mounted on the frame 418 engages the frame 405 and thereby assists in guiding the carriage 384 in its vertical movement.

Figure 24:
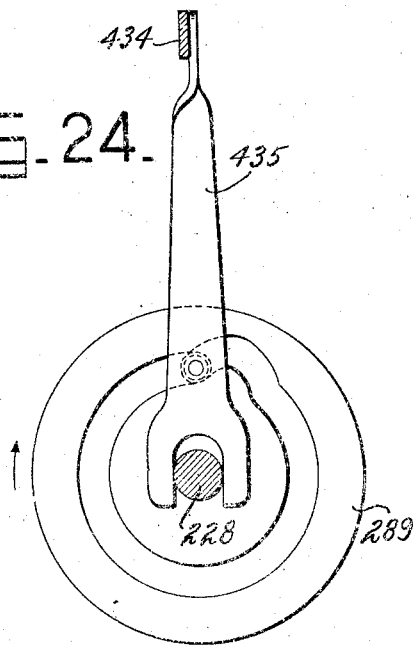
Fig. 24 is a detail view of the cam for operating the ledger sheet carriage.

Different classes of ledger sheets are employed, there being one class for time workers, one for day workers on a weekly salary, one for piece workers, etc. The rulings on the various classes of ledger sheets are different and therefore the ledger carriage 385 must be raised different distances depending upon the class of sheets to be printed during the various operations. In the present invention the means employed for this purpose is adapted to raise the ledger carriage vertically four different extents, the invention therefore being constructed to accommodate four different classes of ledger sheets. Mounted on the plate 404 (Figs. 19, 20 and 21) are four racks 428 with which corresponding feed levers 429 are adapted to coöperate to raise the ledger sheet carriage. The teeth on the various racks 428 are different distances apart so that the carriage may be raised different extents, the extent of elevation being dependent upon the rack used during the particular operation. These feed levers 429 are pivoted on an arm 430, fast on a shaft 433 (Fig. 19). The shaft 433 is journaled in a bracket 432 (Fig. 14) on the base frame 219 and the back frame of the machine. An arm 434 (Figs. 14 and 24), fast on the shaft 433 is pivoted to a pitman 435, carrying a roller projecting into a cam groove 436 formed in the right hand face of the disk 289. This cam groove is so constructed that the shaft 433 is rocked clockwise (Fig. 19) at the proper time to elevate the feed levers 429. The nose 431 of but one of these levers 429 at any time is held in engagement with its corresponding rack 428 by a corresponding spring 440 and therefore the elevation of the feed lever, whose nose 431 is in engagement with its rack, elevates the ledger sheet carriage so that the ledger sheet is printed upon at the proper line or ruling. The means for disabling the feed levers 429, which are not used to feed the ledger carriage will now be described. The levers 429 have upwardly extending fingers 438 (Fig. 22) which are retained in engagement with cams 439 by means of the springs 440 (Fig. 19). These cams are fast on a shaft 443 (Figs. 20 and 22) mounted in the frame 418. The shaft is rotated by a turn button 444. These cams 439 are so constructed that the turn button 444 and shaft 443 may be adjusted so that the nose 431 of but one of the levers 429 at a time is held in engagement with its rack 428 by the corresponding spring 440 (Fig. 19). A spring pressed plunger 446 engages in V shaped notches in a disk 447 fast on the shaft 443 to aline the shaft 443 in its adjusted position.

After the earnings of the employee, whose name appears at the bottom of a ledger sheet, has been printed the carriage 385 is lowered to its lowermost position by hand so that the earnings of the employee whose name is on the top ruling or line of the next ledger sheet will be printed during the next operation of the machine. In order to lower the ledger carriage the rollers 423 (Fig. 22) are raised and the operative feed lever 429 disabled by the following means. A lever 449 is fast on a shaft 450, which is mounted on the frame 418. One arm of a bell crank 453 fast on the shaft 450 carries pins 454, projecting through openings 455 in the rollers 423 and when the lever 449 is depressed the pins 454 elevate the rollers 423 so that they no longer are wedged between the edges 424 of the frame 425 and the plate 404. The frame 425 is cut away to permit operation of the arm carrying the rollers 423. The bell crank 453 and therefore the lever 449 and shaft are retained in normal position by a spring 456 (Fig. 22). A link 457 is connected to the bell crank 453 and is provided with a slot 458 through which a pin 459 on a pivoted lever 460 projects. An arm 463 fast to the lever 460 has a horizontal projection 464 which projects across the fingers 438 of the lever 429. When the lever 449 is operated the flange is moved into engagement with the finger 438 of the feed lever 429 in operative position. If the carriage 385 has been raised slightly by hand a spring 466 will lock the arm 463 during the entire movement of the link 457 to rock the operative feed lever 429 out of operative position. If, however, the carriage has not been slightly raised the engagement of the nose 431 of the operative feed lever with its rack 428 prevents the spring 466 from rocking the arm 463 after its projection 464 has been moved into engagement with the finger 438, the slot 458 in the link being provided for this purpose. This construction is provided to compel gripping of the knob 414 before the carriage is lowered so that the carriage will be lowered by hand instead of being dropped suddenly by gravity, which would happen if the knob 414 was not gripped and the carriage raised slightly by hand.

h. *Denominational counters and operating mechanism therefor.*

In the description and drawings the signs 1¢, 5¢, 10¢, 25¢, 50¢, $1, $5, $10 and $20 will represent pennies, nickels, dimes, quarters, half-dollars, dollars, five dollar gold pieces, ten dollar gold pieces and twenty dollar gold pieces respectively.

Figure 25:
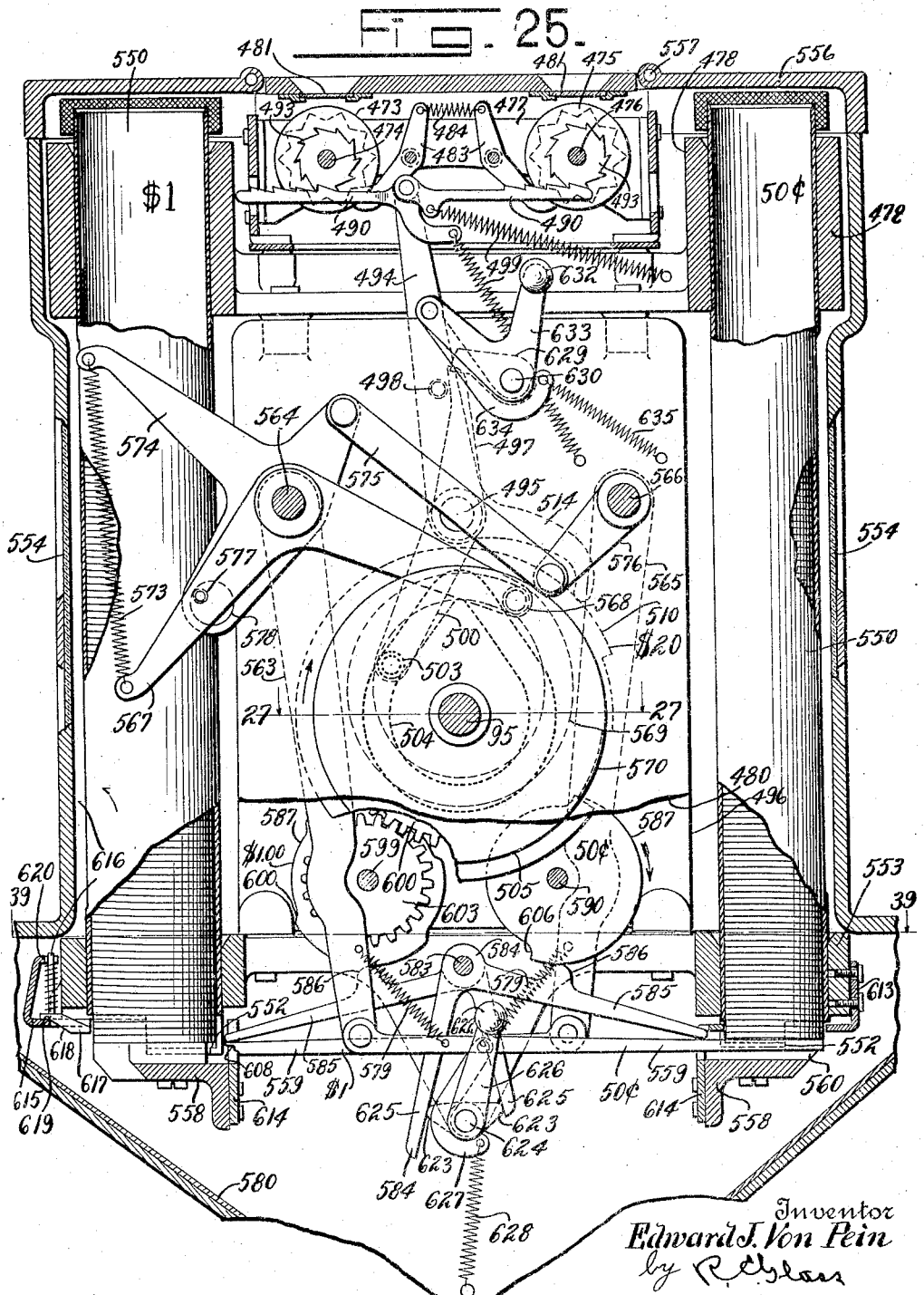
Fig. 25 is a detail right side elevation of the coin ejecting mechanism and the denominational counters. In this view the cabinet is shown in cross section and the supporting frame and coin tubes are partly broken away.
Figure 26:
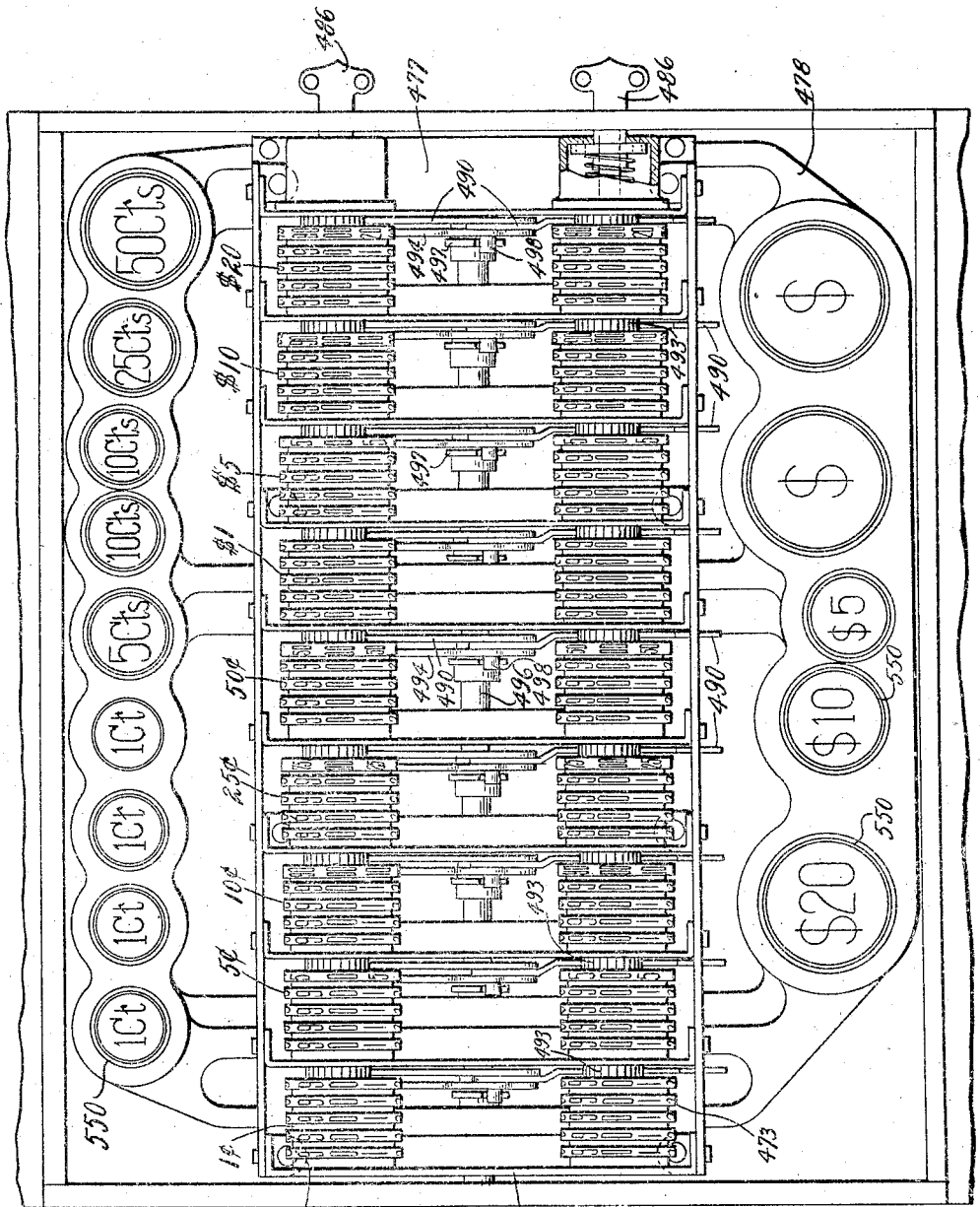
Fig. 26 is a detail top plan view of the denominational counters and money tubes, the top of the cabinet being removed.

In Fig. 26, two rows of denominational counters 473 and 475 are shown, there being one counter for each denomination of coins in each row. One of these rows of counters if desired may be turned to zero after the total number of coins necessary for the pay-roll in each division has been determined, while the other row of counters may be turned to zero after the entire pay-roll is made up to determine the total number of coins necessary for the entire pay-roll. It will also be obvious from the following description that one row of counters may be employed to indicate the total value of money as represented by pennies, nickels, dimes, etc., while the other row may be used for recording the number of pennies, nickels, dimes, etc. The counters 473 of the row are mounted on a shaft 474 (Fig. 25) and the counters 475 of the rear row are mounted on a shaft 476. These shafts 474 and 476 are mounted in a frame 477, fast on a frame 478 (Figs. 25 and 26) of the money ejecting mechanism. The frame 478 is fastened on side frames 479 and 480 (Figs. 39 and 40) of the coin ejecting mechanism. The totals accumulated on the counters may be viewed through windows 481 (Fig. 25) in the cabinet.

The counter wheels are alined in adjusted positions by pawls 483 (Fig. 25) which are retained in engagement with the star wheels, fast on the counter wheels by springs 484. The mechanism for turning the counters to zero is not shown in the drawings as any well known form may be employed for this purpose and such mechanism is not necessary for the understanding of the invention. The turn-to-zero mechanisms are operated by means of keys 486 (Fig. 26). No transfer mechanism is shown in the drawings as many well known forms of transfer mechanism may be employed.

The counters are operated by means of racks 490 (Figs. 25 and 26) which coöperate with ratchets 493 on the units wheels of the counters. The racks 490 for the two counters appropriate to one denomination are pivotally mounted on the upper end of a corresponding lever 494, loosely mounted on a shaft 495, which is supported in the side frames 479 and 480 (Fig. 40) and a central frame 496. Fast on the shaft 495 and beside each lever 494 is a corresponding arm 497 (Figs. 25 and 26) normally engaging a pin 498 on the corresponding lever 494. Springs 499 (Fig. 25) connected to the racks 490 serve to retain the racks 490 in engagement with the ratchets 493 and tend to rock the levers 494 clockwise (Fig. 25) this movement of the levers 494 is normally prevented by the arms 497. Fast on the shaft 495 is an arm 500 carrying a roller 503 projecting into grooves 504, formed in a disk 505 (Figs. 25 and 27) fast on the shaft 95. This cam groove 504 is so constructed that during each operation of the machine the arms 497 are rocked clockwise (Fig. 25) and then counterclockwise to normal position. During the clockwise movement of the arms 497 the springs 499 rock the arms 497 in the same direction to extents determined by the depressed amount keys in a manner to be described later. Then when the arms 497 are rocked counter-clockwise to normal position they engage the pins 498 to restore the arms 494 to normal position whereupon the racks 490 actuate the corresponding counters.

The means controlling the extent of movement of the levers 494 will now be described.

Fast on the cts sleeve 94 (Figs. 27 and 28) is a disk 510 having two series of steps 513. The value of these steps is indicated in Fig. 28. From this latter figure it can be seen that if no key in the cts bank has been depressed the "0" step 513 engages under an arm 514 (Fig. 25) of the 1¢ lever 494, when the arm 497 is moved away from the pin 498, so that the 1¢ counters are not operated. If the 4¢ key is depressed the "4" step is moved under the arm 514 of the 1¢ lever 494 so that the latter moves four steps. Then when the lever 494 is restored to normal position the racks 490 actuate the 1¢ counters accordingly during the operation of the machine. If the 6, 7, 8 or 9 key is depressed the 1¢ lever 494 is moved 1, 2, 3, or 4 steps respectively and if the 5 key has been depressed it is not moved at all. This specific construction is employed so that if the 5¢ key or a key of higher value in the cts bank is depressed the 5¢ counters are actuated one step and the 1¢ counters are actuated to extents corresponding to the difference between the value of the key depressed and 5¢. The means for accomplishing this transfer of 5¢ to the 5¢ counters will be described presently.

The tens of cts sleeve 94 as shown in

Figs. 27 and 38 terminates at 512 in a bracket 516 (Figs. 28, 37 and 38) fast on a frame 517, mounted on the frame of the coin ejecting mechanism. Mounted in alinement with the tens of cts sleeve 94 is a sleeve 518, which carries the 5¢ (Fig. 29), 10¢ (Fig. 31), 25¢ (Fig. 32) and 50¢ (Fig. 33) disks 510. It is understood, of course, that there is one disk 510 for each lever 494 and that the disks control the extent of movement of the corresponding levers in the same manner as the 1¢ disk 510 (Fig. 27) controls the 1¢ lever 494 as above described. These disks fast on the sleeve 518 are provided with cut-away portions 520 which form recesses and steps for controlling the extents of movement of the corresponding levers 494 (Fig. 25) and therefore the extent of actuation of the corresponding denominational counters. When the cts sleeve 94 is moved from its "4" to its "5" position or beyond the sleeve 518 is moved one step in addition to the movement which it is given under the control of the tens of cts bank of keys, as will be described later. The notches and steps on the disks 510, fast on sleeve 518 are so constructed that the value of the least number of coins will be registered on the corresponding denominational counters. A single example will illustrate the principle and operation of this mechanism. If the 90¢ and 3¢ keys are operated the 1¢ counters will be actuated four steps to add 3¢, the 5¢ counters will be actuated to add 5¢, the 10¢ counters will be actuated one step to add 10¢, the 25¢ counters will be actuated one step to add 25¢ and the 50¢ counters will be actuated one step to add 50¢, 3 pennies, 1 nickel, 1 dime, 1 quarter and 1 half-dollar being the least number of coins making up the amount.

The means for actuating the sleeve 518 under the control of the cts and tens of cts banks of keys will now be described. Loosely mounted on the bracket 516 are two levers 525 (Figs. 37 and 38) carrying a shaft 526, upon which are mounted two gears 527 and 528 of different size. The gear 528 meshes with the gear 529, fast on the sleeve 518 and the gear 527 meshes with a gear 530 fast on the tens of cts sleeve 94. Through these gears it can be seen that the movement of the actuating segment 85 controlled by the tens of cts bank of keys is imparted to the sleeve 518 to position the disks 510 fast on the latter.

Fast on the cts sleeve 94 is a disk 533 (Figs. 27 and 36) having a groove 532 into which projects a roller 534 (Fig. 36) mounted on a slide 535. The slide 535 is guided by a pin 539 on the frame 479 projecting through a slot in the slide. The slide 535 is pivoted to an arm 540, fast on a shaft 541, which carries an arm 543 (Figs. 37 and 39) forked over a pin 544, carried by the levers 525.

The cam groove 532 is so constructed that when the cts sleeve 94 passes from its "4" to its "5" position or beyond the levers 525 are rocked clockwise (Fig. 37) through the slide 535, arm 540, shaft 541 and arm 543. This movement of the levers 525 rotates the sleeve 518 one step through the gears 527, 528, 529 and 530. In this manner the nickels are transferred from the cts sleeve 94 to the sleeve 518 so that when the 5¢ key or a key of higher value in the cts bank is depressed the 5¢ counters are operated one step. It is understood, of course, that when the 5¢ key and a key in the tens of cts bank is depressed the 5¢-counters are operated only in cases in which a nickel is one of the least number of coins going to make up the amount required by the two keys depressed. For example if the 1¢ and 20¢ keys are depressed the 1¢ counters are actuated one step and the 10¢ counters are actuated two steps to add 20¢ but if the 5¢ and 20¢ keys are depressed the 25¢ counters are actuated one step to add 25¢ and the 5¢ and 10¢ counters are not actuated.

The $ sleeve 94 (Fig. 27) carries the $1 disks 510 (Fig. 34) and the $5 disk 510 (Fig. 35). The $1 and $5 disks are so constructed that the $1 counters are actuated, 1, 2, 3 and 4 steps respectively if the 1, 2, 3 or 4 key is depressed or if the 6, 7, 8 and 9 key in the $ bank of keys is depressed while the $5 counters are actuated one step only when the $5 key or a key of higher value in the $ bank is operated.

The tens of $ sleeve 94 (Fig. 27) carries the $10 (Fig. 30) and the $20 (Fig. 25) disks 510. These two disks are so constructed that the $20 counters will be actuated one step for each $20 represented in an amount while the $10 counters are actuated but once for an odd $10 in the amount.

A single example might be given to illustrate the operation of the above described controlling mechanism for the denominational counters. Taking the amount $55.93 as an example it can be seen that the least number of coins which go to make up the amount is eleven there being two $20 gold pieces, one $10 gold piece, one $5 gold piece, one one-half dollar, one quarter, one dime, one nickel and three pennies. Therefore $40, $10, $5, 50¢, 25¢, 10¢, 5¢ and 3¢ will be added on the $20, $10, $5, 50¢, 25¢, 10¢, 5¢ and 1¢ denominational counters respectively.

*2. Filling and sealing the envelops.*

As above stated, after the machine has been used to print on the ledger sheets, print on and perforate the pay envelops, and operate the denominational counters for the purpose of determining the least number of coins necessary, the machine is then used for automatically filling the envelops with the money. The envelops are filled under the control of the perforations in the envelops and after being filled are automatically sealed.

a. Money tubes.

In the present invention there are fourteen money tubes 550 (Figs. 1<sup>B</sup>, 25 and 26). As shown in Fig. 26 there are four 1¢ tubes, one 5¢ tube, two 10¢ tubes, one 25¢ tube, one 50¢ tube, two $1 tubes, one $5 tube, one $10 tube and one $20 tube. The tubes are mounted at their upper ends in the frame 478 and at their lower ends in a frame 553, (Figs. 25, 39 and 40), these frames being supported on the side frames 479 and 480. The money in the tubes can be viewed through windows 554 (Figs. 1<sup>B</sup> and 25) in the cabinet and opening 555 (Fig. 1<sup>B</sup>) in the tubes so that they may be replenished when necessary. The top of the cabinet is provided with doors 556 (Fig. 25) which are over the money tubes and hinged at 557. It is only necessary to raise the doors to drop the coins into the tubes. The tubes may if desired be lifted out of the frames 478 and 553 when they are to be refilled. The lower ends of the money tubes are bent to form horizontal flanges 552 (Figs. 26 and 39) to support the coins in the tubes. In Fig. 39 the flanges 552 are not shown in full as it is assumed that money is in the tubes. The lower ends of the tubes rest on cross bars 558 mounted on the frame 553.

b. Ejecting means.

The coins are ejected from the tubes by means of ejectors 559 (Figs. 25 and 39) which are adapted to slide in grooves 560 (Figs. 25, 39 and 40) formed in the frames 558. The lower ends of the coin tubes are cut away to permit the ejection of the coins and operation of the ejector. The ejectors 559 for the rear row of money tubes are pivoted on the lower ends of arms 563 fast on a shaft 564 supported in the frame of the money ejecting mechanism. The ejectors 559 for the front row of money tubes are pivoted on the lower ends of arms 565 fast on a shaft 566. Pivoted on the shaft 564 (Fig. 25) is a bell crank 567 which carries a roller 568 projecting into a cam groove 569 formed in a disk 570 fast on the shaft 95. The bell crank 567 is connected by a spring 573 to a lever 574 fast on the shaft 564. A link 575 connects the lever 574 with an arm 576 fast on the shaft 566. The bell crank 567 carries a pin 577 projecting through a hole 578 formed in the lever 574. The cam groove 569 is so constructed that during the operation of the machine the lever 567 is rocked first clockwise (Fig. 25) whereupon the pin 577 rocks the lever 574 and the shaft 564 clockwise to withdraw the ejectors 569 for the rear row of money tubes from under coins in the tubes. At the same time the shaft 566 and arms 565 are rocked counter-clockwise through the link 575 and arm 576 to withdraw the ejectors 559 for the front row of money tubes from under the coins in the tubes. Then when the lever 567 is rocked counter-clockwise to normal position the spring 573 moves the front money ejectors forwardly and the rear money ejectors rearwardly to normal positions.

Springs 579 (Fig. 25) tend to rock the ejectors 559 about their pivots when they are withdrawn from under the coins in the money tubes. Means are provided for permitting the rocking of the money ejectors only for the tubes from which money is to be ejected. When the selected money ejectors are rocked their outer ends move behind the lowermost coins in the corresponding tubes so that when the coin ejectors are moved to normal position by the spring 573 the coins are ejected from the tubes and drop through a chute 580 (Figs. 1<sup>B</sup>, 4 and 25) carried by the cabinet of the money ejecting mechanism.

The means controlling the effective operation of the coin ejectors will now be described. Loosely mounted on a rod 583 (Fig. 25) are a plurality of bell cranks 584, there being one bell crank for each coin ejector 559. Arms 585 of the bell cranks 584 normally engage the corresponding coin ejectors 559 and these arms are provided with projections 586 which coöperate with disk 587 positioned differentially under the control of the operated keys 60.

The means for differentially positioning the disks 587 will now be described. Fast on the cts sleeve 94 (Figs. 27 and 28) is a gear 588 meshing with a pinion 589 fast on a shaft 590 journaled in the frames 479 and 480. Also fast on the shaft 590 are the four 1¢ disks 587 (Figs. 27, 29, 32 and 36). Fast on the sleeve 518 (Figs. 27 and 34) is a gear 593 meshing with a pinion 594 fast on a sleeve 595 carrying the 5¢, the two 10¢, the 25¢ disks 587 (Figs. 25, 30, 33, 34 and 35). The $ sleeve 94 carries a gear 596 (Figs. 27 and 35) meshing with a gear 597 fast on a sleeve 598 loose on a shaft 599. The sleeve 598 carries the two $1 disks 587 and the $5 disk 587 (Figs. 27, 30, 33 and 35). A gear 600 (Figs. 25 and 27) fast on the tens of $ sleeve 94 meshes with a gear 603 fast on the shaft 599. The $10 and $20 disks 587 (Figs. 29 and 32) are fast on the shaft 599.

The disks 587 are provided with notches or cut-away portions 606 which are selectively moved over the projections 586 (Fig. 25) on the arms 585 so that when the ejectors 559 are withdrawn from under the coins, as above described, the springs 579 rock the ejectors 559 about their pivots thereby raising the projections 586 into engagement with the cut-away portions 606 on the corresponding disks. If one of the cut-away portions is not above the projection 586 the corresponding ejector 559 is not raised and therefore when it is moved back to normal position it does not eject a coin. If an ejector is raised, however, it pushes a coin out of the coin tube when it is moved to normal position.

The four 1¢ disks 587 are so constructed that no more than one penny is ever ejected out of each 1¢ tube. If the 1¢ of 6¢ key 60 is depressed a penny is ejected but from one tube. If the 2¢ or 7¢ key is depressed a penny is ejected out of each of two tubes. If the 3¢ or 8¢ key is depressed a penny is ejected out of each of three tubes and if the 4¢ or 9¢ key is depressed a penny is ejected out of each of the four 1¢ tubes. When no key is depressed or the 5¢ key is depressed none of the pennies are ejected.

The 5¢, 25¢, 50¢ and the two 10¢ disks 587 are so constructed that they will control the ejection of the least number of coins over one cent and under one dollar. That is to say, if 95¢ is to be ejected one half-dollar, one quarter and two dimes are ejected, four coins being the least number which go to make up 95¢. If the 5¢ key or a key of higher value in the ¢ bank is depressed the 5¢ disk 587 and the other disks fast on the sleeve 595 are rotated one step farther to control the ejection of the least number of coins, the nickels in this manner being carried from the 1¢ disks 587 to the 5¢ disk 587 or a disk of higher value.

As there are two $1 coin tubes it is necessary to eject two dollars out of each tube when four dollars are to be ejected, or two dollars out of one tube and one out of the other when three dollars are to be ejected. Therefore the coin ejectors 559 for the $1 tubes are constructed to eject one or two dollars as required. When but two dollars are to be ejected one dollar is ejected out of each $1 tube. These $1 ejectors are provided with fingers which are not shown but which are like the finger 608 on the $20 ejector 559 (Fig. 25). If but one dollar is to be ejected out of a $1 tube the corresponding ejector 559 is permitted to be rocked but one step by the corresponding $1 disk 587 and the finger on the ejector engages the lowermost dollar to eject the same. If two dollars are to be ejected from a $1 tube the ejector is permitted to be rocked two steps by the corresponding $1 disk 587 whereupon the finger 608 is permitted to eject the second dollar from the bottom and the shoulder under the finger engages the bottom dollar to eject the latter.

If the $5 key or a key of higher value in the $ bank is depressed one five dollar gold piece is ejected together with the number of dollars necessary to make up the amount.

The $20 ejector 559 (Fig. 25) is constructed similarly to the $1 ejectors so that it will eject one or two twenty dollar gold pieces, depending upon the key depressed in the $10 bank. A ten dollar gold piece is ejected only in case the $10, $30 or $50 key is depressed.

Adjustable plates 613 (Figs. 25 and 40) are mounted on the frame 553 for all of the coin tubes except the $1 and $20 tubes to prevent ejection of more than one coin. Adjustable plates 614 (Fig. 25) fast on the bars 558 guide the coin ejectors. In order to prevent two $1 or $20 from being ejected out of a tube when but one coin is to be ejected the following described devices are employed. Mounted on the frame 553 and in front of each $1 and $20 tube is a bracket 615 (Figs. 25, 39 and 40). A pin 616 is slidably mounted in the top of the bracket and at its lower end is fastened in a block 617. When only the lowest coin is to be ejected and the next coin is moved forwardly by friction the latter coin is stopped by engagement with the block 617. If two coins are to be ejected the upper one engages the block 617 but as the coin is now being pushed directly by the coin ejector the block 617 is raised by engagement of its inclined surface 618 with the edge 619 of the bracket 615. The lower end of the pin 616 at the same time is moved rearwardly and the pin raised against the action of its spring 620. In this way the block 617 is moved out of the path of the coin and then after the coin has passed out of engagement with the block the spring 620 restores the block to normal position.

While the machine is being operated to print and perforate the envelops and operate the denominational counters the coin ejectors 559 (Fig. 25) may be disabled if desired. To this end arms 623, one for each bell crank 585 is fast on a shaft 624. The arms 623 engage arms 625 of the bell cranks 584 when the shaft 624 is adjusted to the position shown in Fig. 25 by a hand lever 626 fast on the shaft. The lever 626 carries a knob 622 by which it is moved. It will be seen from this figure that the bell cranks 584 cannot be rocked and therefore the ejectors 559 cannot be raised to eject coins. When the lever 626 is rocked counter-clockwise the arms 623 are rocked out of engagement with the arms 625 to permit ejection of the coins. The lever 626 is moved to rock the arms 623 out of engagement with the arms 625 before the machine is operated to fill the envelops. An arm 627 pivoted on the lever 626 is connected to a spring 628 and is so constructed that the section of the spring retains the lever 626 in either of its two adjusted positions.

While the machine is being operated to fill the envelops the denominational counter operating mechanism may be disabled, if desired, and the following described device is employed for this purpose. Arms 629 (Fig. 25), one for each lever 494, are fast on a shaft 630. Also fast on a shaft 630 is a hand lever 633, which when rocked counter-clockwise by a knob 632 moves the arms 629 back of the pins 498 thereby preventing operation of the levers 494 and hence actuation of the denomination counters. A lever 634 and spring 635 serve to retain a lever 633 and shaft 630 in either one of their adjusted positions.

*c. Control of differential mechanism by the perforations in the pay envelops.*

The envelops after being printed and perforated are placed on a table or in a holder and upon each operation of the machine an envelop is fed into position to receive the money which is ejected from the coin tubes into the chute 580 (Figs. 1$^B$, 4 and 25). Before the envelop is fed into position to receive the money certain electrical circuits are completed through the perforations in the pay envelops and these circuits energize electro-magnets which control the extent of movement of the actuating segments 85 (Fig. 2) in the same manner as these actuating segments are controlled by the keys 60.

The envelops are placed under the coin ejecting mechanism on a plate 640 (Figs. 41$^A$, 44$^A$, 46 and 48) mounted on vertical rods 641 (Figs. 1$^B$ and 4). The envelops are placed in a vertical position between side plates 643 mounted on the plate 640, and are pushed forward by a sliding bracket 645 against a plate 646, fast on the plate 640. The bracket 645 is slidably mounted on the plate 640, the bracket being provided with pins which project through a slot 642 (Fig. 46) formed in the plate 640. The bracket 645 (Fig. 48) is connected by a strap 648 to a drum 649 which is operated by a spiral spring 651 to draw the bracket 645 forward. One end of the spring 651 is connected to a shaft 652 upon which the drum is pivoted. The shaft 652 may be rotated to increase the tension of the spring, the shaft being retained in any adjusted position by a pawl 661 and ratchet 662. The drum 649 is suitably supported in the bracket on the frame 640. During each operation of the machine a plate 650 (Figs. 41$^A$, 46 and 48) called the "separator", herein, is lowered and then raised for the purpose of separating the foremost envelop from the second envelop from the front. When the separator 650 is lowered the bracket 645 moves the foremost envelop against the plate 646 and then when the separator is raised it moves between this envelop and the next one. This separator 650 is fast on an arm 653 carried by a shaft 654 which also carries an arm 655. The arm 655 (Fig. 41$^A$) is connected by a slot and pin connection with a pitman 656 which carries a roller 657 (Fig. 48) projecting into a cam groove 658 formed in a disk 659 fast on a shaft 660. The shaft 660 is suitably supported in the frame of the machine and is given one complete rotation in the direction of the arrow (Fig. 48) by the shaft 77 through a shaft 663 (Figs. 4 and 45) which carries bevel gears 664 and 665 meshing respectively with a bevel gear 666 fast on the shaft 77 (Fig. 4) and a bevel gear 667 fast on the shaft 660 (Fig. 45). The cam groove 658 is so constructed that the separator 650 is lowered after an envelop has been fed from between the separator and the plate 646, as will be described presently, so that the next envelop is moved against the plate 646 by the bracket 645. Then the separator is raised to normal position to separate the foremost envelop from the next envelop.

While the separator 650 is in normal position the perforations in the envelop between the separator and the plate 646 control the closing of electrical circuits, as will now be described. A frame 670 (Figs. 41$^A$, 42, 44$^A$ and 46) is provided with slots 673 (Fig. 46) through which pins on the plate 640 project, the frame in this manner being slidably mounted on the plate. Slidably mounted in the frame 670 are four vertical rows of contact pins 674 there being one contact pin for each key 60 and therefore one pin for each position at which an envelop is adapted to be perforated to represent an amount. An arm 675 is provided at one end with a notch through which projects a pin 676 on the frame 670. The arm 675 is fast on a shaft 677 supported by the plate 640 and a horizontal frame 678. Also fast on the shaft 677 is an arm 679 pivoted to a pitman 680 which at its rear end (Fig. 48) is forked over the shaft 660. The pitman 680 carries a roller 683 projecting into a cam groove 684 in a disk 685, (Figs. 41$^A$ and 46) fast on the shaft 660. This cam groove is so constructed that after the separator 650 is elevated to normal position the frame 670 is moved rearwardly. During this movement of the frame the pins 674 which are in alinement with the amount perforations 296 (Fig. 16) in the envelop passes through the perforations and into contact with the separator 650 thereby completing electric circuits. Those contact pins 674 which are not in alinement with perforations contact with the envelop thereby compressing springs (not shown) which are coiled about the pins and therefore these pins do not complete electric circuits. It is understood, of course, that the pins 674 are properly insulated from the frame 670 and that the plate 646 is cut away to permit movement of the pins into engagement with the envelop.

The contact pins 674 when moved into engagement with the separator 650 closes circuits through electro-magnets 685 (Figs. 2, 6, 7 and 9). These electro-magnets, as best shown in Fig. 7, are mounted in the frames 63 and immediately to the left of the corresponding keys. The electro-magnets (Fig. 9) have movable cores 686 called "key plungers" herein. Springs 687 normally serve to retain the key plungers in the normal position shown in Fig. 9. When the electro-magnets are energized, the key plungers are moved downward against the action of these springs 687. The electrical circuits through which the electro-magnets 680 are energized are closed near the end of an operation of the machine by the contact pins 674 so that the key plungers 686 are drawn down into engagement with the outer edges of the detents 668 (Figs. 6 and 7). The detents 668 are restored to normal position near the end of an operation of the machine and after the electro-magnets have become energized whereupon the key plungers of the energized electro-magnets are moved still farther and into recesses or grooves 689 (Fig. 7) formed in the left hand sides of the curved portions of the detents. These grooves 689 are like the grooves 68 which coöperate with the manually depressible keys 60 and therefore when a key plunger 686 moves into its corresponding groove the detent 68 is raised to lock the plunger in depressed position. It is understood, of course, that in these operations in which the envelops are filled the keys 60 are not operated. The operated key plungers 686 project into the path of movement of pawls 690 (Figs. 6 and 8) which are identical to the pawls 87 (Figs. 2 and 8) and mounted on arms 691 fast on the shaft 91. Therefore these pawls 690 engage the operated key plungers 686 and thereby control the extent of movement of the actuating segments 85 in the same manner as their movements are controlled by the keys 60. If an envelop is not perforated to represent an amount in any denomination none of the key plungers of the corresponding denominations are operated and therefore the actuating segment 85 is not moved out of zero position.

The circuits are shown diagramatically in Fig. 51. The separator 650, which is a conductor, is connected by a wire 693 to the positive pole of a battery 694, the coils of the electro-magnets 685 are connected by wires 692 to the corresponding contact pins 674. Wires 695 are not present in the machine, these wires being shown in Fig. 51, simply to illustrate that the contact pins 674 contact with the separator 650. The coins of the electro-magnets of a horizontal row are connected by a wire 696 to a wire 697 common to all of the horizontal rows of electro-magnets. The wire 697 leads to the negative pole of the battery. It can be seen that when the switch 886 is closed one of the pins 674 contacts with separator 650 an electrical circuit is completed from the battery through the wire 693, separator 650, pin 674, wire 692, corresponding electro-magnet 685 and wires 696 and 697 back to the battery.

*d. Means for feeding the envelops into feeding position.*

After the perforations in an envelop have controlled the energization of the electro-magnets 685 the envelop is moved during the next operation into position to receive the coins which are ejected from the money tubes and fall through the chute 580, (Figs. 1ᴮ, 4, and 25). The energization of the electro-magnets 685 is controlled by an envelop during one operation so that during the next operation the proper amount of money is ejected from the coin tubes and into the envelop.

An envelop after controlling the energization of the electro-magnets 685 is fed toward the right into a filling chamber or frame 700 (Figs. 41ᴬ, 44ᴬ and 46). This frame is mounted on the plate 640 and as shown in Fig. 46 is opened at 703 to permit the envelops to be fed into the same. At the same time that the envelop is fed into the frame 700 it is fed through a slot 704 (Fig. 43) into an oval shaped opening 705 formed in a horizontal plate 644.

A feeding roll 707 (Figs. 41ᴬ and 46) is fast on a shaft 708 journaled on an arm 709 fast on a sleeve 710 (Figs. 46, 47 and 57). The sleeve 710 is mounted on a shaft 717 journaled in a bracket 714 on the plate 640 and a bracket 712 (Fig. 41ᴬ) on the frame 678. Fast on the shaft 708 is a pinion 715 (Figs. 46 and 47) meshing with a pinion 716 fast on the shaft 717. Fast on the lower end of the shaft 717 is a bevel 718 (Figs. 41ᴬ and 44ᴬ) meshing with a bevel gear 719 fast on the forward end of a shaft 720, which at its rear end carries the bevel gear 723 meshing with a bevel gear 724 fast on the shaft 660. Through these connections the shaft 717 is given one complete rotation in the direction of the arrow (Figs. 46 and 47) upon each operation of the machine. The feeding roll 707 is rotated in the direction of the arrow (Fig. 46) through the pinions 715 and 716. Pinion 716 also meshes with a pinion 725 (Figs. 44ᴬ and 47) fast on the shaft 726 carrying a feeding roll 727 which coöperates with a feeding roll 728 (Fig. 47). Fast on the sleeve 710 (Fig. 57) is an arm 729 pivoted to a pitman 730 which is forked over the shaft 660 and carries the roller 733 projecting into a groove 734 formed in a disk 735 (Fig. 46) fast on the shaft 660. This cam groove 734 is so constructed that the feeding roll 707 is held in engagement with the envelop while the contact pins 674 (Fig. 46) are out of engagement with the envelop to feed the latter between the feeding rolls 727 and 728, which in turn feed it into the filling chambers or frame 700. While the contact pinions 674 are in engagement with the envelop the cam groove 734 holds the roll 707 out of engagement with the envelop so that it is not fed during this time.

While an envelop is in the chamber or frame 700 it is opened to receive the coins ejected from the money tubes under the control of its perforations. To this end a vertical shaft 740 (Figs. 43, 44^A and 46) is journaled in the plates 640 and 644 and carries two arms 743 and 744. Also fast on the shaft is an arm 745 connected by a link 746 to a lever 747, pivoted on the frame 678 (Fig. 57). The lower end of the lever 747 carries a roller 748 projecting into a cam groove 749 in a disk 750, fast on the shaft 660. This cam groove is so constructed that the shaft 740 and therefore the arms 743 and 744 are rocked clockwise (Figs. 43 and 46) out of the path of movement of the envelop when the latter is fed into the frame 700. Then the shaft 740 and arms 743 and 744 are restored to normal position whereupon the arm 743 engages the left hand edge of the envelop to open it, as shown in Fig. 43. The envelop when opened is adapted to fit in the slot 705 formed in the plate 644. The arm 744 contacts with the lower left hand edge of the envelop to hold it clear within the frame 700. While the envelop is open the coin ejectors 559 (Fig. 25) are operated to eject the coins into the chute 580, the mouth of which is above the opened envelop so that the coins drop into the latter.

e. Sealing mechanism.

While an envelop is in filling position, that is within the frame 700, it rests on the horizontal portion 751 (Figs. 44^A and 46) of a door 753, which is pivoted on a cross rod 754, supported by brackets 755, fast on the plate 640. After the envelop has been filled the door 753 is rocked to withdraw its horizontal portion 751 from under the envelop, as will be described presently, whereupon the envelop falls into a sealing compartment 756 (Figs. 41^A, 44^A, 52, 53, 54 and 55) under the frame or chamber 700. This sealing chamber 756, as best shown in Figs. 52, 53, 54 and 55, comprises a vertical front plate 757 to the edges of which are attached right-angle plates 758. When the envelop falls into the sealing chamber 756 it is arrested by the horizontal portion 759 of a door 760 which is pivotally mounted at its sides on vertical plates or frames 763 and 764 (Figs. 41^A, 41^B, 44^A and 44^B) fast to the underside of the frame 678. While the envelop is in this sealing chamber its flap is folded down and sealed, as will be described later, and then the lower door 760 is opened to permit the envelop to fall onto a receiving table, which will be described later.

The means for opening and closing the doors 753 and 760 will now be described. An arm 764 (Fig. 44^A) integral with the door 753 is connected by a slot and pin connection to the upper end of a link 765. The lower end of the link 765 is provided with a slot 766 through which a pin on one end of a lever 767 projects. A spring 768 normally tends to raise the link 765 but such movement is prevented by engagement of a nose on a spring pressed pawl 769 with a pin 770 on the link. The pawl 769 is pivoted on a projection on the frame 678 and is operated by a spring 773. A lever 775 is pivoted at 776 on the bracket 714 and at its rear end carries a roller 777. The forward end of the lever 775 is connected by a pin 778 to one end of a lever 779 (Figs. 41^A and 44^A) which at its other end is pivoted to the upper end of a plunger 780 (Fig. 48) of a dash pot 783. The dash pot 783 is provided with a solenoid coil 784 which when energized raises the plunger 780 which through the lever 779 (Fig. 44^A) rocks the lever 775 counter-clockwise. During this movement of the lever 775 the pin 777 engages a projection 786 on the pawl 769 to rock the nose of the latter out of engagement with the stud 770. Then the spring 768 raises the link 765 to rock the door 753 whereupon the envelop falls into the sealing chamber 756. The means for energizing the solenoid coil 783 (Fig. 48) of the dash pot will be described later. After the envelop has fallen into the sealing chamber the door 753 is positively restored to normal position by movement of the lever 767. This lever carries a roller 788 (Fig. 57) engaging in a cam groove 789, formed in a disk 790 (Fig. 46) fast on the shaft 660. This cam groove 789 is so constructed that the lever 767 is rocked counter-clockwise (Fig. 44^A) after the envelop has fallen into the sealing chamber. During this movement of the lever its pin projecting through the slot 766 in the link 765 draws the link downwardly against the action of the spring 768 thereby closing the door 753. At this time the roller 777 is out of engagement with the projection 786 on the pawl 769 so that the spring 773 is permitted to move the nose of the pawl 769 over the pin 770 thereby latching the door in closed position when the lever 767 is rocked clockwise to normal position.

The lower door 760 (Figs. 44^A, and 44^B) has an arm 794 pivoted to one end of a pitman 795 which at its other end is forked over the shaft 660. The pitman 795 carries a roller 796 projecting into a cam groove 797 formed in a disk 798, fast on the shaft 660. This cam groove is so constructed that the door 760 is rocked through the pitman 795 to permit the envelop to drop onto a receiving table after it has been sealed.

After the envelop has fallen into the sealing chamber the mucilage on the envelop is moistened and then the flap of the envelop is turned down into engagement with the mucilage to seal the envelop.

The moistener 800 (Figs. 44^A, 52, 53, 54 and 55) comprises a water reservoir 803 integral with arms 804, pivoted at 805 to projections on the frame 678. The reservoir 803 carries a moistening pad 806 which is supplied with water through a pad 807 in the reservoir. The moistener is rocked counter-clockwise (Figs. 44^A and 52) from the position shown in Fig. 44^A to the position shown in Fig. 52 to carry the moistening pad 806 against the mucilage on the envelop. The moistener is rocked in this manner by a cam groove 808 (Fig. 44^A) through a pitman 809. The pitman 809 is pivoted to an arm 810 integral with one of the arms 804 and carries a roller 813, projecting into the groove 808, formed in a disk 814, fast on the shaft 660.

After the mucilage has been moistened the flap of the envelop is turned down or folded by a folding plate 816 (Figs. 41^A, 44^A, 52, 53, 54 and 55). The folder plate 816 is provided with hubs 817 (Figs. 44^A and 55) by which the plate is pivoted to brackets 818 on the frame 678. The brackets 818 also support the sealing chamber 756. The right hand hub 817 carries a pinion 819 (Figs. 44^A, 55 and 56), meshing with the segmental rack portion of a lever 820 pivoted on a projection 822 of the frame 678. A pitman 823 at its upper end is pivoted to the lever 820 and near its lower end carries the roller 824 (Fig. 56) projecting into a cam groove 825, formed in a disk 826, fast on the shaft 660. This cam groove is so constructed that after the mucilage has been moistened the folding plate 816 is rocked clockwise from the position shown in Fig. 52 to the position shown in Fig. 54. In this way the flap 831 of the envelop is pressed against the mucilage, the envelop in turn being pressed against an impression block 828, mounted in a frame 829, fast on the frame 678. The impression block 828 may be adjusted in the frame 829 by the screws 832.

In order to insure the creasing of the envelop at the proper line a yoke 830 (Figs. 52, 53, 54 and 55) is pivoted on the reservoir 803. When the moistener is rocked to carry the moistening pad 806 against the mucilage the edge 833 of the yoke 830 engages the line at which the envelop flap is to be creased. An upper edge 834 of the front plate 757 of the sealing chamber also engages the front of the envelop on this line. While the moistener 800 is in the position shown in Fig. 52 the folder plate 816 is rocked to the position shown in Fig. 53 and then held in this position until the moistener 800 has been restored to normal position as shown in Fig. 54. During this first movement of the folder plate 816 the envelop flap is broken or creased on the proper line. Then after the moistener has been restored to normal position the folder plate 816 is moved to the position shown in Fig. 54 to press the flap against the mucilage. During movement of the moistener 800 while the folder plate 816 is in the position shown in Fig. 53 the yoke 830 slides down along the flap to insure that the same is flat, the yoke at this time being rocked about its pivots against the action of a spring 836, which after the yoke passes out of engagement with the flap restores the yoke to normal position relative to the moistener.

After the folder plate 816 has been moved to the position shown in Fig. 54 arms 840 (Figs. 44^A, 54, 55 and 56) are carried against the plate to increase the pressure on the envelop and thereby insure the proper sealing of the same. These arms 840 are fast on a shaft 843, mounted in projections 844 of the frame 678. One of the arms 840 (Fig. 56) forms one arm of a lever, the other arm 845 of which is pivoted to a pitman 846 which carries a roller 847 projecting into a groove 848 formed in a disk 849 (Fig. 46) fast on the shaft 660. The cam groove 848 is so constructed that the arms 840 are rocked into engagement with the folder plate 816 after the folder plate has been moved to the position shown in Fig. 54. Then the arms 840 are restored to normal position to permit movement of the folder plate to normal position.

As above stated after an envelop has been sealed the lower door 760 (Figs. 41^A, 41^B, 44^A and 44^B) is operated to permit the envelop to fall into a receiving magazine. This magazine is shown in Figs. 41^B and 44^B and comprises a horizontal table 855 on which the envelops drop. The table 855 is supported by the frames 763 and 764. The envelops fall between vertical side plates 856, fast on the table 855. As the envelops pass out of the sealing chamber they pass between guide plates 857 mounted on the plates 856. A vertical plate 858 is moved forwardly upon each operation of the machine to push the envelop forwardly. A sliding bracket 859 is slidably mounted on the table 855 and serves to hold the envelops in a vertical position as they are pushed forward. After an envelop which is dropped in front of the plate 858 is pushed forwardly by the latter it moves past spring clips 861, fast on the plates 856, the clips being provided to prevent the envelops from falling backward. The plate 878 is mounted on an arm 860 supported by a link 864 and a bell crank 865 pivoted on the table 855. The bell crank 865 is pivoted to a pitman 866 which near its upper end (Fig. 45) carries a roller 867 engaging into a groove 868 formed in a disk 869, fast on the shaft 660. This cam groove is so constructed that the plate 858 is moved forwardly and then rearwardly at each operation of the machine to move the envelops and bracket 859 forwardly on the table 855.

*f. Mechanism for releasing the machine when the machine is used for filling the envelops.*

As above stated when the machine is used for operating the denominational counters under the control of the manually depressible amount keys 60 the machine is released by the operation of the pinch lever 133 (Fig. 5) and the subsequent depression of the motor or release key 134 (Fig. 6). When the machine is to be used for printing envelops the lever 119 is adjusted to its central position in which position no totalizer 116 is in coöperative relation with the actuating segments 118. Then the machine, while being used for filling the envelops, is automatically released by the energization of an electromagnet 870 (Fig. 6). This electro-magnet when energized raises its movable core 873 to rock the arm 154 whereupon the pin 153 moves out of engagement with the pawl 150 to permit the release of the machine in the same manner as when the motor key 134 is operated. In order to make it unnecessary to operate the pinch lever 133 (Fig. 5) when the machine is being used to fill envelops a device fully shown and described in the above mentioned Letters Patent of the United States to Edw. J. Von Pein, is employed. This device comprises a disk 875 (Fig. 6) which is adjusted by the lever 119 in the manner fully described in the above mentioned Von Pein patent. The disk carries a pin 876 which when the lever 119 is moved to its central position engages a lever 877, loose on a shaft 878, carrying the arm 144. A spring 879 interposed between the arm 880 of the lever 877 and a lug on the arm 144 breaks the toggle formed by the arm 144 and link 143 after the toggle has been restored to the position shown in Fig. 6 if the pin 876 is in engagement with the lever 877.

In order to start the machine when the latter is to be used for filling envelops a circuit through the electro-magnet 870 is closed by a manually operated switch 885 (Fig. 51). The manually operated switch 886 is closed after the switch 885 is closed and the switch 886 is maintained closed while the machine is being used to fill the envelops and the switch 885 is only closed for an instant to start the machine for its first operation. The switches 885 and 886 are shown only in Fig. 51 but it is understood that these switches may be of any desired construction. When these switches are closed a circuit from the battery 694 is completed and this circuit is as follows: from the battery through switch 886, wire 887, wire 889, switch 885, wire 890, wire 891, solenoid coil 784 of the dash pot 783 thence through wire 893 back to the battery. Two levers 895 (Figs. 46, 48 and 51) are connected by slot and pin connections 897 (Fig. 48) to the plunger 780 of the dash pot 783 and are pivoted on a bracket 898, fast on the plate 640. The levers 895 carry a roller 900, which when the plunger 780 is raised upon energization of the solenoid coil 784, moves into engagement with spring contacts 903 (Figs. 48 and 51) to complete a circuit through the electro-magnet 870 (Fig. 6). This circuit (Fig. 51) is as follows: from the battery 694 through wire 901, contacts 903 and roller 900, wire 902, which includes the electro-magnet 870, and thence back to the battery. As above stated when the electro-magnet 870 is energized the release of the machine is effected.

After the machine has been once set in operation it is not necessary for the operator to give it further attention as it is automatically released upon each succeeding operation of the machine and automatically stops after the last envelop has been filled and sealed. The means for automatically controlling the energization of the electro-magnet 870 upon each operation after the first will now be described.

A frame 905 (Figs. 41A, 46, 48, 49 and 50) is slidably mounted on the plate 640, the plate being provided with a pin 906 (Fig. 46) projecting through a slot 907 in the frame 905. When the solenoid coil 784 is energized, as above described, the roller 900 (Fig. 48) moves out of engagement with a roller 908 carried by the frame 905 whereupon a spring 910 draws the frame 905 forward. The dash pot 783 is so constructed that after the solenoid coil 784 is deënergized the plunger 780 moves downwardly so that the roller 900 engages the roller 908 to move the frame 905 rearwardly at the end of each operation there being a dwell between operations. To this end an adjustable screw 909 mounted in the lower end of the dash pot 783 carries a ball 911 which controls the rate at which the air in the dash pot is forced out of the latter. The frame 900 (Fig. 50) carries a contact pin 910, which is suitably insulated from the frame. When the frame 905 is moved rearwardly to normal position the pin 910 contacts with the envelop between the separator 650 (Fig. 48) and the plate 646 thereby holding the pin 910 stationary against the action of a spring 913 (Fig. 50) coiled about the pin. The frame 905 also carries a conducting bar 914 having contacts 915 and 916 (Figs. 46 and 48).

When the frame 905 is moved rearwardly the contact 915 engages a contact 917 mounted on a bracket 918, fast on the plate 646. At the same time the pin 910 contacts with the contact 916 (Fig. 46) to complete a circuit through the solenoid coil 784 (Fig. 48) of the dash pot 783. This circuit (Fig. 51) is as follows: from the battery 694 through the switch 886, wire 887, contact pin 910, contact 916, bar 914, contact 917, contact 915, wire 891, solenoid coil 784, wire 893 and back to the battery. The solenoid coil 784 (Fig. 48) when energized in this manner raises the plunger 780 whereupon the roller 900 is carried into engagement with the contact strips 903 to complete the above described circuit through the releasing electro-magnet 870 (Figs. 6 and 51). As above stated the frame 905 is moved rearwardly when the plunger 780 is moved down to normal position and this movement of the frame 905 occurs at the end of each operation. Then the solenoid coil 984 is energized to carry the roller 900 into position to complete the circuit through the electro-magnet 870 (Fig. 6) whereupon the machine is released for the next operation. In this manner the machine is automatically released and a slight dwell between operations is provided.

A pawl 920 (Fig. 48) is provided on the bracket 898 and has a slot and pin connection 923 with a stud 924, mounted on the levers 895. A spring 925 coiled about the stud 924 normally retains the pawl 920 in engagement with the forward edge of the frame 905. When the levers 895 are rocked counter-clockwise upon energization of the solenoid coil 784 the pawl 920 retains the frame 905 in its rear position until the roller 900 engages the contacts 903, so that the solenoid coil will be energized for the proper period. Near the end of the counter-clockwise movement of the levers 895 the pawl 920 is rocked counter-clockwise through the slot and pin connection 923 to permit forward movement of the frame 905.

It is now obvious that the manually operated switch 885 (Fig. 51) must be employed to start the machine as no envelop at such time is between the separator 950 and the plate 646 and hence the pin 910 does not contact with the contact 916 (Figs. 46 and 48) to complete the circuit through the solenoid coil 784. Therefore the switch 885 must be used for this purpose. When the machine is being used to print and perforate the envelops the switch 886 is open so that the electro-magnets 685 are not energized when the pins 674 contact with the separator 650.

After the envelop has controlled the energization of the electro-magnets 685 (Fig. 6) which control the differential mechanism during the next operation, as above described, the envelop is filled during this next operation. Then the door 753 (Fig. 44^A) is opened and the envelop falls into the sealing chamber 756 where it is sealed during the operation succeeding that during which it was filled. While this last envelop is being filled it is obvious that no envelop is in position between the separator 650 (Fig. 48) and the plate 646 and that therefore when the frame 905 is moved rearwardly at the end of the operation the contact pin 910 does not contact with the contact 916. Hence the solenoid coil 784 is not energized, and the machine is given no further operations. As the solenoid coil 784 is not energized at the end of this last operation the upper door 753 (Fig. 44^A) is not operated and therefore the last envelop which is filled during the last operation does not fall into the sealing chamber 756. Therefore the operator removes this envelop from the filling chamber 700 and seals it by hand.

The envelops, when placed on the table 640 (Fig. 48) and between the sliding bracket 645 and the separator 650, should face toward the front of the machine, so that the perforations 296 (Fig. 16) will register with the proper contact pins 674 (Fig. 41^A and 42). In case an envelop is turned backward so that it faces the back of the machine the contact pin 910 (Figs. 48, 49 and 50) when the envelop is between the separator 650 and the plate 646, passes through the perforation 324 (Fig. 16) made in the envelop and therefore the machine is automatically stopped in the same manner as after the last envelop has been filled. This perforation 324 is therefore employed to make it necessary to place the envelops in the machine so that the amount perforations 296 will register with their corresponding contact pins 674.

It might be well to state here that the main counter 113 (Fig. 2) is operated while the machine is being used to fill envelops to register the total value of money ejected. Therefore this totalizer affords a check as the total at the end of the filling operations may be compared with the total accumulated during the operations of the machine, in which the envelops were printed and perforated and the denominational counters operated under the control of the amount key 60.

*Operation.*

It is thought that the above description is sufficient for a complete understanding of the invention; however, a résumé of the operation of the machine will be given here.

The machine is first used to print and perforate the envelops and operate the denominational counters. Upon each operation the desired totalizer 116 (Fig. 5) is moved into coöperative relation with the actuating segments 118, the proper amount keys 60 are depressed and then the release key 134 (Fig. 1A) is operated to release the machine. During the operation of the machine the actuating segments 85 (Fig. 2) are moved differentially under the control of the depressed keys 60 and through the above described connections operate the main totalizer 113 (Fig. 2), the indicators 93 (Figs. 2 and 3), the selected totalizer 116 (Fig. 5), the type carriers 304 (Fig. 15) for printing on the envelops and the type carriers 370 for printing on the ledger sheet. The slides 290 through the racks 300 and pinions 303 are moved to positions corresponding to those of the type carriers 304.

The uppermost envelop on the table 205 (Figs. 14 and 15) is fed by the feeding roll 210 onto the table 229 after the latter has been moved to its horizontal position. The coöperating feeding rolls 247 and 248 then feed the envelop against the stop or pin 259. While the envelop is in this position the frames 266 and 269 are lowered whereupon the pins 294 on the positioned slides 290 engage the selected punches 265 to force them through the pay envelop thereby making the amount holes in the latter. The frames 266 and 269 are then raised to normal position and the envelop fed by the feeding rollers 247 and 248 against the pins 260. The arm 329 is next operated to carry the platen 325 against the envelop and thereby print on the envelop from the type carriers 304. The table 229 then swings to the normal position shown in Fig. 15 whereupon the envelop falls off the table into any desired form of receptacle.

The alining arm 394 (Fig. 15) is rocked at the same time that the punches 265 are lowered to carry the type wheels 370 against the ledger sheet (Fig. 1A) to print the amount on the latter. Then the feed levers 429 (Fig. 19) are elevated whereupon the lever in engagement with its corresponding rack 428 elevates the ledger sheet carriage so that during the next operation the amount will be printed under the daily earnings of the next employee. After the last total on a ledged sheet has been printed the sheet is withdrawn from the ledger sheet carriage and another fed into the carriage by the operation of the knob 414 on the feed roll 406. The lever 449 is also operated to disable the retaining rollers 423 (Fig. 22) and the feed lever 429, which is in engagement with its rack 428. While a lever 449 is in operative position the ledger sheet carriage is lowered by hand.

The differential movement of the actuating segments 85 (Fig. 2) is also imparted to the controlling disks 510 shown in Figs. 25 and 27 to 35 inclusive. After these disks have been adjusted the shaft 495 and arms 497 (Fig. 25) are rocked clockwise to permit operation of the levers 494 to extents determined by the corresponding disks 510.

Then when the arms 497 are rocked to normal position they restore the levers 494 to normal position whereupon the actuating racks 490 operate the corresponding denominational counters 473 and 475.

During these operations the lever 626 is in the position shown in Fig. 25 whereby the coin ejectors 559 are disabled so that coins in the money tubes are not ejected.

After the machine has been used for printing and perforating envelops and operating the denominational counters, as above described, it is used to fill and seal the envelops. The envelops are placed on the plate 640 (Fig. 48) between the separator 650 and the plate 646 and the lever 119 (Figs. 1A and 5) is adjusted to its lowermost position so that upon each operation the toggle formed by the arm 144 and link 143 is automatically broken. Then the switches 885 and 886 (Fig. 51) are closed to set the machine in operation. During each operation the separator 650 (Figs. 41A, 46 and 48) separates the foremost envelop from the next envelop and then the frame 670 (Figs. 41A, 42 and 46) is moved rearwardly to carry the contact pins 674, which register with the amount perforations in the envelop, into engagement with the separator 650. In this way the circuits are closed to energize the corresponding electro-magnets 685 (Figs. 2, 6 and 7). Then when the detents 64 are restored to normal position the key plungers 686 of the energized magnets raise the detents and are latched in operated position by the latter. Also at the end of the operation of the machine the solenoid coil 784 (Fig. 48) is energized so that the roller 900 is carried into engagement with the contact springs 903 to complete the circuit through the electro-magnet 870 to effect the release of the machine for the next operation. During this next operation the operated plungers 686 control the extent of movement of the differential mechanism of the machine. After an envelop has controlled the energization of the electro-magnets 686 it is moved into the filling chamber or frame 700 (Figs. 44A and 46) and is opened by the arm 743.

The disks 587 (Figs. 25, 27 and 28 to 36 inclusive) are differentially positioned through the connections shown in these figures. When the ejectors 559 (Fig. 25) are withdrawn from under the coins in the money tubes they are selectively raised by their springs 579 under the control of the disks 587 so that when the ejectors are moved back to normal position those selected for effective operation eject the proper amounts into the opened envelop.

After the envelop has been filled the door 753 is opened, at the end of the operation, to permit the envelop to drop into the sealing chamber 756 (Figs. 44A, 52, 53 and 54).

The moistener 800 is then operated during the next operation to moisten the mucilage and the folder plate 816 is moved to fold the flap and press it against the mucilage thereby sealing the envelop. After the envelop has been sealed in this manner the lower door 760, closing the bottom of the sealing chamber, is opened to permit the envelop to fall onto the receiving table, shown in Fig. 44ᴮ.

During the operation in which the last envelop is filled no envelop is between the separator 650 and the plate 646 (Fig. 48) and therefore the machine does not operate after this operation. The last envelop is removed from the filling chamber 700 by the operator and sealed by hand.

It is obvious that the envelops can be filled under the control of the keys 60, if desired. In such case the lever 626 (Fig. 25) is adjusted into position to permit the effective operation of the coin ejectors 559. As the amounts would be set up on the keys 60 the perforating mechanism and the means controlled by the perforations could be omitted. The machine would then be released by the motor key 134.

While the form of mechanism herein shown and described, is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is:—

1. In a machine of the class described, the combination with pay envelops carrying indicia of the amounts to be deposited therein, of a supply of money, and means controlled by the indicia carried by the envelops for drawing the different amounts of money required by the envelops from the supply and depositing it in the envelops.

2. In a machine of the class described, the combination with record material having perforations, of money ejecting mechanism, and electrical connections controlled by said perforations for controlling the ejecting mechanism.

3. In a machine of the class described, the combination with envelops having perforations, and money ejecting mechanism for ejecting money into said envelops under the control of their perforations.

4. In a machine of the class described, the combination with envelops having perforations, of money ejecting mechanism for ejecting money into said envelops, and differential mechanism controlling said ejecting mechanism and controlled by the perforations in said envelops.

5. In a machine of the class described, the combination with envelops having perforations, of money ejecting mechanism for ejecting money into said envelops, differential mechanism controlling said ejecting mechanism, and electro-magnets selectively energized under the control of the perforations in the envelops to control the differential mechanism.

6. In a machine of the class described, the combination with record material having perforations representing amounts, of money ejecting mechanism controlled by said perforations to eject the least number of coins of various denominations which make up any amount represented by the perforations, and means for automatically and successively bringing new sets of perforations into position to control said ejecting mechanism.

7. In a machine of the class described, the combination with envelops having perforations representing amounts, and money ejecting mechanism controlled by said perforations for ejecting into each envelop the least number of coins making up the amount represented by the perforations in the envelop.

8. In a machine of the class described, the combination with envelops having perforations representing amounts, of money ejecting mechanism for ejecting into the envelops the least number of coins making up the amounts, and differential mechanism controlling said ejecting mechanism and controlled by said perforations in the envelops.

9. In a machine of the class described, the combination with envelops having perforations representing amounts, of money ejecting mechanism for ejecting into the envelops the least number of coins making up the amounts, differential mechanism controlling said ejecting mechanism, and electro-magnets selectively energized under the control of the perforations in the envelops to control the differential mechanism.

10. In a machine of the class described, the combination with perforating mechanism for perforating envelops, of differential mechanism for controlling the perforating mechanism, money ejecting mechanism controlled by said differential mechanism for ejecting money into the envelops, and means controlled by the perforations in the envelops for controlling the differential mechanism.

11. In a machine of the class described, the combination with perforating mechanism for perforating envelops, of differential mechanism for controlling the perforating mechanism, money ejecting mechanism controlled by said differential mechanism for ejecting money into the envelops, and electro-magnets selectively energized under the control of the perforations in the envelops to control said differential mechanism.

12. In a machine of the class described, the combination with perforating mechanism for perforating envelops, of differential mechanism for controlling the perforating mechanism, manipulative means for controlling the differential mechanism when the envelops are perforated, money ejecting mechanism controlled by said differential mechanism for ejecting money into said envelops, and means controlled by the perforations in said envelops for controlling the differential mechanism when the envelops are filled with money.

13. In a machine of the class described, the combination with perforating mechanism for perforating envelops, of differential mechanism for controlling the perforating mechanism, manipulative means for controlling the differential mechanism when the envelops are perforated, money ejecting mechanism controlled by said differential mechanism for ejecting money into said envelops, and electro-magnets selectively energized under the control of the perforations in said envelops for controlling the differential mechanism when the envelops are filled with money.

14. In a machine of the class described, the combination with perforating mechanism for perforating envelops, of denominational counters one for each denomination of money, differential mechanism for controlling the perforating mechanism and the denominational counters, money ejecting mechanism controlled by said differential mechanism for controlling the ejecting of money into the envelops, and means controlled by the perforations in said envelops for controlling the differential mechanism.

15. In a machine of the class described, the combination with perforating mechanism for perforating envelops, of denominational counters one for each denomination of money, differential mechanism for controlling the perforating mechanism and the denominational counters, money ejecting mechanism controlled by said differential mechanism for controlling the ejecting of money into the envelops, and electro-magnets selectively energized under the control of the perforations in said envelops for controlling the differential mechanism.

16. In a machine of the class described, the combination with perforating mechanism for perforating envelops, of accounting mechanism comprising denominational counters one for each denomination of money, differential mechanism for controlling the perforating mechanism and accounting mechanism, manipulative means for controlling said differential mechanism when the envelops are perforated, money ejecting mechanism for ejecting money into the envelops, and means controlled by the perforations in said envelops for controlling the differential mechanism when the envelops are filled with money.

17. In a machine of the class described, the combination with perforating mechanism for perforating envelops, of accounting mechanism comprising denominational counters one for each denomination of money, differential mechanism for controlling the perforating mechanism and accounting mechanism, manipulative means for controlling said differential mechanism when the envelops are perforated, money ejecting mechanism for ejecting money into the envelops, and electro-magnets selectively energized under the control of the perforations in said envelops for controlling the differential mechanism when the envelops are filled with money.

18. In a machine of the class described, the combination with envelops having perforations, of accounting mechanism comprising a plurality of denominational counters, one for each denomination of money, differential mechanism controlling said accounting mechanism, manipulative means controlling said differential mechanism, money ejecting mechanism controlled by said differential mechanism to eject money into the envelops, and means controlled by said perforations in the envelops for controlling the differential mechanism.

19. In a machine of the class described, the combination with envelops having perforations, of accounting mechanism comprising a plurality of denominational counters, one for each denomination of money, differential mechanism controlling said accounting mechanism, manipulative means controlling said differential mechanism, money ejecting mechanism controlled by said differential mechanism to eject money into the envelops, and electro-magnets selectively energized under the control of said perforations in the envelops for controlling the differential mechanism.

20. In a machine of the class described, the combination with envelops having perforations, of accounting mechanism comprising a plurality of denominational counters, one for each denomination of money, differential mechanism controlling said accounting mechanism, money ejecting mechanism controlled by said differential mechanism to eject money into said envelops, and means controlled by said perforations in the envelops for controlling the differential mechanism.

21. In a machine of the class described, the combination with envelops having perforations, of accounting mechanism comprising a plurality of denominational counters, one for each denomination of money, differential mechanism controlling said accounting mechanism, money ejecting mechanism controlled by said differential mechanism to eject money into said envelops, and electromagnets selectively energized under the control of said perforations in the envelops for controlling the differential mechanism.

22. In a machine of the class described, the combination with envelops having perforations, of money ejecting mechanism for ejecting money into the envelops, differential mechanism controlling the money ejecting mechanism and controlled by the perforations in said envelops, and manipulative means for also controlling said differential mechanism.

23. In a machine of the class described, the combination with envelops having perforations, of money ejecting mechanism for ejecting money into said envelops, differential mechanism controlling said money ejecting mechanism, electro-magnets selectively energized under the control of the perforations in said envelops, and manipulative means for also controlling said differential mechanism.

24. In a machine of the class described, the combination with accounting mechanism including a plurality of denominational counters, one for each denomination of money, of differential mechanism controlling operation of said accounting mechanism whereby the value of the least number of coins which make up an amount is registered on the appropriate counters, money ejecting mechanism for ejecting coins under the control of said differential mechanism and record means for controlling the differential mechanism when the ejecting mechanism is actuated thereby.

25. In a machine of the class described, the combination with accounting mechanism including a plurality of denominational counters, one for each denomination of money, of differential mechanism controlling operation of said accounting mechanism whereby the value of the least number of coins which make up an amount is registered on the appropriate counters, money ejecting mechanism operated by the differential mechanism whereby the least number of coins making up an amount are ejected and record means for controlling the differential mechanism when the ejecting mechanism is actuated thereby.

26. In a machine of the class described, the combination with accounting mechanism including a plurality of denominational counters, one for each denomination of money, of differential mechanism controlling operation of said accounting mechanism whereby the value of the least number of coins which make up an amount is registered on the appropriate counters, manipulative means for controlling the differential mechanism, money ejecting mechanism operated by the differential mechanism whereby the least number of coins making up an amount is ejected and record means for controlling the differential mechanism when the ejecting mechanism is actuated thereby.

27. In a machine of the class described, the combination with accounting mechanism including a plurality of denominational counters, one for each denomination of money, of differential mechanism controlling operation of said accounting mechanism whereby the value of the least number of coins which make up an amount is registered on the appropriate counters, mechanism controlled by the differential mechanism for making perforations in the envelops to represent amounts, coin ejecting mechanism operated by said differential mechanism to eject into the envelops the least number of coins making up an amount, and manipulative means for controlling the differential mechanism when the envelops are perforated, the differential mechanism being controlled by the perforations in the envelops when the latter are filled with money.

28. In a machine of the class described, the combination with an accounting device, of a differentially movable actuator therefor, a driving member for said actuator, a latch for connecting the member and actuator, manipulative devices for operating said latch to disconnect the actuator from said member, electro-magnets for also operating said latch to disconnect the actuator from said member, and record means for selectively controlling the energization of said electro-magnets.

29. In a machine of the class described, the combination with an accounting device, of a differentially movable actuator therefor, a driving member for said actuator, a latch for connecting said member and actuator, manipulative means for operating said latch to disconnect the actuator from said member, and record means for also controlling the operation of said latch to disconnect said actuator from said member.

30. In a machine of the class described, the combination with an accounting device, of an actuator therefor, keys for controlling the extent of movement of said actuator, key plungers for also controlling the extent of movement of said actuator, record means for selectively controlling the operation of said key plungers, and a detent for latching the operated key or key plunger in operated position.

31. In a machine of the class described, the combination with an accounting device, of an actuator therefor, keys for controlling the extent of movement of said actuator, key plungers for also controlling the extent of movement of said actuator, electro-magnets for operating said key plungers, record means for selectively controlling the energization of the electro-magnets, and a detent for latching the operated key or key plunger in operated position.

32. In a machine of the class described, the combination with an accounting device, of a differentially movable actuator therefor, a latch connecting said member and actuator, two pawls associated with said latch, manipulative means for coöperating with one of said pawls to operate said latch, key plungers for coöperating with the other of said pawls to operate said latch, and record means for controlling the operation of said key plungers.

33. In a machine of the class described, the combination with means for making perforations in envelops, of actuating segments controlling the operation of said means, driving means for said segments, latches connecting said segments and driving means, keys for operating said latches when the envelops are perforated, money ejecting mechanism controlled by said segments for ejecting money into the envelops, and key plungers selectively operated under the control of the perforations in said envelops for operating said latches when the envelops are filled with money.

34. In a machine of the class described, the combination with means for making perforations in envelops, of actuating segments controlling the operation of said means, driving means for said segments, latches connecting said segments and driving means, keys for operating said latches when the envelops are perforated, money ejecting mechanism controlled by said segments for ejecting money into the envelops, and key plungers selectively operated under the control of the perforations in said envelops for operating said latches when the envelops are filled with money, and detents common to the keys and key plungers for locking them in operated positions.

35. In a machine of the class described, the combination with a main operating mechanism, of locking means therefor, perforating mechanism for perforating envelops, differential mechanism for controlling the perforating mechanism, a manipulative device for effecting operation of said locking device to release the machine when the envelops are to be perforated, money ejecting mechanism controlled by said differential mechanism for ejecting money into the envelops, means controlled by the perforations for controlling the differential mechanism when the envelops are filled with money, and means controlled by said envelops for automatically effecting operation of said locking means to release the machine when the envelops are filled with money.

36. In a machine of the class described, the combination with a main operating mechanism, of locking means therefor, perforating mechanism for perforating envelops, differential mechanism for controlling the perforating mechanism, a manipulative device for effecting operation of said locking device to release the machine when the envelops are to be perforated, money ejecting mechanism controlled by said differential mechanism for ejecting money into the envelops, means controlled by the perforations for controlling the differential mechanism when the envelops are filled with money, and an electro-magnet energized under the control of said envelops for automatically effecting operation of said locking means to release the machine when the envelops are filled with money.

37. In a machine of the class described, the combination with pay envelops carrying perforations representing amounts to be deposited therein, of a supply of money, and means controlled by the perforations in the envelops for drawing the different amounts of money required by the envelops from the supply and depositing said amounts in the envelops.

38. In a machine of the class described, the combination with envelops each perforated to represent the amount to be deposited in the envelop, of a supply of money, means controlled by the perforations for drawing the different amounts of money required by the envelops from the supply and depositing said amounts in the envelops, and means for automatically and successively placing the envelops in position for their perforations to coöperate with said controlling means.

39. In a machine of the class described, the combination with a receiver constructed to hold a supply of pay envelops, each envelop being perforated to represent the amount of money to be placed therein, money delivering mechanism controlled by the perforations, and means for successively drawing envelops from the supply receiver, opening them and presenting them to the money delivering mechanism.

40. In a machine of the class described, the combination with a receiver constructed to hold a number of pay envelops, each envelop being perforated to represent the amount of money to be placed therein, of means for automatically and successively feeding the envelops from said receiver, and a mechanism controlled by the perforations in the envelops after the envelops are fed from the receiver for counting and depositing in the envelops the different amounts of money represented by the perforations.

41. In a machine of the class described, the combination with a plurality of pay envelops each perforated to represent values, of change delivering mechanism, means controlled by the envelops for successively feeding the envelops into position to receive money from the delivering mechanism, and means controlled by the perforations in the envelops for operating the change delivering mechanism to deposit money in the envelops.

42. In a machine of the class described, the combination with devices for perforating record material to represent amounts, of a plurality of totalizers selectively operable to classify under separate totals the amounts perforated, differential mechanism for controlling the perforating devices and the totalizers, money delivering mechanism controlled by the differential mechanism, and means whereby the perforations control the differential mechanism.

43. In a machine of the class described, the combination with devices for perforating record material to represent amounts; of a plurality of totalizers selectively operable to classify under separate totals the amounts perforated; a plurality of denominational counters, one for each denomination of money; money delivering devices; differential mechanism for controlling the perforating devices, the totalizers, the counters and the money delivering devices, and means whereby the perforations control the differential mechanism.

44. In a machine of the class described, the combination with an accounting mechanism and ejecting mechanism, of a differential mechanism for controlling said accounting and ejecting mechanisms, and manipulative and record means for controlling the actuation of the differential mechanism.

45. In a machine of the class described, the combination with an accounting mechanism and ejecting mechanism, of a differential mechanism for controlling said accounting and ejecting mechanisms, manipulative means for controlling the differential mechanism when the accounting mechanism is actuated thereby, and record means for controlling the differential mechanism when the ejecting mechanism is actuated thereby.

46. In a machine of the class described, the combination with an accounting mechanism and ejecting mechanism, of a differential mechanism for controlling said accounting and ejecting mechanisms, means for controlling the differential mechanism when the accounting mechanism is actuated thereby, and separate means for controlling the differential mechanism when the ejecting mechanism is actuated thereby.

47. In a machine of the class described, the combination with an accounting mechanism and ejecting mechanism, of a differential mechanism for controlling said accounting and ejecting mechanisms, means for controlling the differential mechanism when the accounting mechanism is actuated thereby, and record means for controlling the differential mechanism when the ejecting mechanism is actuated thereby.

48. In a machine of the class described, the combination with an accounting mechanism and ejecting mechanism, of a differential mechanism for controlling said accounting and ejecting mechanisms, manipulative means for controlling the differential mechanism when the accounting mechanism is actuated thereby and separate means for controlling the differential mechanism when the ejecting mechanism is actuated thereby.

49. In a machine of the class described, the combination with an accounting mechanism and ejecting mechanism, of a differential mechanism for controlling said accounting and ejecting mechanisms, manipulative means for controlling the differential mechanism when the accounting mechanism is actuated thereby, and automatic means for controlling the differential mechanism when the ejecting mechanism is actuated thereby.

50. In a machine of the class described, the combination with an accounting mechanism and ejecting mechanism, of a differential mechanism for controlling said accounting and ejecting mechanisms, means for controlling the differential mechanism when the accounting mechanism is actuated thereby, and automatic means for controlling the differential mechanism when the ejecting mechanism is actuated thereby.

In testimony whereof I affix my signature.

EDWARD J. VON PEIN.